US007584718B2

(12) United States Patent
Harris, Jr. et al.

(10) Patent No.: US 7,584,718 B2
(45) Date of Patent: Sep. 8, 2009

(54) GROWING MARINE FISH IN FRESH WATER

(75) Inventors: H. William Harris, Jr., Portland, ME (US); David R. Russell, Alfred, ME (US); Jacqueline Nearing, N. Yarmouth, ME (US); Marlies Betka, Portland, ME (US)

(73) Assignee: MariCal, Inc., Portland, ME (US)

( * ) Notice: Subject to any disclaimer, the term of this patent is extended or adjusted under 35 U.S.C. 154(b) by 0 days.

(21) Appl. No.: 12/229,186

(22) Filed: Aug. 20, 2008

(65) Prior Publication Data
US 2009/0078212 A1    Mar. 26, 2009

Related U.S. Application Data

(63) Continuation of application No. 11/702,482, filed on Feb. 5, 2007, now Pat. No. 7,421,975, which is a continuation of application No. 11/057,660, filed on Feb. 14, 2005, now Pat. No. 7,182,041, which is a continuation of application No. 10/411,076, filed on Apr. 9, 2003, now Pat. No. 6,854,422, which is a continuation of application No. PCT/US01/31625, filed on Oct. 11, 2001, which is a continuation-in-part of application No. 09/687,373, filed on Oct. 12, 2000, now Pat. No. 6,463,882.

(51) Int. Cl.
    *A01K 29/00*    (2006.01)
(52) U.S. Cl. ..................................... 119/230
(58) Field of Classification Search .................. 119/230
    See application file for complete search history.

(56) References Cited

U.S. PATENT DOCUMENTS

| | | | |
|---|---|---|---|
| 3,406,662 A | 10/1968 | Vik et al. |
| 3,777,709 A | 12/1973 | Anderson et al. |
| 4,703,008 A | 10/1987 | Lin |
| 5,128,153 A | 7/1992 | Axelrod |
| 5,351,651 A | 10/1994 | Ushio et al. |
| 5,357,651 A | 10/1994 | Jones et al. |

(Continued)

FOREIGN PATENT DOCUMENTS

EP            0801904 A1    4/1997

(Continued)

OTHER PUBLICATIONS

Aida, K., et al., "Molecular Cloning of a Putative $Ca^{2+}$ Sensing Receptor cDNA from Human Kidney," Biochemical and Biophysical Research Communications, 214(2):524-529 (1995).

(Continued)

*Primary Examiner*—Thomas Price
(74) *Attorney, Agent, or Firm*—Hamilton, Brook, Smith & Reynolds, P.C.

(57) ABSTRACT

The invention relates to methods for raising marine fish in freshwater. The methods involve transferring fish to freshwater containing at least one Polyvalent Cation Sensing Receptor (PVCR) modulator in an amount sufficient to increase expression and/or sensitivity of at least one PVCR; and adding feed for fish consumption to the freshwater, wherein the feed comprises an amount of NaCl sufficient to contribute to a significant increased level of the PVCR modulator in serum of the marine fish.

13 Claims, 32 Drawing Sheets

```
                  10        20        30        40        50        60        70        80
SEQ ID NO: 1 CCTGACAATATTCGCAGTGCTGGGAGTCTTGCTGACGGCCTTCGTCCTAGGGGTGTTTGCCCGATTCCGCAACACTCCCA
SEQ ID NO: 2 LeuThrIlePheAlaValLeuGlyValLeuLeuThrAlaPheValLeuGlyValPheAlaArgPheArgAsnThrPro>
             ---------------------------------TRANSLATION OF COD [A]---------------------------->

90       100       110       120       130       140       150       160
             TCGTGAAGGCCACCAACCGGGAGCTGTCCTACCTCCTCCTCTTCTCCCTGGTCTGCTGCTTCTCCAGCTCTCTTATGTTC
             IleValLysAlaThrAsnArgGluLeuSerTyrLeuLeuLeuPheSerLeuValCysCysPheSerSerSerLeuMetPhe>
             ---------------------------------TRANSLATION OF COD [A]---------------------------->

170       180       190       200       210       220       230       240
             ATCGGTGAACCCCAGGACTGGACGTGCCGCCTGCGCCAGCCGGCCTTCGGGATCAGCTTCGTCCTCTGCATCTCCTGCAT
             IleGlyGluProGlnAspTrpThrCysArgLeuArgGlnProAlaPheGlyIleSerPheValLeuCysIleSerCysIle>
             ---------------------------------TRANSLATION OF COD [A]---------------------------->

250       260       270       280       290       300       310       320
             CCTGGTCAAGACCAACCGCGTGCTGCTCGTCTTCGAGGCCAAGATCCCCACCAGTCTCCACCGCAAGTGGTGGGGCCTGA
             LeuValLysThrAsnArgValLeuLeuValPheGluAlaLysIleProThrSerLeuHisArgLysTrpTrpGlyLeu>
             ---------------------------------TRANSLATION OF COD [A]---------------------------->

330       340       350       360       370       380       390       400
             ACCTGCAGTTCTTGCTGGTGTTCCTGTGCACCTTCGTCCAGGTGATGATTTGCGTGGTCTGGCTCTACAACGCCCCGCCG
             AsnLeuGlnPheLeuLeuValPheLeuCysThrPheValGlnValMetIleCysValValTrpLeuTyrAsnAlaProPro>
             ---------------------------------TRANSLATION OF COD [A]---------------------------->

410       420       430       440       450       460       470       480
SEQ ID NO: 1 GCCAGCTCCAAGAACCACGACATCGATGAGATCATCTTCATCACCTGCAACGAGGGCTCCATGATGGCCCTGGGCTTTCT
SEQ ID NO: 2 AlaSerSerLysAsnHisAspIleAspGluIleIlePheIleThrCysAsnGluGlySerMetMetAlaLeuGlyPheLeu>
             ---------------------------------TRANSLATION OF COD [A]---------------------------->

490       500       510       520       530       540       550       560
             GATCGGCTACACCTGTCTCCTTGCCGCCATTTGCTTCTTCGCCGTTCAAATCGCGCAAACTCCCGGAGAACTTCACAG
             IleGlyTyrThrCysLeuLeuAlaAlaIleCysPhePheAlaPheLysSerArgLysLeuProGluAsnPheThr>
             ---------------------------------TRANSLATION OF COD [A]---------------------------->

570       580       590
             AGGCGAAGTTCATCACGTTTAGCATGCTGATATT
             GluAlaLysPheIleThrPheSerMetLeuIleXxx>
             ------TRANSLATION OF COD [A]-------->
```

U.S. PATENT DOCUMENTS

| | | | |
|---|---|---|---|
| 5,688,938 | A | 11/1997 | Brown et al. |
| 5,763,569 | A | 6/1998 | Brown et al. |
| 5,858,684 | A | 1/1999 | Nemeth et al. |
| 5,962,314 | A | 10/1999 | Brown et al. |
| 5,981,599 | A | 11/1999 | Moe et al. |
| 6,001,884 | A | 12/1999 | Nemeth et al. |
| 6,016,770 | A | 1/2000 | Fischer |
| 6,162,442 | A | 12/2000 | Lotter et al. |
| 6,463,882 | B1 * | 10/2002 | Harris et al. ............ 119/230 |
| 6,854,422 | B2 * | 2/2005 | Harris et al. ............ 119/230 |
| 7,182,041 | B2 * | 2/2007 | Harris et al. ............ 119/230 |
| 7,421,975 | B2 * | 9/2008 | Harris et al. ............ 119/230 |

FOREIGN PATENT DOCUMENTS

| | | |
|---|---|---|
| RU | 1784152 | 12/1992 |
| WO | WO 97/35977 A1 | 10/1997 |
| WO | WO 98/15627 | 4/1998 |
| WO | WO 00/64274 | 4/1999 |

OTHER PUBLICATIONS

Alberts, B., et al., "Cell Junctions, Cell Adhesion, and the Extracellular Matrix." In Molecular Biology of the Cell, 3$^{rd}$. ed., (Garland Publishing), pp. 950-954 (1994).

Anast, C.S., et al., "Evidence for Parathyroid Failure in Magnesium Deficiency," Science, 177: 606-608 (1972).

Anh, D.J., et al., "Skeletal alkaline phosphatase activity is primarily released from human osssteoblasts in an insoluble form, and the net release is inhibited by calcium and skeletal growth factors," Calcif Tissue In.: 62: 332-340 (1998).

Bai, M., et al., "Expression and characterization of inactivating and activating mutations in human $Ca^{2+}$ Sensing Receptor," J. Biol. Chem., 32:19537-19545 (1996).

Baum, M. A., et al., "Recent Insights Into the Coordinate Regulation of Body Water and Divalent mineral Ion Metabolism," The American Journal of the Medical Sciences., 316(5): 321-328 (1998).

Borgatti, A.R., et al., "Gill (NA+K+) ATPase involvement and regulation during salmonid adaptation to salt water," Comp. Biochem. Physiol. 102: 637-643 (1992).

Bornefalk, E., et al., "Regulation of interleukin-6 secretion from mononuclear blood cells by extracellular calcium," J. Bone Miner. Res., 12: 228-233 (1997).

Brown, A.J., et al., "Rat calcium-receptor is regulated by vitamin D but not by calcium," Am. J. Physiol., 270: F454-F460 (1996).

Brown, E. M., et al., "Neomycin Mimics the Effects of High Extracellular Calcium Concentrations on Parathyroid Function in Dispersed Bovine Parathyroid Cells," Endocrinology,128(6):3047-3054 (1991).

Brown, E.M., et al., "A comparison of the effects of divalent and trivalent cations on parathyroid hormones release," Endocrinol., 127:1064-1071 (1990).

Brown, E.M., et al., "Calcium-Ion-Sensing Cell-Surface Receptors," The New England Journal of Medicine, 333(4):234-240 (1995).

Brown, E.M., et al., "Cloning and Characterization of an Extracellular $Ca^{2+}$-Sensing Receptor from Bovine Parathyroid," Nature, 366:575-580 (1993).

Chang, W., et al., "Calcium Sensing in Cultured Chondrogenic RCJ3. 1c5.18 Cells," Endocrinology 140: 1911-1919 (1999).

Chattopadhyay, N., et al., "Calcium-sensing receptor in the rat hippocampus: a developmental study," Developmental Brain Research, 100 pp. 13-21 (1997).

Chen, T. T., et al., "Transgenic fish," Trends in Biotechnology, 8: 209-215 (1990).

Cim, R. R., et al., "Identification and functional assay of an extracellular calcium-sensing receptor in Necturus gastric mucosa," American Journal of Physiology 273: G1051-G1060 (1997).

Clarke, W.C., et al., "A seawater challenge test to measure smolting in juvenile salmon." Fisheries and Marine Service Research Dir. Tech. Report 705, Ottawa (1977).

Cole, et al., "Isolation and Characterization of Pleurociden, an Antimicrobial Peptide in the Skin Secretions of Winter Flounder," J. Biol. Chem. 272:12008-12013 (1997).

Conigrave, A.D., et al., "L-Amino acid sensing by the extracellular $Ca^{2+}$-sensing receptor." Proc Natl Acad Sci, 97(9) 4419-4819 (2000).

Dabrowska, H., et al., "Magnesium status in freshwater fish, common carp (Cyprinus carpio, L.) And the dietary protein-magnesium interaction," Fish Physiology and Biochemistry, 9(2) 165-172 (1991).

Darnell, J., et al., "The Plasm Membrane," Chapter 13 in Molecular Cell Biology, 516-520 (1990).

Davenport, J., "Synopsis of Biological Data on the Lumpsucker," Food and Agriculture Organization of the United Nations, Synopsis No. 147 pp. 1-19 (1985).

Du, S.J., et al., "Growth Enhancement in Transgenic Atlantic Salmon by the Use of an "All Fish" Chimeric Growth Hormone Gene Construct," Bio/Technology 10:176-181 (1992).

Eklou-Kalonji, E., et al., "Effects of extracellular calcium on the proliferation and differentiation of porcine osteoblasts in vitro," Cell Tissue Res., 292: 163-171 (1998).

Elger, B., et al., "Effect of adrenergic blockade with bretylium and phentolamine on glomerular filtration rate in the rainbow trout, Salmo gairdneri Rich., adapting to saline water," J. Biochem. Physiol., C. 75: 253-258 (1983).

Elger, E.B. et al., "Adaption of renal function to hypotonic medium in winter flounder," J. Comp. Physio. B157:21-30 (1987).

El-Mowafi, A.F.A., et al., "Magnesium requirement of Atlantic salmon (Salmo salar L.) Parr in seawater-treated fresh water," Aquaculture Nutrition, 4(1) 31-38(1998).

Emanuel, R. L., et al., "Calcium-sensing receptor expression and regulation by extracellular calcium in the at T-20 pituitary cell line," Mol Endocrinology, 10: 555-565 (1996).

Evans, D.H., "Osmotic and Ionic Regulation," Chapter 11 in The Physiology of Fishes, (CRC Press, Boca Raton, FL) pp. 315-341 (1993).

Evans, G.H., et al., "Association of Magnesium Deficiency with the Blood Pressure-Lowering Effects of Calcium," Journal of Hypertension, 8(4):327-337 (1990).

Fauci, A.S., et al., "Cardinal Manifestations and Presentation of Diseases," Principles of Internal Medicinc, 14$^{th}$ Edition:p. 260 (1998).

Folmar, L.C. et al., "Evaluation of some physiological parameters as predictive indices of smoltification," Aquaculture 23: 309-324 (1981).

Folmar, Leroy C. and Dickhoff, Walton W., "The Parr-Smolt Transformation (Smoltification) And Seawater Adaptation In Salmonids," Aquaculture, 21: 1-37 (1980).

Forsberg, James A., and Neill, William H., "Saline Groundwater As An Aquaculture Medium: Physiological Studies On The Red Drum, Sciaenops ocellatus," Environmental Biology of Fishes., 49: 119-128 (1997).

Forsberg, James A., et al., "Survival and Growth of Red Drum Sciaenops ocellatus in Saline Groundwaters of West Texas, USA," Journal of the World Aquaculture Society, 27(4): 462-474 (1996).

Forster, R. P., et al., "Formation of excretory products," Chapter 5 of Fish Physiology, Academic Press, New York, NY, pp. 313-345 (1969).

Frenkel, Y., et al., "Hypocalciuria of Preeclampsia Is Independent of Parathyroid Hormone Level," Obstetrics & Gynecology, 77(5):689-691 (1991).

Fuleihan, G. E., et al., "Calcium Modulation of Adrenocorticotropin Levels in Women—A Clinical Research Center Study," The Journal of Clinical Endocrinology & Metabolism, 81(3): 932-936 (1996).

Gamba, G., et al., Primary Structure and Functional Expression of cDNA Encoding the Thiazide-Sensitive, Electroneutral Sodium-Chloride Cotransporter, Proc. Natl. Acad. Sci. 90:2749-2753 (1993).

Gardner, W.D., et al., "Genitourinary System." In Structure of the Human Body,(W.B. Saunders Company) pp. 365-366 (1967).

Garrett, J.E., et al., "Molecular Cloning and Functional Expression of Human Parathyroid Calcium Receptor cDNAs," The Journal of Biological Chemistry, 270(21):12919-12925 (1995).

Gatlin, D.M., et al., "Effects of dietary sodium chloride on red drum juveniles in waters of various salinities," The Prog. Fish-Culturist, 54: 220-227 (1992).

Godwin, S.L., et al., "Extracellular calcium and platelet-derived growth factor promote receptor-mediated chemotaxis in osteoblasts through different signaling pathways," J. Biol. Chem., 272(17): 11307-11312 (1997).

Grau, E.G., et al., "Lunar phasing of the thryoxin surge preparatory to seaward migration of salmonid fish," Science 211(4482): 607-609 (1981).

Gundberg, C.M., et al., "Acute changes in serum osteocalcin during induced hypocalcemia in humans," J. Clin. Endocrinology Metabolism, 72: 438-443 (1991).

Guo, L., et al., "Extracellular $Ca^{2+}$ Increases Cytosolic Free $Ca^{2+}$ in Freshly Isolated Rat Odontoblasts," J. Bone Miner Res., 14: 1357-1366 (1999).

Harmin, S. A., et al., "Plasma sex steroid profiles and the seasonal reproductive cycle in male and female winter flounder, *Pleuronectes americanus*," Marine Biology 121: 601-610 (1995).

Hedemann, L., et al., "The Familial Magnesium-losing Kidney," Acta Med Scand 219(1):133-6 (1986).

Hew, C.L., Antifreeze Protein Gene Transfer in Atlantic Salmon, Molecular Marine Biology and Biotech., 1(4/5): 309-317 (1992).

Hirano, T., "The Spectrum of Prolactin Actions in Teleosts." In Comparative Endocrinology, Developments and Directives, CL Ralph, eds., (Alan Liss, Inc.) pp. 53-61 (1986).

Hocking, P.J., "Effects of Sodium and Potassium Chlorides on the Growth and Accumulation of Mineral Ions by Cyperus Involucratus Rottb," Aquatic Botany, 21: 201-217 (1985).

Holmes, W. N., et al., "The Body Compartments and the Distribution of Electrolytes," Fish Physiology, 1: 1-88 (1969).

Honda, Y., et al., "Effects of extracellular calcium on insulin-like growth factor II in human bone cells," J. Bone Miner Res., 10: 1660-1665 (1995).

House, M.G., et al., "Expression of an extracellular calcium-sensing receptor in human bone marrow cells," J. Bone Mineral Res.: 12: 1959-1970 (1997).

Howells, G.D., et al., "Effects of Acidity, Calcium, and Aluminium on fish Survival and Productivity—A Review," J. Sci. food Agric. 34: 559-570 (1983).

Iyer, V.R., et al., "The Transcriptional Program in the Program in the Response of Human Fibroblasts to Serum," Science, 283: 83-87 (1999).

Jin, H.J., et al., "Fusion of mouse alveloar macrophages induced by 1-alpha, 25-dihydroxyvitamin D3 involves extracellular, but not intracellular, calcium," J. Cell. Physiol., 142: 434-439 (1990).

Kanatani, M., et al., "Effect of elevated extracellular calcium on the proliferation of osteoblastic MC3T3-E1 cells: its direct and indirect effects via monocytes," Biochem. Biophys. Res. Commun., 181: 1425-1430 (1991).

Kanatani, M., et al., "High extracellular Calcium Inhibits Osteoclast-like Cell formation by Directly Acting on the Calcium-Sensing Receptor Existing in Osteoclast Precursor Cells," Biochem. Biophys. Res. Commun., 261: 144-148 (1999).

Kawamura, T., and Yamashira, S., "Chemical Sensitivity of Lateral Line Organs in the Goby. Gobus Giurinus," Comp. Biochem, Physiol., 72A: 253-257 (1981).

Knox, D., et al., "Studies on the nutrition of rainbow trout (*Salmo gairdneri*)," British Journal of Nutrition, 50: 121-127 (1983).

Köhl, K.I., "The effect of NaC1 on growth, dry matter allocation and ion uptake in salt marsh and inland populations of *Armeria maritima*," The New Phytologist, 135: 213-225 (1997).

Kyodo News Service, "New 'water' allows freshwater, saltwater fish to coexist", Japan Economic Newswire (Aug. 4, 1994).

Lajeunesse, D., et al., "Regulation of osteocalcin secretion by human primary bone cells and by the human osteosarcoma cell line MG-63," Bone Miner, 14: 237-250 (1991).

Leatherland, J.F., et al., "Effect of Dietary Mirex and PCBs On Calcium and Magnesium Metabolism in Rainbow Trout, . . . ," Comparative Biochemistry and Physiology, 69C: 345-351 (1981).

Lee, Sang-Min, et al., "Influence of P, Ca, Zn, Mg, Fe, K, Mn, or Se in the Dietary Mineral Premix on Growth and Body Composition of Korean Rockfish (*Sebastes schlegeli*)," J. Korean Fish Society, Abstract in English, 31(2): 245-251 (1998).

Lonning, S., et al., "A Comparative Study of Pelagic and Demersal Eggs from Common Marine Fishes in Northern Norway," Sarsia, 73:49-60 (1988).

Looby, D., et al., "Immobilization of animal cells in porous carrier culture," Trends in Biotechnology, 8(8): 204-209 (1990).

MacLeod, M.G., "Relationships Between Dietary Sodium Chloride, Food Intake and Food Conversion in the Rainbow Trout," J. Fish Biol., 13: 73-78 (1978).

Madsen, S.S., "The Role of Cortisol and Growth Hormone in Seawater Adaptation and Development of Hypoosmoregulatory Mechanisms in Sea Trout Parr," Gen. Comp. Endocrinology, 79: 1-23 (1990).

Malgaroli, A., et al., "Control of cytosolic free calcium in rat and chicken osteoclasts. The role of extracellular calcium and calcitonin," J. Biol. Chem., 264: 14342-14349 (1989).

Marshall, W.S., "On the involvement of mucous secretion in teleost osmoregulation," Can. J. Zool., 56: 1088-1091 (1978).

Mayer-Gostan, M., et al., "Mechanisms of hormone actions on gill transport in Vertebrate Endocrinology." In Fundamental and Medical Implications, PKT Pang, et al., eds., (Academic Press) 2: 211-246 (1987).

Mount, D.R., et al., "Effect of Long-Term Exposure to Acid, Aluminum, and Low Calsium on Adult Brook Trout (*Salvelinus fontinalis*). 2. Vitellogenesis and Osmoregulation," Canadian Journal of Fisheries and Aquatic Sciences, 45(9):1633-1642 (1988).

Mykles, Donald L., "Proteolytic Processes Underlying Molt-Induced Claw Muscle Atrophy in Decapod Crustaceans." Amer. Zool., 39: 541-551 (1999).

Naito, T. et al., "Putative pheromone receptors related to the $Ca^{2+}$-sensing receptor in Fugu," Proc. Natl. Acad. Sci., 95:5178-5181 (Apr. 1998).

Naito, T., et al., "Putative pheromone receptors related to the $Ca^{2+}$-sensing receptor in Fugu," Proc. natl. Acad. Sci., 95: 5178-5181 (1998).

Nearing, J, et al., "Cloning and expression of a homologue of the calcium (Ca2+)/polyvalent cation receptor (CaR) protein that acts as a magnesium (Mg2+) sensor in dogfish shark (*Squallus acanthias*) kidney." Journal of The American Society of Nephrology, 8: 40A. (From ASN Program and Abstracts, 1997, Abstract No. A0194)(1997).

Nemeth, E.F., et al., "Calcimimetics with potent and selective activity on the parathyroid calcium receptor," Proc. Natl. Acad. Sci., 95: 4040-4045 (1998).

Nielsen, P. K., et al., "Inhibition of PTH secretion by interleukin-1 beta in bovine parathyroid glands in vitro is associated with an up-regulation of the calcium-sensing receptor mRNA," Biochem Biophys Res Commun., 238: 880-885 (1997).

Nilssen, K.J., et al., "Summer osmoregulatory capacity of the world's northermost living salmonid," Am. J. Physiol., 272: R743-R749 (1997).

Norris, D.O., "Endocrine Regulation of Iono-Osmotic Balance in Teleosts," Chapter 16 in Vertebrate Endocrinology, Lea and Fabiger, eds. (Philadelphia, PA) pp. 425-443 (1985).

Ogino, Chinkichi, and Chiou, Jiing Y., "Mineral Requirements in Fish-II Magnesium Requirement of Carp," Bulletin of the Japanese Society of Scientific Fisheries, 42(1): 71-75 (1976).

Olszak, I., et al., "Extracellular calcium elicits a chemokinetic response from monocytes in vitro and in vivo," J. Clin Invest., 105(9): 1299-1305 (2000).

Park, G., et al., "The Effects of Residual Salts and Free Amino Acids in Musid Meal on Growth of Juvenile Japanese Flounder *Paralichthys olivaceus*," Nippon Suisan Gakkaishi, 66(4):697-704 (2000). Abstract in English.

Parry, G., "Size and Osmoregulation in Salmonid Fishes," Nature, 181(4617): 1218-1219 (1958).

Plotkin, M.D., et al., "Localization of the Thiazide Sensitive NA-CL Cotransporter (TSC) in the Mammalian Kidney," J. Am. Soc. Nephrol., 6:349A Abstract No. 1717(1995).

Preston, Gregory M., "Polymerase Chain Reaction with Degenerate Oligonucleotide Primers to Clone Gene Family Members," In Methods in Molecular Biology, vol. 58: Basic DNA and RNA Protocols, A. Harwood, eds. (NJ: Humana Press Inc.) Chapter 36,pp. 303-312 (1993).

Prunet, P., et al., "Effects of growth hormone on gill chloride cells in juvenile Atlantic salmon (*Salmo salar*)," Am. J. Physiol., 266: R850-R857 (1994).

Quarles, L.D., "Cation-sensing receptors in bone: A novel paradigm for regulating bone remodeling?," J. Bone Miner. Res., 12: 1971-1974 (1997).

Quinn, S. J., et al., "The $Ca^{2+}$-sensing receptor: a target for polyamines," American Journal of Physiology, 273(4): C1315-C1323 (1997).

Quinn, S.J., et al., "Sodium and ionic strength sensing by the calcium receptor," J. Biol. Chem., 273(31): 19579-19586 (1998).

Raloff, J., "Downtown Fisheries? Advances May Make Fish Farming a Healthy Prospect, Even For Inner Cities," Science News, 157(20): 314-316 (2000).

Ramos, L.S., et al., "Urinary Calcium As an Early Marker for Preeclampsia," Obstetrics & Gynecology, 77(5):685-688 (1991).

Renfro, J. L., et al., "Water and ion transport by the urinary bladder of the teleost *Pseudopleuronectes americanus*," American Journal of Physiology, 228(1): 52-61 (1995).

Renfro. K. J., "Relationship between renal fluid and Mg secretion in a glomerular marine teleost." Am. J. Physiol 238: F92-F98 (1980).

Riccardi, D., et al., "Cloning and Functional Expression of a Rat Kidney Extracellular Calcium/Polyvalent Cation-Sensing Receptor," Proc. Natl. Acad. Sci. USA 92:131-135 (1995).

Roberts, J.M., "Prevention or Early Treatment of Preeclampsia," The New England Journal of Medicine 337:124-125 (1997).

Rogers, K. V., et al., "Localization of calcium receptor mRNA in the adult rat central nervous system by in situ hybridization," Brain Research, 744(1): 47-56 (1997).

Rokaw, M., et al., "Rapamycin(RAP) Stimulates Sodium Transport in A6 Cells Through Inhibition of Protein Kinase C (PKC), "J. Am. Soc. Nephrol 6:349A (1995).

Ruat, M., et al., "Calcium sensing receptor: Molecular cloning in rat and localization to nerve terminals," Proc. Natl. Acad. Sci., (92): 3161-3165 (1995).

Ryba, N.J., et al., "A New Multigene Family of Putative Pheromone Receptors," Neuron, 19(2):371-379 (1997).

Rydevik, Magnus, et al., "Plasma Growth Hormone Levels Increase During Seawater Exposure of Sexually Mature Atlantic Salmon Parr (*Salmo salar* L.)," General and Comparative Endocrinology, 80: 9-15 (1990).

Saksena, D.N., "Histopathology of the saccus vasculosus of the Indian freshwater goby glossogobisu giuris Ham. (Teleostei). Folia Morphol. (Praha)," 37: 249-252 (1989).

Salman, N.A., and Eddy, F.B., "Kidney Function in Response to Salt Feeding in Rainbow Trout (Salmo Gairdneri Richardson)," Comp. Biochem. Physiol., 89A(4): 535-539 (1988).

Sands, A.T., et al., "High Susceptibility to Ultraviolet-Induced Carcinogenesis in Mice Lacking XPC," Nature 377:162-165 (1995).

Sands, J. M., et al., "An extracellular calcium/polyvalent cations-sensing receptor (CaR) localized to endosomes containing aquaporin 2 water channels modulates vasopressin-elicited water permeability in rat kidney inner medullary collecting duct," J Clinical Investigation 99: 1399-1405 (1997).

Satoh, S., et al., "Effects on Growth and Mineral Composition of Carp of Deletion of Trace elements or Magnesium from Fish Meal Diet," Bulletin of the Japanese Society of Scientific Fisheries, 49(3): 431-435 (1983).

Shaw, H.M., et al., "Effect of Dietary Sodium Chloride on Growth of Atlantic Salmon (*Salmo salar*)," J. Fish. Res. Board Can., 32(10) 1813-1819 (1975).

Shearer, K.D., "Dietary potassium requirement of juvenile chinook salmon," Aquaculture, 73: 119-129 (1988).

Shehadeh, Z.H., et al., "The Role of the Intestine in Salinity Adaptation of the Rainbow Trout, Salmo Gairdneri," Comp. Biochem. Physiol., 30: 397-418 (1969.).

Simpson, J.B., et al., "Subfornical organ lesions reduce intravenous angiotensin-induced drinking," Brain Research, 88: 154-161 (1975).

Siner, J., et al., "Cloning of an Aquaporin Homologue Present in Water Channel Containing Endosomes of Toad Urinary Bladder," Am. J. Physiol. 270:C372-C381 (1996).

Smith, L.C., "Anatomy and Special Physiology of Salmonids." In Fish Medicine, M.K. Stoskopf, eds. (WB Saunders), Chapter 31: 321-327 (1993).

Spellman, P.T., et al., "Comprehensive Identification of Cell Cycle-regulated Genes of the Yeast *Saccharomyces cerevisiae* by Microarray Hybridization," Molecular Biology of the Cell, 9: 3273-3297 (1998).

Stahl, Christopher J., et al., "Optimization of Dissolved Solids for the Intensive Culture of Juvenile Red Drum *Sciaenops ocellatus*," Journal Of the World Aquaculture Society, 26(3): 323-326 (1995).

Stickney, R. R., "Nonconservative Aspects of Water Quality; Conservative Aspects of Water Quality and Physical Aspects of the Culture Environment; and Feed, Nutrition, and Growth. (Chapters 4, 5, 6." In Principles of Aquaculture, (John Wiley & Sons, Inc.), pp. 146-351 (1994).

Stradmeyer, L., "Smolts—Is feeding 'non-starters' a waste of time?," Fish Farmer, pp. 12-13 (1991).

Sugimoto, T., et al., "Effects of high calcium concentration on the functions and interactions of osteoblastic cells and monocytes and on the formation of osteoclast-like cells," J. Bone Miner Res., 8: 1445-1452 (1993).

Tacon, A.G.J., et al., "Effect of Different dietary Levels of Salt-mixtures on Growth and Body Compostion in Carp," Bulletin of the Japanese Society of Scientific Fisheries, 50(7): 1217-1222 (1984).

Targovnik, J.H., et al., "Regulation of Parathyroid Hormone Secretion in Vitro: Quantitative Aspects of Calcium and Magnesium Ion Control," Endocrinology 88:1477-1482 (1971).

Taufield, P.A., et al., "Hypocalciuria in Preeclampsia," N Engl J Med 316(12):715-718 (1987).

Usher, M.L., et al., "Effects of transfer to seawater on growth and feeding in Atlantic salmon smolts(*Salmo salar* L.)," Aquaculture, 94: 309-326 (1991).

Usher, M.L., et al., "Intestinal Water Transport in Juvenile Atlantic Salmon (*Salmo salar* L.) During Smolting and Following Transfer to Seawater," Comp. Biochem. Physiol., 100A(4): 813-818 (1991).

Van Der Velden, J.A., et al., "Growth rate and tissue magnesium concentration in adult freshwater tilapia, *Oreochromis mossambicus* (Peters), fed diets differing in magnesium content," Journal of Fish Biology, 39: 83-91 (1991).

Veillette, P.A., et al., "Cortisol Mediates the Increase in Intestinal Fluid Absorption in Atlantic Salmon During Parr-Smolt Transformation," General and Comparative Endocrinology, 97: 250-258 (1995).

Veldhuis, J. D., et al., "Divergent Influences of Calcium Ions on Releasing Factor-Stimulated Anterior Pituitary Hormone Secretion in Normal Man," Journal of Clinical Endocrinology and Metabolism, 59(1): 56-61. (1984).

Walton, M. J., et al., "The effects of dietary tryptophan levels on growth and metabolism of rainbow trout (*Salmo gairdneri*)," The British Journal of Nutrition 51: 279-287 (1984).

Ward, D. T., et al., "Disulfide Bonds in the Extracellular Calcium-polyvalent Cation Sensing Receptor Mediate Dimer Formation and its Response to Divalent Cations in Vitro," J. Biol. Chem. 273(23): 14476-14483 (1998).

Weatherley, A.H., et al., "Growth." In Physiological Ecology of Pacific Salmon, Groot, C. et al., eds. (UBC Press/Vancouver), pp. 103-158 (1995).

Wendalaar Bonga, S., et al., "Pituitary hormones, in Vertebrate Endocrinology." In Fundamentals and Biochemical Implications, 3: 105-124 (1989).

Wendelaar Bonga, S., et al., "Control of Calcium regulating hormones in vertebrates: parathyroid hormone, calcitonin, prolactin and stanniocalcin," Int. Rev. Cytol., 128: 139-149 (1991).

Wendelaar Bonga, S., et al., "The Stress Response in Fish," Physiological Reviews, 77(3): 591-625 (1997).

Wendelarr Bonga, S. E. W., et al., "Endocrinology, Chapter 15." In The Physiology of Fishes, DH. Evans, eds., (CRC Press Inc.) pp. 469-534 (1993).

Wenning, A., "Sensing effectors make sense," Trends Neurosci., 22(12):550-555 (1999).

Williams, S., et al., "A comparison of underyearling growth and smoltification between hatchery reared Maine landlocked Atlantic salmon, *Salmo salar*, and a commercially available strain of Norwegian *Salmo salar*." World Aquaculture Association Book of Abstracts, p. 584(1998).

Willoughby, S., "Production Life Cycle." In Manual of Salmonid Farming. Blackwell Science Ltd., eds., (Fishing News Books), pp. 82-122 (1999).

Xu, B., et al., "Osmoregulatory Actions of Growth Hormone In Juvenile Tilapia (*Oreochromis niloticus*)," Fish Physiology and Biochemistry, 17: 295-301 (1997).

Yamagami, K., et al., "Molecular and Cellular Basis of Formation, Hardening, and Breakdown of the Egg Envelope in Fish," International Review of Ctyology, 136:51-92 (1992).

Yamaguchi, T., et al., "Expression of extracellular calcium ($Ca2+o$)-sensing receptor in human peripheral blood monocytes," Biochem. Biophys. Res. Commun., 246: 501-506 (1998).

Yamaguchi, T., et al., "Extracellular Calcium ($Ca2+_o$)-sensing Receptor in a Murine Bone Marrow-Derived Stromal Cell Line (ST2): Potential Mediator of the Actions of $Ca2+_o$ on the Function of ST2 Cells," Endocrinology, 139: 3561-3568 (1998).

Yamaguchi, T., et al., "Extracellular calcium ($Ca2+o$)-sensing receptor in a mouse monocyte-macrophage cell line (J774): Potential mediator of the actions of $Ca2+o$ on the function of J774 cells," J Bone Miner Res., 13: 1390-1397 (1998).

Yamaguchi, T., et al., "Mouse osteoblastic cell line (MC3T3-E1) expresses extracellular calcium ($Ca2+o$)-sensing receptor and its agonists stimulate chemotaxis and proliferation of MC3T3-E1 cells," J Bone Miner Res., 13: 1530-1538 (1998).

Yamaguchi, Toru, et al., "G Protein-Coupled Extracellular $Ca^{2+}$ ($Ca^{2+o}o$)-Sensing Receptor (CaR): Roles in Cell Signaling and Control of Diverse Cellular Functions." In Advances in Pharmacology,Hormones and Signaling, Bert w. O'Malley, et al., eds. (Academic Press) 48: 209-253 (2000).

Yanez, J. R., et al., "The neuronal system of the saccus vasculosus of trout (*Salmo trutta fario* and *Oncorhynchus mykiss*): an immunocytochemical and nerve tracing study," Cell Tissue Res., 288: 497-507 (1997).

Young, B., et al., "Smoltification and seawater adaption in coho salmon (*Oncorhynchus kisutsch*): plasma prolactin, growth hormone thryoid hormones and coritsol," Gen. Comp. Endocrinology, 74: 335-345 (1989).

Zadunaisky, J.A., et al., "Osmolarity and Cell volume Changes of Chloride Cells: The Nature of the Rapd signal for Adaptation to Salinities of Fundulus Heteroclitus," Biological Labs, 32: 152-156 (1995).

Zaidi, M., et al., "Emerging insights into the role of calcium ions in osteoclast regulation," J. Bone Miner Res., 14: 669-674 (1999).

Zaugg, W.S., et al., "Changes in Gill adenosine-triphosphatase activity associated with parr-smolt transformation in stellhead trout, coho and spring chinook salmon," J.. Fish. Res. Bd. Can., 29(2): 167-171 (1972).

Zaugg, W.S., et al., "Increased Seawater Survival And Contribution To The Fishery of Chinook Salmon (*Oncorhynchus tshawytscha*) By Supplemental Dietary Salt," Aquaculture, 32: 183-188 (1983).

* cited by examiner

```
                  10          20          30          40          50          60          70          80
SEQ ID NO: 1 CCTGACAATATTCGCAGTGCTGGGAGTCTTGCTGACGGCCCTTCGTCCTAGGGGTGTTGCCGATTCCGCAACACTCCCA
SEQ ID NO: 2    LeuThrIlePheAlaValLeuGlyValLeuLeuThrAlaPheValLeuGlyValPheAlaArgPheArgAsnThrPro>
                 [------------------------------TRANSLATION OF COD [A]----------------------------->

90         100         110         120         130         140         150         160
             TCGTGAAGGCCACCAACCGGGAGTGTCCTACCCCTCCTCTTCCCTGGTCTGCTGTCTTCCAGTCTCTTATGTTC
                IleValLysAlaThrAsnArgGluLeuArgLeuSerTyrLeuLeuLeuPheSerLeuValCysCysPheSerSerLeuMetPhe>
                 [------------------------------TRANSLATION OF COD [A]----------------------------->

170         180         190         200         210         220         230         240
             ATCGGTGAACCCCAGGACTGACGTGCCGCCAGCGCCTTCGGATCAGTTCGTCCTGCATCTCCTGCAT
                IleGlyGluProGlnAspTrpProGlnThrCysArgLeuArgGlnProAlaPheGlyIleSerPheValLeuCysIleSerCysIle>
                 [------------------------------TRANSLATION OF COD [A]----------------------------->

250         260         270         280         290         300         310         320
             CCTGGTCAAGACCAACCGGGTCTTCGAGGCCAAGATCCCACCAGTCTCCACCGAAGTGGTGGGCTGA
                LeuValLysThrAsnArgValLeuLeuValPheGluAlaLysIleProThrSerLeuHisArgLysTrpTrpGlyLeu>
                 [------------------------------TRANSLATION OF COD [A]----------------------------->

330         340         350         360         370         380         390         400
             ACCTGCAGTTCTGCTGGTGTTCCTGTCACCTTCGTCCAGTGATGATTTGCTGGTCTGGCTCTACAACGCCCCGCCG
                AsnLeuGlnPheLeuLeuLeuValPheLeuCysThrPheValGlnValMetIleCysValValTrpLeuTyrAsnAlaProPro>
                 [------------------------------TRANSLATION OF COD [A]----------------------------->
```

FIG. 1A

```
              410        420        430        440        450        460        470        480
SEQ ID NO: 1  GCCAGCTTCCAAGAACCACGACATCGATGAGATCATCTTCATCACCTGCAACGAGGGCTTCCATGATGGCCCTGGGCTTTCT
SEQ ID NO: 2  AlaSerLysAsnHisAspIleAspGluIleIlePheIleThrCysAsnGluGlySerMetMetAlaLeuGlyPheLeu>
              ──────────────────────────TRANSLATION OF COD [A]──────────────────────────────>

490        500        510        520        530        540        550        560
              GATCGGCTACACCTGTCTCCTTGCCGCCATTTGCTTCTTCGCGTTCAAATCGCGAGAACTTCCCGGAGAACTTCACAG
              IleGlyTyrThrCysLeuLeuAlaAlaIleCysPhePhePheAlaPheLysSerArgLysLeuProGluAsnPheThr>
              ──────────────────────────TRANSLATION OF COD [A]──────────────────────────────>

570        580        590
              AGGCGAAGTTCATCACGTTTAGCATGCTGATATT
              GluAlaLysPheIleThrPheSerMetLeuIleXxx>
              ──────TRANSLATION OF COD [A]────>
```

FIG. 1B

SEQ ID NO: 3
SEQ ID NO: 4

```
         10        20        30        40        50        60        70        80
CCTGACAATATTCGCAGTGCTGGGAGTCTTGCTGACGGCCTTCGTCCTAGGGGTGTTTGCCCGATTCCGCAACACTCCA
 LeuThrIlePheAlaValLeuGlyValLeuLeuThrAlaPheValLeuGlyValPheAlaArgPheArgAsnThrPro>
 _____TRANSLATION OF HADDOCK [A]_____)

90       100       110       120       130       140       150       160
TCGTGAAGGCCACCAACCGGGRGCTGTCCTACCTCCTCCTCTTCCCTGGTCTGCTTCTCCAGCTCTCTAATGTTC
 IleValLysAlaThrAsnArgXxxLeuSerTyrLeuLeuLeuPheSerLeuValCysPheSerSerLeuMetPhe>
 _____TRANSLATION OF HADDOCK [A]_____)

170       180       190       200       210       220       230       240
ATCGGCGAACCCCAGGACTGGACGTGCCGTCGCAGTGCCGGCCTTCGGGATCAGCTTCGTCCTTCTGCATCTCCTGCAT
 IleGlyGluProGlnAspTrpThrCysArgLeuArgGlnProAlaPheGlyIleSerPheValLeuCysIleSerCysIle>
 _____TRANSLATION OF HADDOCK [A]_____)

250       260       270       280       290       300       310       320
CCTGGTCAAGACCAACCGGCTGCGTCTTCGAGGCAAGATCCCAAGATCCCAAGATCTTCCACCGCAAGTGTGGGCCTGA
 LeuValLysThrAsnArgValLeuLeuValPheGluAlaLysIleProThrSerLeuHisArgLysArgLysTrpGlyLeu>
 _____TRANSLATION OF HADDOCK [A]_____)
```

FIG. 2A

```
                     330        340        350        360        370        380        390        400
SEQ ID NO: 3  ACCTGAGTTCCTGCTGGTGTTCCTGTGCACCTTCGTCGTCCAGGTGATGATTTGYGTGGTGCTGGCTCTACAACGCCCCGCCG
SEQ ID NO: 4  AsnLeuGlnPheLeuLeuValPheLeuCysThrPheValMetIleCysValValTrpLeuTyrAsnAlaProPro>
              _____TRANSLATION OF HADDOCK [A]_____>

410        420        430        440        450        460        470        480
              GCCAGCTCCAAGAACCACGACATTGATGAGATCATCTTCATCACCTGCAACGAGGGCTCCATGATGGCCCTGGGCTTTCT
              AlaSerSerLysAsnHisAspIleAspGluIleIlePheIleThrCysAsnGluGlySerMetMetAlaLeuGlyPheLeu>
              _____TRANSLATION OF HADDOCK [A]_____>

490        500        510        520        530        540        550        560
              GATCGGCTACACCTGTCTCCTCGCCGCCATTGCTTCTTCGGTTCAAATCGGCGAAACTCCGGAGAACTTCACAG
              IleGlyTyrThrCysLeuLeuAlaAlaIleCysPhePheAlaPheLysSerArgLysLeuProGluAsnPheThr>
              _____TRANSLATION OF HADDOCK [A]_____>

570        580        590
              AGGCGAAGTTCATCACGTTCAGCATGCTGATATT
              GluAlaLysPheIleThrPheSerMetLeuIleXxx>
              ___TRANSLATION OF HADDOCK [A]_____>
```

FIG. 2B

```
           10        20        30        40        50        60        70        80
SEQ ID NO: 5  GCTGACAATATTCCGCTGCTCGGCCTGGTCGTGCTCACAGCCTTCGTCGTTGTCCGATTCCGCAACACTCCCA
SEQ ID NO: 6  LeuThrIlePheAlaValLeuGlyValValLeuThrAlaPheValMetGlyValPheValArgPheArgAsnThrPro>
              [_____TRANSLATION OF HAKE [A]_____]

90       100       110       120       130       140       150       160
              TCGTGAAGGCCACCAACAGGAGCTGTCCTACCTGTCCTCCCTCTGTCCTGTTCTCCAGTCCTCCAGCTCCTCATGTTC
              IleValLysAlaThrAsnArgGluLeuProTyrLeuLeuLeuPheSerLeuValCysPheSerSerLeuMetPhe>
              [_____TRANSLATION OF HAKE [A]_____]

170       180       190       200       210       220       230       240
              ATCGGCGAACCGGAGGACTGGACGTGCCGCCTCCGCCAGCGGCATCAGTTCGTTCTCCTCCTGCATCTCCTGCAT
              IleGlyGluProGlnAspTrpThrCysArgLeuArgGlnProAlaPheGlyIleSerPheValLeuCysIleSerCysIle>
              [_____TRANSLATION OF HAKE [A]_____]

250       260       270       280       290       300       310       320
              CTTGGTCAAGACCAACCGCGTGCTGCTCTTCGAGGCCAAGATCCCCACCAGCTTCACCGAAGTGGTGGGGCTTGA
              LeuValLysThrAsnArgValLeuLeuValPheGluAlaLysIleProThrSerLeuHisArgLysTrpGlyLeu>
              [_____TRANSLATION OF HAKE [A]_____]
```

FIG. 3A

```
                     330       340       350       360       370       380       390       400
              ACCTGCAGTTCCTGCTGGTGTTCCTGTGCACCTTTGTTCCAGGTGATGATCTGCTGGTGGCTGTGTTGGCTGTACAACGCCCCGCCG
SEQ ID NO: 5
SEQ ID NO: 6  AsnLeuGlnPheLeuLeuValPheLeuCysThrPheValGlnValMetIleCysValValTrpLeuTyrAsnAlaProPro>
              |--------------------------------TRANSLATION OF HAKE [A]---------------------------------->

410       420       430       440       450       460       470       480
              GCCAGTTCCAAGAACCACGACATCGATGAGATCATCTTCATCACCTGCAACGAGGGCTCCATGATGGCCCTGGGCTTTCT
              AlaSerSerLysAsnHisAspIleAspGluIleIlePheIleThrCysAsnGluGlySerMetMetAlaLeuGlyPheLeu>
              |--------------------------------TRANSLATION OF HAKE [A]---------------------------------->

490       500       510       520       530       540       550       560
              GATCGGCTACACTTGCATCCTCGCGCTATCTGCTTCTTCCGCTTCAAGTCGGCAAACTCCCCGAGAACTTCACGG
              IleGlyTyrThrCysIleLeuAlaLeuAlaIleCysPhePheAlaPheLysSerArgLysLeuProGluAsnPheThr>
              |--------------------------------TRANSLATION OF HAKE [A]---------------------------------->

570       580       590
              AGGCCAAGTTCATCACGTTCAGCATGCTGATATT
              GluAlaLysPheIleThrPheSerMetLeuIleXxx>
              |--------TRANSLATION OF HAKE [A]-------->
```

FIG. 3B

```
              10        20        30        40        50        60        70        80
     GTTGACCATATGTGCGGGCTGGGTGTTGCCTTGACAGGCTTCGTGATGGCCGTCTTTGTCAGATTCCGCAACACCCCA
SEQ ID NO: 7 LeuThrIleCysAlaAlaLeuGlyValAlaLeuThrGlyPheValMetAlaValPheValArgPheArgAsnThrPro>
SEQ ID NO: 8 -----------------------TRANSLATION OF HALIBUT [A]---------------------->

90       100       110       120       130       140       150       160
     TAGTGAAGGCCACGAACCGAGAACTGGAAGACGAACTAGAACCGAGAACTGGAAGACGAACTTGCCTTCTCCAGTCCTCCATCTTC
     IleValLysAlaThrAsnArgGluLeuLeuSerTyrValLeuLeuPheSerLeuIleCysCysPheSerSerLeuIlePhe>
     ----------------------TRANSLATION OF HALIBUT [A]---------------------->

170       180       190       200       210       220       230       240
     ATAGGAGAGCCGGAGGATTGGATGTGCCGCTTACGCCAACCTGCCTTTGGGATCAGTTTGTTCTCTGTATCTCGTGCAT
     IleGlyGluProGlnAspTrpMetCysArgLeuArgLeuArgGlnProAlaPheGlyIleSerPheValLeuCysIleSerCysIle>
     ----------------------TRANSLATION OF HALIBUT [A]---------------------->

250       260       270       280       290       300       310       320
     CCTTGTCAAAACAAACAGAGTCCTCTTGGTGTTTGAAGCCAAGATCCCTACAAGTCTCCATCGTAAAYGGTGGGGGTTAA
     LeuValLysThrAsnArgValLeuLeuValPheGluAlaLysIleProThrSerLeuHisArgLysXxxTrpGlyLeu>
     ----------------------TRANSLATION OF HALIBUT [A]---------------------->
```

FIG. 4A

```
                    330        340        350        360        370        380        390        400
SEQ ID NO: 7  RCCTACAGTTCCTGCTGGTGTTTCTGTGCACAAGTCATGATATGTGTTGGTCTGGCTGTACAACGCCCCACCT
SEQ ID NO: 8  XxxLeuGlnPheLeuLeuValPheLeuCysThrPheValGlnValMetIleCysValValTrpLeuTyrAsnAlaProPro>
              _____TRANSLATION OF HALIBUT [A]_____>

410        420        430        440        450        460        470        480
              TCCAGTTACAGGAATTATGACATAGAGATGATGATTTTTATCACATGTAACGAGGGCTCTGTAATGGCTCTTGGGTTTCT
              SerSerTyrArgAsnTyrAspIleAspIleAspGluMetIlePheIleThrCysAsnGluGlySerValMetAlaLeuGlyPheLeu>
              _____TRANSLATION OF HALIBUT [A]_____>

490        500        510        520        530        540        550        560
              TATTGGCTATACATGCCTGCTGGCCGCTATAYGTTCTTCTTGCGTTTAAATCACGAAACTTCCAGAAAACTTCACAG
              IleGlyTyrTyrCysLeuLeuLeuAlaAlaIleXxxPhePheAlaPheLysSerArgLysLeuProGluAsnPheThr>
              ___TRANSLATION OF HALIBUT [A]_____>

570        580        590
              AGGCTAAGTTCATCACTTTTAGTATGCTCATATT
              GluAlaLysPheIleThrPheSerMetLeuIleXxx>
              ___TRANSLATION OF HALIBUT [A]_____>
```

FIG. 4B

```
           10         20         30         40         50         60         70         80
SEQ ID NO: 9  TTTGGCCATATGTGCAGTGCTTGCTTGTGTTGTCTTGACAGTTTTGTAATGGGAGTATTTGTCAGATTTGTCAACACCCAA
SEQ ID NO: 10    LeuAlaIleCysAlaValLeuGlyValValLeuThrAlaPheValMetGlyValPheValArgPheArgAsnThrPro>
                 --------------------------TRANSLATION OF MACKEREL [A]--------------------------->

90        100        110        120        130        140        150        160
              TAGTGAAGGCCACAAACCGGGAACTATCGTACGTCCTCCTGTTCTCACTTATCTGCTGCTTCTCCAGTCTCTCATCTTC
                 IleValLysAlaThrAsnArgGluLeuSerTyrValLeuLeuPheSerLeuIleCysCysPheSerSerLeuIlePhe>
                 --------------------------TRANSLATION OF MACKEREL [A]--------------------------->

170        180        190        200        210        220        230        240
              ATCGGAGAGCCAAAGGATTGGATGTGCCGTTTGCCGACAACCTGCCTTTGGGATCAGTTTGTTCTGTATCTCCTGTAT
                 IleGlyGluProLysAspTrpMetCysArgLeuArgGlnProAlaPheGlyIleSerPheValLeuCysIleSerCysIle>
                 --------------------------TRANSLATION OF MACKEREL [A]--------------------------->

250        260        270        280        290        300        310        320
              CCTTGTGAAAACTAACAGAGTCCTTTGGTTTTGAAGTAAGATCCAACAAGTCTCCACCGTAAATGGTGGGATTAA
                 LeuValLysThrAsnArgValLeuLeuValPheGluAlaLysIleProThrSerLeuHisArgLysTrpGlyLeu>
                 --------------------------TRANSLATION OF MACKEREL [A]--------------------------->
```

FIG. 5A

```
        330        340        350        360        370        380        390        400
ACCTGCAGTTCTTTGGTGTTTCTCTGCACATTTGTTGTCCAAGTAATGATATGTGTGGTTTGGCTTTGGCTTTACAACGCCCTCCT
AsnLeuGlnPheLeuLeuValPheLeuCysThrPheValGlnValMetIleCysValValTrpLeuTyrAsnAlaProPro>
                         ─────TRANSLATION OF MACKEREL [A]──────────────────────────>

410        420        430        440        450        460        470        480
TCCAGTTATATGATCCATGACATTGATGAGATAATTTTATCACCTGAATGCAATGAGGGCTCTGTGATGGCTCTTGGCTTTCT
SerSerTyrMetIleHisAspIleAspGluIleIlePheIleThrCysAsnGluGlySerValMetAlaLeuGlyPheLeu>
                         ─────TRANSLATION OF MACKEREL [A]──────────────────────────>

490        500        510        520        530        540        550        560
TATTGGCTACACCTGCCTCCTGGCAGTATATGTTTCTTCTTTGCATTTAAATCACGAAAACTTCCAGAAAACTTTACAG
IleGlyTyrThrCysLeuLeuAlaAlaIleCysPhePhePheAlaPheLysSerArgLysLeuProGluAsnPheThr>
                         ─────TRANSLATION OF MACKEREL [A]──────────────────────────>

570        580        590
AAGCCAAGTTCATCACTTTTAGCATGCTCATATT
GluAlaLysPheIleThrPheSerMetLeuXxx>
───TRANSLATION OF MACKEREL [A]────>
```

SEQ ID NO: 9
SEQ ID NO: 10

FIG. 5B

SEQ ID NO: 11
SEQ ID NO: 12

```
         10        20        30        40        50        60        70        80
CCTGACAATATTCGCAGTGCTAGGAGTCTTGCTGACAGCCTTCGTCTGACAGCCTTCGTCTGGGGTGTTCGCCGATTCCGTAACACTCCAA
 LeuThrIlePheAlaValLeuGlyValLeuLeuThrAlaPheAlaArgPheAlaArgPheAlaArgPheArgAsnThrPro>
                                  ----TRANSLATION OF POLLOCK [A]----

90       100       110       120       130       140       150       160
TTGTGAAGGCCACCAACCGGAGCTGTCCTACCTCCTCTCCCTGTCTGCTGCTTCCAGCTCTCTAATGTTC
 IleValLysAlaThrAsnArgGluLeuLeuSerTyrLeuLeuLeuPheSerLeuValCysCysPheSerSerLeuMetPhe>
                                  ----TRANSLATION OF POLLOCK [A]----

170       180       190       200       210       220       230       240
ATCGGCGAACCCCAGGACTGGACCCAGCGTCTGCCGCCAGCCAGGATCAGTTCGTTCCTCTGATCAGTTCGTTCCTCTGATCTCCTGCAT
 IleGlyGluProGlnAspTrpThrCysArgLeuArgGlnProAlaPheGlyIleSerPheValLeuCysIleSerCysIle>
                                  ----TRANSLATION OF POLLOCK [A]----

250       260       270       280       290       300       310       320
CCTGGTCAAGACCAACCGGTGCTCTCGTCTTCGAGGCCAAGATCCCACCAGTCCACCGCAAGTGGTGGGGCCTGA
 LeuValLysThrAsnArgValLeuValLeuValPheGluAlaLysIleProThrSerLeuHisArgLysTrpGlyLeu>
                                  ----TRANSLATION OF POLLOCK [A]----
```

FIG. 6A

```
                330       340       350       360       370       380       390       400
SEQ ID NO: 11   ACCTGCAGTTCCTGCTGGTTGTTCCTGTGCACCTTCGTCCAGGTGATGATTTGCGTGGTCTGGCTCTACAACGCCCCGCCG
SEQ ID NO: 12   AsnLeuGlnPheLeuLeuValPheLeuCysThrPheValGlnValMetIleCysValValTrpLeuTyrAsnAlaProPro>
                ------------------------------------ TRANSLATION OF POLLOCK [A] ------------------>

410       420       430       440       450       460       470       480
                GCCAGCTCCAAGAACCACAGCATCGATGAGATCATTCACCTTCATCACCTGCAACGAGGGCTCCATGATGGCCCTGGCTTTCT
                AlaSerSerLysAsnHisAspIleAspGluIleIlePheIleThrCysAsnGluGlySerMetMetAlaLeuGlyPheLeu>
                ------------------------------------ TRANSLATION OF POLLOCK [A] ------------------>

490       500       510       520       530       540       550       560
                GATCGGCTACACCTGTCTCCTCGCCGCCATTGCTTGCTTCTTCGGTTCAAATCGGCAAACTCCCGAGAACTTCACAG
                IleGlyTyrThrCysLeuLeuAlaAlaIleAlaCysPhePhePheAlaPheLysSerArgLysLeuProGluAsnPheThr>
                ------------------------------------ TRANSLATION OF POLLOCK [A] ------------------>

570       580       590
                AGGCGAAGTTCATCACGTTCAGCATGCTGATATT
                GluAlaLysPheIleThrPheSerMetLeuIleXxx>
                ---- TRANSLATION OF POLLOCK [A] ---->
```

FIG. 6B

```
                 10        20        30        40        50        60        70        80
SEQ ID NO: 13 TTTGGCCATATGTGCAGTACTGGGTGGTGTGGTCATGACAGCGTTTGTGATGGAGTCTTTGTCAGATTTCGCAACACCCAA
SEQ ID NO: 14  LeuAlaIleCysAlaValLeuGlyValValMetThrAlaPheValMetGlyValPheValArgPheArgAsnThrPro>
              |----------------------------TRANSLATION OF SEA BASS [A]------------------------|

90       100       110       120       130       140       150       160
              TAGTGAAGACCACAAACCGAGAACTGTCCTACGTCCTCCTATTCTCACTGATCTCTGCTCTTCCCAGTCCCTCGTCTTC
               IleValLysThrThrAsnArgGluLeuSerTyrValLeuLeuPheSerLeuIleCysCysPheSerSerLeuValPhe>
              |---------------------------TRANSLATION OF SEA BASS [A]-------------------------|

170       180       190       200       210       220       230       240
              ATTGGAGAGCCACAGGATTGGACATGTCGTTTACGTCAACCTGCTTTGGTATCAGCTTTGTTCTCTGTATCCTCGCAT
               IleGlyGluProGlnAspTrpThrCysArgLeuArgGlnProAlaPheGlyIleSerPheValLeuCysIleSerCysIle>
              |---------------------------TRANSLATION OF SEA BASS [A]-------------------------|

250       260       270       280       290       300       310       320
              CCTTGTGAAAACAAACAGAGTACTTTTGGTATTTGAAGCTAAGATCCCACAAGTCTCCATCGTAAATGGTGGGATTGA
               LeuValLysThrAsnArgValLeuLeuValPheGluAlaLysIleProThrSerLeuHisArgLysTrpTrpGlyLeu>
              |---------------------------TRANSLATION OF SEA BASS [A]-------------------------|
```

FIG. 7A

```
                  330        340        350        360        370        380        390        400
         ACCTGCAGTTCCTGCTGGTGTTCTGCACATTTGTCCAAGTCATGATATGTGTGGCTTTACAACGCCCCTCCT
         AsnLeuGlnPheLeuValPheLeuCysThrPheValGlnValMetIleCysValValTrpLeuTyrAsnAlaProPro>
         —————————————————————TRANSLATION OF SEA BASS [A]——————————————————————————

410        420        430        440        450        460        470        480
         TCCAGCTACAGGAATCACGACATTGATGAAATCATTTTATCACCTGCAATGAGGATCTGTGATGGCTCTTGGTTTCT
         SerSerTyrArgAsnHisAspIleAspGluIleIleIleTyrHisLeuGlnMetArgIleCysAspGlySerTrpPheLeu>
         ————————————————————————TRANSLATION OF SEA BASS [A]—————————————————————————

490        500        510        520        530        540        550        560
         TATTGGCCACACGTGCCTCCTGGCAGCTATATGTTTTTCTTTGCATTCAAATCTCGGAAACTTCCAGAAACTTTACAG
         IleGlyHisThrCysLeuLeuAlaAlaIleCysPhePhePheAlaPheLysSerArgLysLeuProGluAsnPheThr>
         —————————TRANSLATION OF SEA BASS [A]————————————————————————————————

570        580        590
         AGGCAAAGTTCATCACCTTTAGCATGCTAATATT
         GluAlaLysPheIleThrPheSerMetLeuIleXxx>
         ———TRANSLATION OF SEA BASS [A]——————>
```

SEQ ID NO: 13
SEQ ID NO: 14

FIG. 7B

```
SEQ ID NO: 15           10         20         30         40         50         60         70         80
          CTTGGCATTATGCTCTGTGCTGGGGTATTCTTGACAGCATTCGTGATGGGAGTGTTTATCAAATTTCGCAACACCCAA
SEQ ID NO: 16  LeuAlaLeuCysSerValLeuGlyValPheLeuThrAlaPheLeuValMetGlyValPheIleLysPheArgAsnThrPro>
               ------------------------------TRANSLATION OF SWORDFISH [A]--------------------------->

90        100        110        120        130        140        150        160
          TTGTTAAGGCCACAAACAGAGAGCTATCCTACCTCCCTGTTCTCACTCATCTGCTGTTTCTCCAGTTCCCTCATCTTC
          IleValLysAlaThrAsnArgGluLeuSerTyrLeuLeuLeuPheSerLeuIleCysCysPheSerSerLeuIlePhe>
               ------------------------------TRANSLATION OF SWORDFISH [A]--------------------------->

170        180        190        200        210        220        230        240
          ATTGGTGAACCCCAGGACTGGACATGCCGTACGGCCAGCCTGCATTCGGGATAAGTTTGTTCTCTGCATCTCCTGCAT
          IleGlyGluProGlnAspTrpThrCysArgLeuArgGlnProAlaPheGlyIleSerPheValLeuCysIleSerCysIle>
               ------------------------------TRANSLATION OF SWORDFISH [A]--------------------------->

250        260        270        280        290        300        310        320
          CCTGGTAAAAACTAACCGAGTACTTCTAGTGTTCGAAGCCAAGATCCCCACCAGTCCCATCGTAAGTGGTGGGGCTAA
          LeuValLysThrAsnArgValLeuLeuValPheGluAlaLysIleProThrSerLeuHisArgLysTrpGlyLeu>
               ------------------------------TRANSLATION OF SWORDFISH [A]--------------------------->
```

FIG. 8A

```
              330        340        350        360        370        380        390        400
       ACTTGGAGTTCCTGTTAGTGTTCCTGTTCACATTTGTGCAAGTGATGATATGTGTGGTCTGGCTTACAATGCTCCTCCG
SEQ ID NO: 15
SEQ ID NO: 16  AsnLeuGlnPheLeuLeuValPheLeuPheThrPheValGlnValMetIleCysValValTrpLeuTyrAsnAlaProPro>
              |_____TRANSLATION OF SWORDFISH [A]_____|

410        420        430        440        450        460        470        480
       GCGAGCTACAGGAGAACCATGACATTGATGAGATAAATTTCATTACATGAATGAGGGCTCTATGATGGCGCTTGGCTTCCT
       AlaSerTyrArgAsnHisAspIleAspGluIleIlePheIleThrCysAsnGluGlySerMetMetAlaLeuGlyPheLeu>
              |_____TRANSLATION OF SWORDFISH [A]_____|

490        500        510        520        530        540        550        560
       AATTGGGTACACATGCCTGCTGGCCAGCCATATGCTTCTTCTTTGCATTTAAATCACGAAAACTGCCAGAGAACTTTACTG
       IleGlyTyrThrCysLeuLeuAlaAlaIleCysPhePheAlaPheLysSerArgLysLeuProGluProGluAsnPheThr>
              |_____TRANSLATION OF SWORDFISH [A]_____|

570        580        590
       AGGCTAAGTTCATCACCTTCAGCATGCTCATCTT
       GluAlaLysPheIleThrPheSerMetLeuIleXxx>
              |_____TRANSLATION OF SWORDFISH [A____]_____>
```

FIG. 8B

```
                10         20         30         40         50         60         70         80
SEQ ID NO: 17  TTTGGCCATATGTGCAGTGCTGGGTGTGCTTGACAGTTTTGTAATGGAGTGTTGTCAGATTTCGCAACACCCCAA
SEQ ID NO: 18  LeuAlaIleCysAlaValLeuGlyValValThrAlaPheValMetGlyValPheValArgPheArgAsnThrPro>
                                            ----TRANSLATION OF TUNA [A]----

90        100        110        120        130        140        150        160
TAGTGAAGGCCACAAACCGAGAACTGTCTTCTTGCTGTTCTCACTTATCTGTTGCTTCTCCAGTCTCTCCATCTTC
IleValLysAlaThrAsnArgGluLeuLeuSerTyrValLeuLeuPheSerLeuIleCysCysPheSerSerLeuIlePhe>
                                            ----TRANSLATION OF TUNA [A]----

170        180        190        200        210        220        230        240
ATCGGAGAGCCGAAGGATTGGATGTGCCGTTTGCGCCAACCTGCCTTTGGGATCAGTTTGTTCTTTGTATTTCCTGCAT
IleGlyGluProLysLysAspTrpMetCysArgLeuArgLeuGlnProAlaPheGlyIleSerPheValLeuCysIleSerCysIle>
                                            ----TRANSLATION OF TUNA [A]----

250        260        270        280        290        300        310        320
CCTTGTGAAAACAAATAGAGTGCTTTTGGTATTTGAAGCCAAGATCCAACAAGTCTCCACCGTAAATGGTGGGATTAA
LeuValLysThrAsnArgValLeuLeuValPheGluAlaLysIleProThrSerLeuHisArgLysTrpGlyLeu>
                                            ----TRANSLATION OF TUNA [A]----
```

FIG. 9A

```
            330        340        350        360        370        380        390        400
SEQ ID NO: 17  ACCTGCAGTTCTTTTGGTGTTCTCTGCACATTTGTCCAAGTAATGATATGTGGTCTGGCTTTACAATGCCCTCCT
SEQ ID NO: 18  AsnLeuGlnPheLeuCysThrPheValGlnValMetIleCysValValTrpLeuTyrAsnAlaProPro>
               _____TRANSLATION OF TUNA [A]_____

410        420        430        440        450        460        470        480
          TCCAGCTATATGAACCATGACATTGATGAGATTATTTTATCACCTGCAACGAGGGCTCTGTGATGGCTCTTGGTTTCT
          SerSerTyrMetAsnHisAspIleAspGluIleIleIleTyrHisLeuGlnArgGlyLeuCysAspGlySerTrpPheLeu>
          SerSerTyrMetAsnHisAspIleAspGluIleIleHisLeuGlnArgGlySerValMetAlaLeuGlyPheLeu>
          _____TRANSLATION OF TUNA [A]_____

490        500        510        520        530        540        550        560
          TATCGGCTACACGTGCCTCCTGGGCGCTATAGTTTCTCTTTGCATTTAAATCACGAAAACTTTACAG
          IleGlyTyrThrCysLeuLeuAlaAlaIleCysPhePheAlaPheLeuSerArgLysLeuProGluAsnPheThr>
          _____TRANSLATION OF TUNA [A]_____

570        580        590
          AGGCTAAGTTCATCACTTTTAGCATGCTCATATTTA
          GluAlaLysPheIleThrPheSerMetLeuIlePheXxx>
          ____TRANSLATION OF TUNA [A]_____
```

FIG. 9B

```
ccacgcgtcc gggagatggt caggagaaac atcacagatc gcatttggct agccagcgaa   60
gcgtgggcca gctcttccct tattgccaaa ccagagtatc ttgacgttgt ggcaggaact  120
attggctttg ctctgaaggc aggggtata ccaggcttta gggagttctt acaacatgtc  180
caaccaaaga aagacagtca taatgaattt gtcagggagt tttgggaaga aaccttcaac  240
tgttatctgg aggacagccc aagactgcaa gaatgtggca gcactagttt caggcctttg  300
tgcacaggtg aggaagacat cacaagcgtc gagacccgt acctggactt cacacacctt  360
cgaatctcct ataatgtata tgttgcagtg tattccattg cacaggccct gcaggacatt  420
cttacctgca cacctggaca tggacttttt gccaacaatt cctgtgcaga tataaagaaa  480
atggaagcct ggcaggtcct gaagcagctg agacatttaa actacaccaa cagtatgggg  540
gaaaagatcc actttgatga gaatgacgac ctggctgcaa actacatgat cataaactgg  600
cacaggtcca ctgaagacgg ctctgtggtg ttcgaggagg ttggatacta ccacatgcac  660
gcgaagagag gggccaaact gctcattgac aggacaaaga ttctgtggaa tggatacagt  720
tcagaggtgc cattctcgaa ctgcagtgag gactgtgatc ctggcacaag aaagggcatc  780
atagatagta tgcccacatg ctgctttgaa tgcactgagt gctcagatgg agaatacagt  840
actcacaaag atgccagtgt ttgcaccaag tgtccaaata actcctggtc caatgggaac  900
cacacgttct gcttcctgaa ggaaattgag tttctctcct ggacagaacc tttcgggata  960
gcgttgacca tatgtgcagt gctgggtgtt gccctgacgg gcttcgtgat ggccgtcttt 1020
gtccgattcc gcaacacccc aatagtgaaa gccacgaacc gagaactgtc ctacgtcctc 1080
ctgttctctc tcatctgttg cttctccagc tccctcatct tataggaga ccgcaggat 1140
tggatgtgcc gcttacgcca accggccttt gggatcagtt ttgttctctg tatctcgtgc 1200
atccttgtga aacaaaccg agtcctcttg gtgtttaag ccaagatccc gacaagtctc 1260
catcgtaaat ggtgggggtt aaacctacag ttcctgctgg tgtttctgtg cacatttgtc 1320
caagtcatga tatgtgtggt ctggctgtac aacgcccac cttccagtta caggaattat 1380
gacatagatg agatgatttt tatcacatgt aatgaaggct ctgtaatggc tcttgggttt 1440
cttattggct atacatgcct gctggccgct atatgtttct tctttgcatt caaatcacgg 1500
aaacttccag aaaacttcac cgaggctaag ttcatcactt ttagtatgct catattcttt 1560
atcgtttgga tctctttcat ccctgcctac ttcagtactt acggaaagtt tgtttcagcg 1620
gtggaggtca ttgccatact ggcctccagc tttgggatgc tggcctgcat cttcttcaac 1680
aaggtctaca tcatcctttt caaaccgtcc cggaacacca tcgaggaggt ccggtgcagc 1740
acctcagccc acgctttcaa agtggcggca aaggctactc taaagcatag cacggcttca 1800
cggagaaagt cgggcagcac tggtggatct tctgactcca cgccgtcatc gtccatcagc 1860
ctgaagacca atggcaatga cccgacttca ggaaagccca gggagctt tggcagtgga 1920
acagttactt tgtccttgag cttcgaggag tcgaggagga gttctctgat gtatagaat 1980
atgtgtggct ctgtcaagtt tcagcttcat ctgtgtcatt aatagggtgt tttgtttttgt 2040
tttttacacg taaaccttta catctttcct ttttcctaac atttgtccg gaatatgatc 2100
atcactccaa ctaatatact gcacctgaat cctgtgtctt gtaatgtgt agtaaatctg 2160
ctagtaatat tcacaaaacg ttttgtacaa ttaaaaaact ttatatgatc aaaaaaaaaa 2220
aaaaaaag                                                          2229
```

FIG. 10A

```
Pro Arg Val Arg Glu Met Val Arg Arg Asn Ile Thr Asp Arg Ile Trp
 1               5                       10                      15
Leu Ala Ser Glu Ala Trp Ala Ser Ser Ser Leu Ile Ala Lys Pro Glu
            20                  25                  30
Tyr Leu Asp Val Val Ala Gly Thr Ile Gly Phe Ala Leu Lys Ala Gly
        35                  40                  45
Gly Ile Pro Gly Phe Arg Glu Phe Leu Gln His Val Gln Pro Lys Lys
    50                  55                  60
Asp Ser His Asn Glu Phe Val Arg Glu Phe Trp Glu Glu Thr Phe Asn
65                      70                  75                  80
Cys Tyr Leu Glu Asp Ser Pro Arg Leu Gln Glu Cys Gly Ser Thr Ser
            85                  90                  95
Phe Arg Pro Leu Cys Thr Gly Glu Glu Asp Ile Thr Ser Val Glu Thr
            100                 105                 110
Pro Tyr Leu Asp Phe Thr His Leu Arg Ile Ser Tyr Asn Val Tyr Val
            115                 120                 125
Ala Val Tyr Ser Ile Ala Gln Ala Leu Gln Asp Ile Leu Thr Cys Thr
    130                 135                 140
Pro Gly His Gly Leu Phe Ala Asn Asn Ser Cys Ala Asp Ile Lys Lys
145                 150                 155                 160
Met Glu Ala Trp Gln Val Leu Lys Gln Leu Arg His Leu Asn Tyr Thr
                165                 170                 175
Asn Ser Met Gly Glu Lys Ile His Phe Asp Glu Asn Asp Asp Leu Ala
            180                 185                 190
Ala Asn Tyr Met Ile Ile Asn Trp His Arg Ser Thr Glu Asp Gly Ser
        195                 200                 205
Val Val Phe Glu Glu Val Gly Tyr Tyr His Met His Ala Lys Arg Gly
    210                 215                 220
Ala Lys Leu Leu Ile Asp Arg Thr Lys Ile Leu Trp Asn Gly Tyr Ser
225                 230                 235                 240
Ser Glu Val Pro Phe Ser Asn Cys Ser Glu Asp Cys Asp Pro Gly Thr
            245                 250                 255
Arg Lys Gly Ile Ile Asp Ser Met Pro Thr Cys Cys Phe Glu Cys Thr
            260                 265                 270
Glu Cys Ser Asp Gly Glu Tyr Ser Thr His Lys Asp Ala Ser Val Cys
        275                 280                 285
Thr Lys Cys Pro Asn Asn Ser Trp Ser Asn Gly Asn His Thr Phe Cys
290                 295                 300
Phe Leu Lys Glu Ile Glu Phe Leu Ser Trp Thr Glu Pro Phe Gly Ile
305                 310                 315                 320
Ala Leu Thr Ile Cys Ala Val Leu Gly Val Ala Leu Thr Gly Phe Val
            325                 330                 335
Met Ala Val Phe Val Arg Phe Arg Asn Thr Pro Ile Val Lys Ala Thr
            340                 345                 350
Asn Arg Glu Leu Ser Tyr Val Leu Leu Phe Ser Leu Ile Cys Cys Phe
        355                 360                 365
Ser Ser Ser Leu Ile Phe Ile Gly Glu Pro Gln Asp Trp Met Cys Arg
    370                 375                 380
Leu Arg Gln Pro Ala Phe Gly Ile Ser Phe Val Leu Cys Ile Ser Cys
385                 390                 395                 400
Ile Leu Val Lys Thr Asn Arg Val Leu Leu Val Phe Glu Ala Lys Ile
            405                 410                 415
Pro Thr Ser Leu His Arg Lys Trp Trp Gly Leu Asn Leu Gln Phe Leu
            420                 425                 430
Leu Val Phe Leu Cys Thr Phe Val Gln Val Met Ile Cys Val Val Trp
        435                 440                 445
```

FIG. 10B

```
Leu Tyr Asn Ala Pro Pro Ser Ser Tyr Arg Asn Tyr Asp Ile Asp Glu
    450             455             460
Met Ile Phe Ile Thr Cys Asn Glu Gly Ser Val Met Ala Leu Gly Phe
465             470             475             480
Leu Ile Gly Tyr Thr Cys Leu Leu Ala Ala Ile Cys Phe Phe Phe Ala
            485             490             495
Phe Lys Ser Arg Lys Leu Pro Glu Asn Phe Thr Glu Ala Lys Phe Ile
        500             505             510
Thr Phe Ser Met Leu Ile Phe Phe Ile Val Trp Ile Ser Phe Ile Pro
        515             520             525
Ala Tyr Phe Ser Thr Tyr Gly Lys Phe Val Ser Ala Val Glu Val Ile
        530             535             540
Ala Ile Leu Ala Ser Ser Phe Gly Met Leu Ala Cys Ile Phe Phe Asn
545             550             555             560
Lys Val Tyr Ile Ile Leu Phe Lys Pro Ser Arg Asn Thr Ile Glu Glu
            565             570             575
Val Arg Cys Ser Thr Ser Ala His Ala Phe Lys Val Ala Ala Lys Ala
            580             585             590
Thr Leu Lys His Ser Thr Ala Ser Arg Arg Lys Ser Gly Ser Thr Gly
        595             600             605
Gly Ser Ser Asp Ser Thr Pro Ser Ser Ser Ile Ser Leu Lys Thr Asn
    610             615             620
Gly Asn Asp Pro Thr Ser Gly Lys Pro Arg Val Ser Phe Gly Ser Gly
625             630             635             640
Thr Val Thr Leu Ser Leu Ser Phe Glu Glu Ser Arg Arg Ser Ser Leu
            645             650             655
Met
```

FIG. 10C

```
tgtcgtggac ggagcccttt gggatcgcgt tggccatatg tgcagcgctg ggtgttgcct  60  SEQ ID NO. 21
tgacgggctt cgtgatggcc gtctttatca gattccgcaa cacccaata  gtgaaggcca 120
cgaaccgaga actgtcctat gtcctcctgt tctctctcat ctgttgcttc tccagttccc 180
tcatctttat tggagagccg caggattgga tgtgtcgttt acgccaacct gcctttggga 240
tcagttttgt tctctgtatc tcctgcatcc ttgtgaaaac taatagagta ctcttagtat 300
ttgaagccaa gatcccaca  agtctccatc gtaaatggtg ggggttaaac cttcagtttt 360
tgctggtgtt tctgtgcaca tttgtccaag tcatgatctg tgttgtctgg ctgtacaatg 420
ccctccctc  cagttacagg aattatgaca tagatgagat gatttttatc acatg       475
```

```
Ser Trp Thr Glu Pro Phe Gly Ile Ala Leu Ala Ile Cys Ala Ala Leu    SEQ ID NO. 22
1             5                   10                  15
Gly Val Ala Leu Thr Gly Phe Val Met Ala Val Phe Ile Arg Phe Arg
              20                  25                  30
Asn Thr Pro Ile Val Lys Ala Thr Asn Arg Glu Leu Ser Tyr Val Leu
              35                  40                  45
Leu Phe Ser Leu Ile Cys Cys Phe Ser Ser Ser Leu Ile Phe Ile Gly
              50                  55                  60
Glu Pro Gln Asp Trp Met Cys Arg Leu Arg Gln Pro Ala Phe Gly Ile
65                  70                  75                  80
Ser Phe Val Leu Cys Ile Ser Cys Ile Leu Val Lys Thr Asn Arg Val
                    85                  90                  95
Leu Leu Val Phe Glu Ala Lys Ile Pro Thr Ser Leu His Arg Lys Trp
                    100                 105                 110
Trp Gly Leu Asn Leu Gln Phe Leu Leu Val Phe Leu Cys Thr Phe Val
                    115                 120                 125
Gln Val Met Ile Cys Val Val Trp Leu Tyr Asn Ala Pro Pro Ser Ser
                    130                 135                 140
Tyr Arg Asn Tyr Asp Ile Asp Glu Met Ile Phe Ile Thr
145                 150                 155
```

FIG. 11

```
              10        20        30        40
CCTGACAATATTCGCAGTGCTGGGAGTCTTGCTGACGGCC    SEQ ID NO. 1
CCTGACAATATTCGCAGTGCTGGGAGTCTTGCTGACGGCC    SEQ ID NO. 3
GCTGACAATATTCGCCGTGCTCGGCGTGGTGCTCACAGCC    SEQ ID NO. 5
GTTGACCATATGTGCGGCGCTGGGTGTTGCCTTGACAGGC    SEQ ID NO. 7
TTTGGCCATATGTGCAGTGCTTGGTGTTGTCTTGACAGCT    SEQ ID NO. 9
CCTGACAATATTCGCAGTGCTAGGAGTCTTGCTGACAGCC    SEQ ID NO. 11
TTTGGCCATATGTGCAGTACTGGGTGTGGTCATGACAGCG    SEQ ID NO. 13
CTTGGCATTATGCTCTGTGCTGGGGGTATTCTTGACAGCA    SEQ ID NO. 15
TTTGGCCATATGTGCAGTGCTGGGTGTTGTCTTGACAGCT    SEQ ID NO. 17
GTTGACCATATGTGCAGTGCTGGGTGTTGCCCTGACGGGC    SEQ ID NO. 19

50        60        70        80
TTCGTCCTAGGGGTGTTTGCCCGATTCCGCAACACTCCCA    SEQ ID NO. 1
TTCGTCCTAGGGGTGTTTGCCCGATTCCGCAACACTCCCA    SEQ ID NO. 3
TTCGTCATGGGGGTGTTTGTCCGATTCCGCAACACTCCCA    SEQ ID NO. 5
TTCGTGATGGCCGTCTTTGTCAGATTCCGCAACACCCCCA    SEQ ID NO. 7
TTTGTAATGGGAGTATTTGTCAGATTTCGCAACACCCCAA    SEQ ID NO. 9
TTCGTCCTGGGGGTGTTCGCCCGATTCCGTAACACTCCAA    SEQ ID NO. 11
TTTGTGATGGGAGTCTTTGTCAGATTTCGCAACACCCCAA    SEQ ID NO. 13
TTCGTGATGGGAGTGTTTATCAAATTTCGCAACACCCCAA    SEQ ID NO. 15
TTTGTAATGGGAGTGTTTGTCAGATTTCGCAACACCCCAA    SEQ ID NO. 17
TTCGTGATGGCCGTCTTTGTCCGATTCCGCAACACCCCAA    SEQ ID NO. 19

90       100       110       120
TCGTGAAGGCCACCAACCGGGAGCTGTCCTACCTCCTCCT    SEQ ID NO. 1
TCGTGAAGGCCACCAAC GGGRGCTGTCCTACCTCCTCCT    SEQ ID NO. 3
TCGTGAAGGCCACCAACAGGGAGCTGTCCTACCTGCTCCT    SEQ ID NO. 5
TAGTGAAGGCCACGAACCGAGAACTGTCCTACGTCCTCCT    SEQ ID NO. 7
TAGTGAAGGCCACAAACCGGGAACTATCGTACGTCCTCCT    SEQ ID NO. 9
TTGTGAAGGCCACCAACCGGGAGCTGTCCTACCTCCTCCT    SEQ ID NO. 11
TAGTGAAGACCACAAACCGAGAACTGTCCTACGTCCTCCT    SEQ ID NO. 13
TTGTTAAGGCCACAAACAGAGAGCTATCCTACCTCCTCCT    SEQ ID NO. 15
TAGTGAAGGCCACAAACCGAGAACTGTCTTACGTCCTTCT    SEQ ID NO. 17
TAGTGAAAGCCACGAACCGAGAACTGTCCTACGTCCTCCT    SEQ ID NO. 19

130       140       150       160
CTTCTCCCTGGTCTGCTGCTTCTCCAGCTCTCTTATGTTC    SEQ ID NO. 1
CTTCTCCCTGGTCTGCTGCTTCTCCAGCTCTCTAATGTTC    SEQ ID NO. 3
CTTCTCCCTCGTCTGCTGCTTCTCCAGCTCCCTCATGTTC    SEQ ID NO. 5
GTTCTCTCTCATCTGTTGCTTCTCCAGCTCCCTCATCTTC    SEQ ID NO. 7
GTTCTCACTTATCTGCTGCTTCTCCAGCTCTCTCATCTTC    SEQ ID NO. 9
CTTCTCCCTGGTCTGCTGCTTCTCCAGCTCTCTAATGTTC    SEQ ID NO. 11
ATTCTCACTGATCTGCTGCTTCTCCAGCTCCCTCGTCTTC    SEQ ID NO. 13
GTTCTCACTCATCTGCTGTTTCTCCAGTTCCCTCATCTTC    SEQ ID NO. 15
GTTCTCACTTATCTGTTGCTTCTCCAGCTCTCTCATCTTC    SEQ ID NO. 17
GTTCTCTCTCATCTGTTGCTTCTCCAGCTCCCTCATCTTC    SEQ ID NO. 19
```

FIG. 12A

```
                  |         |         |         |
                 170       180       190       200
                  |         |         |         |
ATCGGTGAACCCCAGGACTGGACGTGCCGCCTGCGCCAGC    SEQ ID NO. 1
ATCGGCGAACCCCAGGACTGGACGTGCCGTCTGCGCCAGC    SEQ ID NO. 3
ATCGGCGAACCGCAGGACTGGACGTGCCGCCTCCGCCAGC    SEQ ID NO. 5
ATAGGAGAGCCGCAGGATTGGATGTGCCGCTTACGCCAAC    SEQ ID NO. 7
ATCGGAGAGCCAAAGGATTGGATGTGCCGTTTGCGCCAAA    SEQ ID NO. 9
ATCGGCGAACCCCAGGACTGGACGTGCCGTCTGCGCCAGC    SEQ ID NO. 11
ATTGGAGAGCCACAGGATTGGACATGTCGTTTACGTCAAC    SEQ ID NO. 13
ATTGGTGAACCCCAGGACTGGACATGCCGTCTACGCCAGC    SEQ ID NO. 15
ATCGGAGAGCCGAAGGATTGGATGTGCCGTTTGCGCCAAC    SEQ ID NO. 17
ATAGGAGAGCCGCAGGATTGGATGTGCCGCTTACGCCAAC    SEQ ID NO. 19

|         |         |         |
                 210       220       230       240
                  |         |         |         |
CGGCCTTCGGGATCAGCTTCGTCCTCTGCATCTCCTGCAT    SEQ ID NO. 1
CGGCCTTCGGGATCAGCTTCGTCCTCTGCATCTCCTGCAT    SEQ ID NO. 3
CGGCCTTCGGCATCAGCTTCGTCCTCTGCATCTCCTGCAT    SEQ ID NO. 5
CTGCCTTTGGGATCAGTTTTGTTCTCTGTATCTCGTGCAT    SEQ ID NO. 7
CTGCCTTTGGGATCAGTTTTGTTCTGTATCTCCTGTAT      SEQ ID NO. 9
CGGCCTTCGGGATCAGCTTCGTCCTCTGCATCTCCTGCAT    SEQ ID NO. 11
CTGCCTTTGGTATCAGTTTCGTTCTCTGTATCTCCTGCAT    SEQ ID NO. 13
CTGCATTCGGGATAAGTTTTGTTCTCTGCATCTCCTGCAT    SEQ ID NO. 15
CTGCCTTTGGGATCAGTTTTGTTCTTTGTATTTCCTGCAT    SEQ ID NO. 17
CGGCCTTTGGGATCAGTTTTGTTCTCTGTATCTCGTGCAT    SEQ ID NO. 19

|         |         |         |
                 250       260       270       280
                  |         |         |         |
CCTGGTCAAGACCAACCGCGTGCTGCTCGTCTTCGAGGCC    SEQ ID NO. 1
CCTGGTCAAGACCAACCGCGTGCTGCTCGTCTTCGAGGCC    SEQ ID NO. 3
CTTGGTCAAGACCAACCGCGTGCTGCTCGTCTTCGAGGCC    SEQ ID NO. 5
CCTTGTCAAAACAAACAGAGTCCTCTTGGTGTTTGAACGC    SEQ ID NO. 7
CCTTGTGAAAACTAACAGAGTCCTTTTGGTTTTTGAAGCT    SEQ ID NO. 9
CCTGGTCAAGACCAACCGCGTGCTGCTCGTCTTCGAGGCC    SEQ ID NO. 11
CCTTGTGAAAACAAACAGAGTACTTTTGGTATTTGAAGCT    SEQ ID NO. 13
CCTGGTAAAAACTAACCGAGTACTTCTAGTGTTCGAAGCC    SEQ ID NO. 15
CCTTGTGAAAACAAATAGAGTGCTTTTGGTATTTGAAGCC    SEQ ID NO. 17
CCTTGTGAAAACAAACCGAGTCCTCTTGGTGTTTGAAGCC    SEQ ID NO. 19

|         |         |         |
                 290       300       310       320
                  |         |         |         |
AAGATCCCCACCAGTCTCCACCGCAAGTGGTGGGGCCTGA    SEQ ID NO. 1
AAGATCCCCACCAGTCTCCACCGCAAGTGGTGGGGCCTGA    SEQ ID NO. 3
AAGATCCCCACCAGCCTCCACCGCAAGTGGTGGGGCTTGA    SEQ ID NO. 5
AAGATCCCTACAAGTCTCCATCGTAAAYGGTGGGGGTTAA    SEQ ID NO. 7
AAGATCCCAACAAGTCTCCACCGTAAATGGTGGGGATTAA    SEQ ID NO. 9
AAGATCCCCACCAGTCTCCACCGCAAGTGGTGGGGCCTGA    SEQ ID NO. 11
AAGATCCCCACAAGTCTCCATCGTAAATGGTGGGGATTGA    SEQ ID NO. 13
AAGATCCCCACCAGTCTCCATCGTAAGTGGTGGGGCTAA     SEQ ID NO. 15
AAGATCCCAACAAGTCTCCACCGTAAATGGTGGGGATTAA    SEQ ID NO. 17
AAGATCCCGACAAGTCTCCATCGTAAATGGTGGGGGTTAA    SEQ ID NO. 19
```

FIG. 12B

```
              330       340       350       360
ACCTGCAGTTCTTGCTGGTGTTCCTGTGCACCTTCGTCCA   SEQ ID NO. 1
ACCTGCAGTTCCTGCTGGTGTTCCTGTGCACCTTCGTCCA   SEQ ID NO. 3
ACCTGCAGTTCCTGCTGGTGTTCCTGTGCACCTTTGTCCA   SEQ ID NO. 5
RCCTACAGTTCCTGCTGGTGTTTCTGTGCACATTTGTCCA   SEQ ID NO. 7
ACCTGCAGTTTCTTTTGGTGTTTCTCTGCACATTTGTCCA   SEQ ID NO. 9
ACCTGCAGTTCCTGCTGGTGTTCCTGTGCACCTTCGTCCA   SEQ ID NO. 11
ACCTGCAGTTCCTGCTGGTGTTTCTGTGCACATTTGTCCA   SEQ ID NO. 13
ACTTGCAGTTCCTGTTAGTGTTCCTGTTCACATTTGTGCA   SEQ ID NO. 15
ACCTGCAGTTTCTTTTGGTGTTTCTCTGCACATTTGTCCA   SEQ ID NO. 17
ACCTACAGTTCCTGCTGGTGTTTCTGTGCACATTTGTCCA   SEQ ID NO. 19

370       380       390       400
GGTGATGATTTGCGTGGTCTGGCTCTACAACGCCCCGCCG   SEQ ID NO. 1
GGTGATGATTTGYGTGGTCTGGCTCTACAACGCCCCGCCG   SEQ ID NO. 3
GGTGATCATCTGCGTGGTGTGGCTGTACAACGCCCCGCCG   SEQ ID NO. 5
AGTCATGATATGTGTGGTCTGGCTGTACAACGCCCCACCT   SEQ ID NO. 7
AGTAATGATATGTGTGGTTTGGCTTTACAACGCCCCTCCT   SEQ ID NO. 9
GGTGATGATTTGCGTGGTCTGGCTCTACAACGCCCCGCCG   SEQ ID NO. 11
AGTCATGATATGTGTGGTATGGCTTTACAACGCCCCTCCT   SEQ ID NO. 13
AGTGATGATATGTGTGGTCTGGCTTTACAATGCTCCTCCG   SEQ ID NO. 15
AGTAATGATATGTGTGGTCTGGCTTTACAATGCCCCTCCT   SEQ ID NO. 17
AGTCATGATATGTGTGGTCTGGCTGTACAACGCCCCACCT   SEQ ID NO. 19

410       420       430       440
GCCAGCTCCAAGAACCACGACATCGATGAGATCATCTTCA   SEQ ID NO. 1
GCCAGCTCCAAGAACCACGACATTGATGAGATCATCTTCA   SEQ ID NO. 3
GCCAGCTCCAAGAACCACGACATCGATGAGATCATCTTCA   SEQ ID NO. 5
TCCAGTTACAGGAATTATGACATAGATGAGATGATTTTTA   SEQ ID NO. 7
TCCAGTTATATGATCCATGACATTGATGAGATAATTTTTA   SEQ ID NO. 9
GCCAGCTCCAAGAACCACGACATCGATGAGATCATCTTCA   SEQ ID NO. 11
TCCAGCTACAGGAATCACGACATTGATGAAATCATTTTTA   SEQ ID NO. 13
GCGAGCTACAGGAACCATGACATTGATGAGATAATTTTCA   SEQ ID NO. 15
TCCAGCTATATGAACCATGACATTGATGAGATTATTTTTA   SEQ ID NO. 17
TCCAGTTACAGGAATTATGACATAGATGAGATGATTTTTA   SEQ ID NO. 19

450       460       470       480
TCACCTGCAACGAGGGCTCCATGATGGCCCTGGGCTTTCT   SEQ ID NO. 1
TCACCTGCAACGAGGGCTCCATGATGGCCCTGGGCTTTCT   SEQ ID NO. 3
TCACCTGCAACGAGGGCTCCATGATGGCCCTGGGCTTTCT   SEQ ID NO. 5
TCACATGTAACGAGGGCTCTGTAATGGCTCTTGGGTTTCT   SEQ ID NO. 7
TCACCTGCAATGAGGGCTCTGTGATGGCTCTTGGCTTTCT   SEQ ID NO. 9
TCACCTGCAACGAGGGCTCCATGATGGCCCTGGGCTTTCT   SEQ ID NO. 11
TCACCTGCAATGAGGGATCTGTGATGGCTCTTGGGTTTCT   SEQ ID NO. 13
TTACATGCAATGAGGGCTCTATGATGGCGCTTGGCTTCCT   SEQ ID NO. 15
TCACCTGCAACGAGGGCTCTGTGATGGCTCTTGGGTTTCT   SEQ ID NO. 17
TCACATGTAATGAAGGCTCTGTAATGGCTCTTGGGTTTCT   SEQ ID NO. 19
```

FIG. 12C

```
              |            |            |            |
            490          500          510          520
              |            |            |            |
GATCGGCTACACCTGTCTCCTTGCCGCCATTTGCTTCTTC    SEQ ID NO. 1
GATCGGCTACACCTGTCTCCTCGCCGCCATTTGCTTCTTC    SEQ ID NO. 3
GATCGGCTACACTTGCATCCTCGCCGCTATCTGCTTCTTC    SEQ ID NO. 5
TATTGGCTATACATGCCTGCTGGCCGCTATAYGTTTCTTC    SEQ ID NO. 7
TATTGGCTACACCTGCCTCCTGGCAGCTATATGTTTCTTC    SEQ ID NO. 9
GATCGGCTACACCTGTCTCCTCGCCGCCATTTGCTTCTTC    SEQ ID NO. 11
TATTGGCCACACGTGCCTCCTGGCAGCTATATGTTTTTC     SEQ ID NO. 13
AATTGGGTACACATGCCTGCTGGCAGCCATATGCTTCTTC    SEQ ID NO. 15
TATCGGCTACACGTGCCTCCTGGCGGCTATATGTTTCTTC    SEQ ID NO. 17
TATTGGCTATACATGCCTGCTGGCCGCTATATGTTTCTTC    SEQ ID NO. 19

|            |            |            |
            530          540          550          560
              |            |            |            |
TTCGCGTTCAAATCGCGCAAACTCCCGGAGAACTTCACAG    SEQ ID NO. 1
TTCGCGTTCAAATCGCGCAAACTCCCGGAGAACTTCACAG    SEQ ID NO. 3
TTCGCGTTCAAGTCGCGCAAACTCCCCGAGAACTTCACGG    SEQ ID NO. 5
TTTGCGTTTAAATCACGGAAACTTCCAGAAAACTTCACAG    SEQ ID NO. 7
TTTGCATTTAAATCACGAAAACTTCCAGAAAACTTTACAG    SEQ ID NO. 9
TTCGCGTTCAAATCGCGCAAACTCCCGGAGAACTTCACAG    SEQ ID NO. 11
TTTGCATTCAAATCTCGGAAACTTCCAGAAAACTTTACAG    SEQ ID NO. 13
TTTGCATTTAAATCACGAAAACTGCCAGAGAACTTTACTG    SEQ ID NO. 15
TTTGCATTTAAATCACGAAAACTTCCAGAAAACTTTACAG    SEQ ID NO. 17
TTTGCATTCAAATCACGGAAACTTCCAGAAAACTTCACCG    SEQ ID NO. 19

|            |            |
            570          580          590
              |            |            |
AGGCGAAGTTCATCACGTTTAGCATGCTGATATT          SEQ ID NO. 1
AGGCGAAGTTCATCACGTTCAGCATGCTGATATT          SEQ ID NO. 3
AGGCCAAGTTCATCA GTTCAGCATGCTGATATT          SEQ ID NO. 5
AGGCTAAGTTCATCACTTTTAGTATGCTCATATT          SEQ ID NO. 7
AAGCCAAGTTCATCACTTTTAGCATGCTCATATT          SEQ ID NO. 9
AGGCGAAGTTCATCACGTTCAGCATGCTGATATT          SEQ ID NO. 11
AGGCAAAGTTCATCACCTTTAGCATGCTAATATT          SEQ ID NO. 13
AGGCTAAGTTCATCACCTTCAGCATGCTCATCTT          SEQ ID NO. 15
AGGCTAAGTTCATCACTTTTAGCATGCTCATATT          SEQ ID NO. 17
AGGCTAAGTTCATCACTTTTAGTATGCTCATATT          SEQ ID NO. 19
```

Decoration 'Decoration #1': Box residues that differ from the Consensus.

FIG. 12D

```
                              |                                                          |
                              10                                                         20
                              |                                                          |
Leu Thr Ile Phe Ala Val Leu Gly Val Leu Leu Thr Ala Phe Val Leu Gly Val Phe Ala   SEQ ID NO.  2
Leu Thr Ile Phe Ala Val Leu Gly Val Leu Leu Thr Ala Phe Val Leu Gly Val Phe Ala   SEQ ID NO.  4
Leu Thr Ile Phe Ala Val Leu Gly Val Val Leu Thr Ala Phe Val Met Gly Val Phe Val   SEQ ID NO.  6
Leu Thr Ile Cys Ala Ala Leu Gly Val Ala Leu Thr Gly Phe Val Met Ala Val Phe Val   SEQ ID NO.  8
Leu Ala Ile Cys Ala Val Leu Gly Val Val Leu Thr Ala Phe Val Met Gly Val Phe Val   SEQ ID NO. 10
Leu Thr Ile Phe Ala Val Leu Gly Val Leu Leu Thr Ala Phe Val Leu Gly Val Phe Ala   SEQ ID NO. 12
Leu Ala Ile Cys Ala Val Leu Gly Val Val Met Thr Ala Phe Val Met Gly Val Phe Val   SEQ ID NO. 14
Leu Ala Leu Cys Ser Val Leu Gly Val Phe Leu Thr Ala Phe Val Met Gly Val Phe Ile   SEQ ID NO. 16
Leu Ala Ile Cys Ala Val Leu Gly Val Val Leu Thr Ala Phe Val Met Gly Val Phe Val   SEQ ID NO. 18
Leu Thr Ile Cys Ala Val Leu Gly Val Ala Leu Thr Gly Phe Val Met Ala Val Phe Val   SEQ ID NO. 20

|                                                          |
                              30                                                         40
                              |                                                          |
Arg Phe Arg Asn Thr Pro Ile Val Lys Ala Thr Asn Arg Glu Leu Ser Tyr Leu Leu Leu   SEQ ID NO.  2
Arg Phe Arg Asn Thr Pro Ile Val Lys Ala Thr Asn Arg Glu Leu Ser Tyr Leu Leu Leu   SEQ ID NO.  4
Arg Phe Arg Asn Thr Pro Ile Val Lys Ala Thr Asn Arg Glu Leu Ser Tyr Leu Leu Leu   SEQ ID NO.  6
Arg Phe Arg Asn Thr Pro Ile Val Lys Ala Thr Asn Arg Glu Leu Ser Tyr Val Leu Leu   SEQ ID NO.  8
Arg Phe Arg Asn Thr Pro Ile Val Lys Ala Thr Asn Arg Glu Leu Ser Tyr Val Leu Leu   SEQ ID NO. 10
Arg Phe Arg Asn Thr Pro Ile Val Lys Ala Thr Asn Arg Glu Leu Ser Tyr Leu Leu Leu   SEQ ID NO. 12
Arg Phe Arg Asn Thr Pro Ile Val Lys Thr Thr Asn Arg Glu Leu Ser Tyr Val Leu Leu   SEQ ID NO. 14
Lys Phe Arg Asn Thr Pro Ile Val Lys Ala Thr Asn Arg Glu Leu Ser Tyr Leu Leu Leu   SEQ ID NO. 16
Arg Phe Arg Asn Thr Pro Ile Val Lys Ala Thr Asn Arg Glu Leu Ser Tyr Val Leu Leu   SEQ ID NO. 18
Arg Phe Arg Asn Thr Pro Ile Val Lys Ala Thr Asn Arg Glu Leu Ser Tyr Val Leu Leu   SEQ ID NO. 20

|                                                          |
                              50                                                         60
                              |                                                          |
Phe Ser Leu Val Cys Cys Phe Ser Ser Ser Leu Met Phe Ile Gly Glu Pro Gln Asp Trp   SEQ ID NO.  2
Phe Ser Leu Val Cys Cys Phe Ser Ser Ser Leu Met Phe Ile Gly Glu Pro Gln Asp Trp   SEQ ID NO.  4
Phe Ser Leu Val Cys Cys Phe Ser Ser Ser Leu Met Phe Ile Gly Glu Pro Gln Asp Trp   SEQ ID NO.  6
Phe Ser Leu Ile Cys Cys Phe Ser Ser Ser Leu Ile Phe Ile Gly Glu Pro Gln Asp Trp   SEQ ID NO.  8
Phe Ser Leu Ile Cys Cys Phe Ser Ser Ser Leu Ile Phe Ile Gly Glu Pro Lys Asp Trp   SEQ ID NO. 10
Phe Ser Leu Val Cys Cys Phe Ser Ser Ser Leu Met Phe Ile Gly Glu Pro Gln Asp Trp   SEQ ID NO. 12
Phe Ser Leu Ile Cys Cys Phe Ser Ser Ser Leu Val Phe Ile Gly Glu Pro Gln Asp Trp   SEQ ID NO. 14
Phe Ser Leu Ile Cys Cys Phe Ser Ser Ser Leu Ile Phe Ile Gly Glu Pro Gln Asp Trp   SEQ ID NO. 16
Phe Ser Leu Ile Cys Cys Phe Ser Ser Ser Leu Ile Phe Ile Gly Glu Pro Lys Asp Trp   SEQ ID NO. 18
Phe Ser Leu Ile Cys Cys Phe Ser Ser Ser Leu Ile Phe Ile Gly Glu Pro Gln Asp Trp   SEQ ID NO. 20

|                                                          |
                              70                                                         80
                              |                                                          |
Thr Cys Arg Leu Arg Gln Pro Ala Phe Gly Ile Ser Phe Val Leu Cys Ile Ser Cys Ile   SEQ ID NO.  2
Thr Cys Arg Leu Arg Gln Pro Ala Phe Gly Ile Ser Phe Val Leu Cys Ile Ser Cys Ile   SEQ ID NO.  4
Thr Cys Arg Leu Arg Gln Pro Ala Phe Gly Ile Ser Phe Val Leu Cys Ile Ser Cys Ile   SEQ ID NO.  6
Met Cys Arg Leu Arg Gln Pro Ala Phe Gly Ile Ser Phe Val Leu Cys Ile Ser Cys Ile   SEQ ID NO.  8
Met Cys Arg Leu Arg Gln Pro Ala Phe Gly Ile Ser Phe Val Leu Cys Ile Ser Cys Ile   SEQ ID NO. 10
Thr Cys Arg Leu Arg Gln Pro Ala Phe Gly Ile Ser Phe Val Leu Cys Ile Ser Cys Ile   SEQ ID NO. 12
Thr Cys Arg Leu Arg Gln Pro Ala Phe Gly Ile Ser Phe Val Leu Cys Ile Ser Cys Ile   SEQ ID NO. 14
Thr Cys Arg Leu Arg Gln Pro Ala Phe Gly Ile Ser Phe Val Leu Cys Ile Ser Cys Ile   SEQ ID NO. 16
Met Cys Arg Leu Arg Gln Pro Ala Phe Gly Ile Ser Phe Val Leu Cys Ile Ser Cys Ile   SEQ ID NO. 18
Met Cys Arg Leu Arg Gln Pro Ala Phe Gly Ile Ser Phe Val Leu Cys Ile Ser Cys Ile   SEQ ID NO. 20
```

FIG. 13A

```
                                     90                              100
Leu Val Lys Thr Asn Arg Val Leu Leu Val Phe Glu Ala Lys Ile Pro Thr Ser Leu His  SEQ ID NO. 2
Leu Val Lys Thr Asn Arg Val Leu Leu Val Phe Glu Ala Lys Ile Pro Thr Ser Leu His  SEQ ID NO. 4
Leu Val Lys Thr Asn Arg Val Leu Leu Val Phe Glu Ala Lys Ile Pro Thr Ser Leu His  SEQ ID NO. 6
Leu Val Lys Thr Asn Arg Val Leu Leu Val Phe Glu Ala Lys Ile Pro Thr Ser Leu His  SEQ ID NO. 8
Leu Val Lys Thr Asn Arg Val Leu Leu Val Phe Glu Ala Lys Ile Pro Thr Ser Leu His  SEQ ID NO. 10
Leu Val Lys Thr Asn Arg Val Leu Leu Val Phe Glu Ala Lys Ile Pro Thr Ser Leu His  SEQ ID NO. 12
Leu Val Lys Thr Asn Arg Val Leu Leu Val Phe Glu Ala Lys Ile Pro Thr Ser Leu His  SEQ ID NO. 14
Leu Val Lys Thr Asn Arg Val Leu Leu Val Phe Glu Ala Lys Ile Pro Thr Ser Leu His  SEQ ID NO. 16
Leu Val Lys Thr Asn Arg Val Leu Leu Val Phe Glu Ala Lys Ile Pro Thr Ser Leu His  SEQ ID NO. 18
Leu Val Lys Thr Asn Arg Val Leu Leu Val Phe Glu Ala Lys Ile Pro Thr Ser Leu His  SEQ ID NO. 20

110                             120
Arg Lys Trp Trp Gly Leu Asn Leu Gln Phe Leu Leu Val Phe Leu Cys Thr Phe Val Gln  SEQ ID NO. 2
Arg Lys Trp Trp Gly Leu Asn Leu Gln Phe Leu Leu Val Phe Leu Cys Thr Phe Val Gln  SEQ ID NO. 4
Arg Lys Trp Trp Gly Leu Asn Leu Gln Phe Leu Leu Val Phe Leu Cys Thr Phe Val Gln  SEQ ID NO. 6
Arg Lys Arg Trp Gly Leu Asn Leu Gln Phe Leu Leu Val Phe Leu Cys Thr Phe Val Gln  SEQ ID NO. 8
Arg Lys Trp Trp Gly Leu Asn Leu Gln Phe Leu Leu Val Phe Leu Cys Thr Phe Val Gln  SEQ ID NO. 10
Arg Lys Trp Trp Gly Leu Asn Leu Gln Phe Leu Leu Val Phe Leu Cys Thr Phe Val Gln  SEQ ID NO. 12
Arg Lys Trp Trp Gly Leu Asn Leu Gln Phe Leu Leu Val Phe Leu Cys Thr Phe Val Gln  SEQ ID NO. 14
Arg Lys Trp Trp Gly Leu Asn Leu Gln Phe Leu Leu Val Phe Leu Phe Thr Phe Val Gln  SEQ ID NO. 16
Arg Lys Trp Trp Gly Leu Asn Leu Gln Phe Leu Leu Val Phe Leu Cys Thr Phe Val Gln  SEQ ID NO. 18
Arg Lys Trp Trp Gly Leu Asn Leu Gln Phe Leu Leu Val Phe Leu Cys Thr Phe Val Gln  SEQ ID NO. 20

130                             140
Val Met Ile Cys Val Val Trp Leu Tyr Asn Ala Pro Pro Ala Ser Ser Lys Asn His Asp  SEQ ID NO. 2
Val Met Ile Cys Val Val Trp Leu Tyr Asn Ala Pro Pro Ala Ser Ser Lys Asn His Asp  SEQ ID NO. 2
Val Met Ile Cys Val Val Trp Leu Tyr Asn Ala Pro Pro Ala Ser Ser Lys Asn His Asp  SEQ ID NO. 2
Val Met Ile Cys Val Val Trp Leu Tyr Asn Ala Pro Pro Ser Ser Tyr Arg Asn Tyr Asp  SEQ ID NO. 2
Val Met Ile Cys Val Val Trp Leu Tyr Asn Ala Pro Pro Ser Ser Tyr Met Ile His Asp  SEQ ID NO. 2
Val Met Ile Cys Val Val Trp Leu Tyr Asn Ala Pro Pro Ala Ser Ser Lys Asn His Asp  SEQ ID NO. 2
Val Met Ile Cys Val Val Trp Leu Tyr Asn Ala Pro Pro Ser Ser Tyr Arg Asn His Asp  SEQ ID NO. 2
Val Met Ile Cys Val Val Trp Leu Tyr Asn Ala Pro Pro Ala Ser Tyr Arg Asn His Asp  SEQ ID NO. 2
Val Met Ile Cys Val Val Trp Leu Tyr Asn Ala Pro Pro Ser Ser Tyr Met Asn His Asp  SEQ ID NO. 2
Val Met Ile Cys Val Val Trp Leu Tyr Asn Ala Pro Pro Ser Ser Tyr Arg Asn Tyr Asp  SEQ ID NO. 2

150                             160
Ile Asp Glu Ile Ile Phe Ile Thr Cys Asn Glu Gly Ser Met Met Ala Leu Gly Phe Leu  SEQ ID NO. 2
Ile Asp Glu Ile Ile Phe Ile Thr Cys Asn Glu Gly Ser Met Met Ala Leu Gly Phe Leu  SEQ ID NO. 4
Ile Asp Glu Ile Ile Phe Ile Thr Cys Asn Glu Gly Ser Met Met Ala Leu Gly Phe Leu  SEQ ID NO. 6
Ile Asp Glu Met Ile Phe Ile Thr Cys Asn Glu Gly Ser Val Met Ala Leu Gly Phe Leu  SEQ ID NO. 8
Ile Asp Glu Ile Ile Phe Ile Thr Cys Asn Glu Gly Ser Val Met Ala Leu Gly Phe Leu  SEQ ID NO. 10
Ile Asp Glu Ile Ile Phe Ile Thr Cys Asn Glu Gly Ser Met Met Ala Leu Gly Phe Leu  SEQ ID NO. 12
Ile Asp Glu Ile Ile Phe Ile Thr Cys Asn Glu Gly Ser Val Met Ala Leu Gly Phe Leu  SEQ ID NO. 14
Ile Asp Glu Ile Ile Phe Ile Thr Cys Asn Glu Gly Ser Met Met Ala Leu Gly Phe Leu  SEQ ID NO. 16
Ile Asp Glu Ile Ile Phe Ile Thr Cys Asn Glu Gly Ser Val Met Ala Leu Gly Phe Leu  SEQ ID NO. 18
Ile Asp Glu Met Ile Phe Ile Thr Cys Asn Glu Gly Ser Val Met Ala Leu Gly Phe Leu  SEQ ID NO. 20
```

FIG. 13B

|     |     |     |     |     |     |     |     |     | 170 |     |     |     |     |     |     |     | 180 |     |            |
|-----|-----|-----|-----|-----|-----|-----|-----|-----|-----|-----|-----|-----|-----|-----|-----|-----|-----|-----|------------|
| Ile | Gly | Tyr | Thr | Cys | Leu | Leu | Ala | Ala | Ile | Cys | Phe | Phe | Phe | Ala | Phe | Lys | Ser | Arg | Lys SEQ ID NO. 2 |
| Ile | Gly | Tyr | Thr | Cys | Leu | Leu | Ala | Ala | Ile | Cys | Phe | Phe | Phe | Ala | Phe | Lys | Ser | Arg | Lys SEQ ID NO. 4 |
| Ile | Gly | Tyr | Thr | Cys | Ile | Leu | Ala | Ala | Ile | Cys | Phe | Phe | Phe | Ala | Phe | Lys | Ser | Arg | Lys SEQ ID NO. 6 |
| Ile | Gly | Tyr | Thr | Cys | Leu | Leu | Ala | Ala | Ile | Arg | Phe | Phe | Phe | Ala | Phe | Lys | Ser | Arg | Lys SEQ ID NO. 8 |
| Ile | Gly | Tyr | Thr | Cys | Leu | Leu | Ala | Ala | Ile | Cys | Phe | Phe | Phe | Ala | Phe | Lys | Ser | Arg | Lys SEQ ID NO. 10 |
| Ile | Gly | Tyr | Thr | Cys | Leu | Leu | Ala | Ala | Ile | Cys | Phe | Phe | Phe | Ala | Phe | Lys | Ser | Arg | Lys SEQ ID NO. 12 |
| Ile | Gly | His | Thr | Cys | Leu | Leu | Ala | Ala | Ile | Cys | Phe | Phe | Phe | Ala | Phe | Lys | Ser | Arg | Lys SEQ ID NO. 14 |
| Ile | Gly | Tyr | Thr | Cys | Leu | Leu | Ala | Ala | Ile | Cys | Phe | Phe | Phe | Ala | Phe | Lys | Ser | Arg | Lys SEQ ID NO. 16 |
| Ile | Gly | Tyr | Thr | Cys | Leu | Leu | Ala | Ala | Ile | Cys | Phe | Phe | Phe | Ala | Phe | Lys | Ser | Arg | Lys SEQ ID NO. 18 |
| Ile | Gly | Tyr | Thr | Cys | Leu | Leu | Ala | Ala | Ile | Cys | Phe | Phe | Phe | Ala | Phe | Lys | Ser | Arg | Lys SEQ ID NO. 20 |

|     |     |     |     |     | 190 |     |     |     |     |     |     |     |     |               |
|-----|-----|-----|-----|-----|-----|-----|-----|-----|-----|-----|-----|-----|-----|---------------|
| Leu | Pro | Glu | Asn | Phe | Thr | Glu | Ala | Lys | Phe | Ile | Thr | Phe | Ser | Met Leu Ile | SEQ ID NO. 2 |
| Leu | Pro | Glu | Asn | Phe | Thr | Glu | Ala | Lys | Phe | Ile | Thr | Phe | Ser | Met Leu Ile | SEQ ID NO. 4 |
| Leu | Pro | Glu | Asn | Phe | Thr | Glu | Ala | Lys | Phe | Ile | Thr | Phe | Ser | Met Leu Ile | SEQ ID NO. 6 |
| Leu | Pro | Glu | Asn | Phe | Thr | Glu | Ala | Lys | Phe | Ile | Thr | Phe | Ser | Met Leu Ile | SEQ ID NO. 8 |
| Leu | Pro | Glu | Asn | Phe | Thr | Glu | Ala | Lys | Phe | Ile | Thr | Phe | Ser | Met Leu Ile | SEQ ID NO. 10 |
| Leu | Pro | Glu | Asn | Phe | Thr | Glu | Ala | Lys | Phe | Ile | Thr | Phe | Ser | Met Leu Ile | SEQ ID NO. 12 |
| Leu | Pro | Glu | Asn | Phe | Thr | Glu | Ala | Lys | Phe | Ile | Thr | Phe | Ser | Met Leu Ile | SEQ ID NO. 14 |
| Leu | Pro | Glu | Asn | Phe | Thr | Glu | Ala | Lys | Phe | Ile | Thr | Phe | Ser | Met Leu Ile | SEQ ID NO. 16 |
| Leu | Pro | Glu | Asn | Phe | Thr | Glu | Ala | Lys | Phe | Ile | Thr | Phe | Ser | Met Leu Ile | SEQ ID NO. 18 |
| Leu | Pro | Glu | Asn | Phe | Thr | Glu | Ala | Lys | Phe | Ile | Thr | Phe | Ser | Met Leu Ile | SEQ ID NO. 20 |

Decoration 'Decoration #1': Box residues that differ from the Consensus.

FIG. 13C

```
aattccgttg ctgtcggttc agtccaagtc tcctccagtg caaaatgaga aatggtggtc   60
gccattacag gaacatgcac tacatctgtg ttaatgaaat attgtcagtt atctgaaggt  120
tattaaaatg tttctgcaag gatggcttca cgagaaatca attctgcacg tttcccatt   180
gtcattgtat gaataactga ccaaagggat gtaacaaaat ggaacaaagc tgaggaccac  240
gttcacccct tcttggagca tacgatcaac cctgaaggag atggaagact tgaggaggaa  300
atggggattg atcttccagg agttctgctg taaagcgatc cctcaccatt acaaagataa  360
gcagaaatcc tccaggcatc tctgtaaac gggctggcgt agtgtggctt ggtcaaggaa   420
cagagacagg gctgcacaat ggctcagctt cactgccaac tcttattctt gggatttaca  480
ctcctacagt cgtacaatgt ctcagggtat ggtccaaacc aaagggccca gaagaaagga  540
gacatcatac tgggaggtct cttcccaata cactttggag tagccgccaa ggatcaggac  600
ttaaaatcga gaccggaggc gacaaaatgt attcggtaca attttcgagg cttccgatgg  660
ctccaggcga tgatattcgc aattgaagag attaacaaca gtatgacttt cctgcccaat  720
atcaccctgg gatatcgcat atttgacacg tgtaacaccg tgtccaaggc gctagaggca  780
acactcagct ttgtggccca gaacaaaatc gactcgctga acttagatga gttctgtaac  840
tgctctgacc atatcccatc cacaatagca gtggtcgggg caaccgggtc aggaatctcc  900
acggctgtgg ccaatctatt gggattattt tacattccac aggtcagcta tgcctcctcg  960
agcaggctgc tcagcaacaa gaatgagtac aaggccttcc tgaggaccat ccccaatgat 1020
gagcaacagg ccacggccat ggccgagatc atcgagcact tccagtggaa ctgggtggga 1080
accctggcag ccgacgatga ctatgccgc ccaggcattg acaagttccg ggaggaggcc  1140
gttaagaggg acatctgtat tgacttcagt gagatgatct ctcagtacta cacccagaag 1200
cagttggagt tcatcgccga cgtcatccag aactcctcgg ccaaggtcat cgtggtcttc 1260
tccaatggcc ccgacctgga gccgctcatc caggagatag ttcggagaaa catcaccgat 1320
cggatctggc tggccagcga ggcttgggcc agctcttcgc tcattgccaa gccagagtac 1380
ttccacgtgg tcggcggcac catcggcttc gctctcaggg cggggcgtat cccagggttc 1440
aacaagttcc tgaaggaggt ccaccccagc aggtcctcgg acaatgggtt tgtcaaggag 1500
ttctgggagg agaccttcaa ctgctacttc accgagaaga ccctgacgca gctgaagaat 1560
tccaaggtgc cctcgcacgg accggcggct caaggggacg gctccaaggc ggggaactcc 1620
agacggacag ccctacgcca ccctgcact ggggaggaga acatcaccag cgtggagacc  1680
ccctacctgg attatacaca cctgaggatc tcctacaatg tatacgtggc cgtctactcc 1740
attgctcacg ccctgcaaga catccactct tgcaaacccg gcacgggcat ctttgcaaac 1800
ggatcttgtg cagatattaa aaagttgag gcctgcagg tcctcaacca tctgctgcat   1860
ctgaagttta ccaacagcat gggtgagcag gttgactttg acgatcaagg tgacctcaag 1920
gggaactaca ccattatcaa ctggcagctc tccgcagagg atgaatcggt gttgttccat 1980
gaggtgggca actacaagct ctacgctaag cccagtgacc gactcaacat caacgaaaag 2040
aaaatcctct ggagtggcct ctccaaagtg gttcctttct ccaactgcag tcgagactgt 2100
gtgccgggca ccaggaaggg gatcatcgag ggggagccca cctgctgctt tgaatgcatg 2160
gcatgtgcag agggagagtt cagtgatgaa aacgatgcaa gtgcgtgtac aaagtgcccg 2220
aatgatttct ggtcgaatga gaaccacacg tcgtgcatcg ccaaggagat cgagtacctg 2280
tcgtggacgg agcccttcgg gatcgctctg accatcttcg ccgtactggg catcctgatc 2340
acctccttcg tgctgggggt cttcatcaag ttcaggaaca cacccatcgt gaaggccacc 2400
aaccggagt tgtcctacct gctgcttctc tccctcatct gctgcttctc cagctcgctc 2460
atcttcatcg gcgagcccag ggactggacc tgtcggctcc gccaaccggc ctttggcatc 2520
agcttcgtcc tgtgcatctc ctgcatcctg gtgaagacca ccgggtgct gctggtcttc 2580
gaggccaaga tccccaccag cctccaccgc aagtgggtgg gcctcaacct gcagttcctc 2640
ctggtcttcc tctgcatcct ggtgcaaatc gtcacctgca tcatctggct ctacaccgcg 2700
cctccctcca gctacaggaa ccatgagctg gaggacgagg tcatcttcat cacctgcgac 2760
gagggctcgc tcatggcgct gggcttcctc atcggctaca cctgcctcct cgccgccatc 2820
tgcttcttct tcgcctttca agtcccgtaag ctgcggaga acttcaacga ggctaagttc 2880
atcaccttca gcatgttgat cttcttcatc gtctggatct ccttcatccc cgcctatgtc 2940
agcacctacg gcaagtttgt gtcggccgtg gaggtgattg ccatcctggc ctccagcttc 3000
gggctgctgg gctgcatta cttcaacaag tgttacatca tcctgttcaa gccgtgccgt  3060
aacaccatcg aggaggtgcg ctgcagcacg gcggcccacg cctcaaggt ggcggcccgg   3120
gccaccctcc ggcgcagcgc cgcgtcctcgc aagcctctcgc gcagcctgtg cggctccacc 3180
atctcctcgc ccgcctcgtc cacctgcggg acggggctca catggagat gcagcgctgc 3240
agcacgcaga aggtcagctt cggcagcgcac accgtcaccc tgtcgctcag cttcgaggag 3300
acaggccgat acgccaccct cagccgcacg gcccgcagca ggaactcggc ggatggccgc 3360
```

FIG. 14A

```
agcggcgacg acctgccatc tagacaccac gaccagggcc cgcctcagaa atgcgagccc 3420
cagcccgcca acgatgcccg atacaaggcg gcgccgacca agggcaccct agagtcgccg 3480
ggcggcagca aggagcgccc cacaactatg gaggaaacct aatccaactc ctccatcaac 3540
cccaagaaca tcctccacgg cagcaccgtc gacaactgac atcaactcct aaccggtggc 3600
tgcccaacct ctcccctctc cggcactttg cgttttgctg aagattgcag catctgcagt 3660
tcctttatc cctgattttc tgacttggat atttactagt gtgcgatgga atatcacaac 3720
ataatgagtt gcacaattag gtgagcagag ttgtgtcaaa gtatctgaac tatctgaagt 3780
atctgaacta ctttattctc tcgaattgta ttacaaacat ttgaagtatt tttagtgaca 3840
ttatgttcta acattgtcaa gataatttgt tacaacatat aaggtaccac ctgaagcagt 3900
gactgagatt gccactgtga tgacagaact gttttataac atttatcatt gaaacctgga 3960
ttgcaacagg aatataatga ctgtaacaaa aaaattgttg attatcttaa aaatgcaaat 4020
tgtaatcaga tgtgtaaaat tggtaattac ttctgtacat taaatgcata tttcttgata 4080
aaaaaaaaaa aaaaaaaaaa aaaaaaaaaa aaaaaagcgg cccgacagca acgg      4134
```

GROWING MARINE FISH IN FRESH WATER

RELATED APPLICATIONS

This application is a continuation of U.S. application Ser. No. 11/702,482, filed Feb. 5, 2007, now U.S. Pat. No. 7,421,975, which is a continuation of U.S. application Ser. No. 11/057,660, filed Feb. 14, 2005, now issued U.S. Pat. No. 7,182,041, which is a continuation of U.S. application Ser. No. 10/411,076, filed Apr. 9, 2003, now issued U.S. Pat. No. 6,854,422, which is a continuation of International Application No. PCT/US01/31625, which designated the United States and was filed Oct. 11, 2001, published in English, which is a continuation-in-part of U.S. application Ser. No. 09/687,373, filed Oct. 12, 2000, now issued U.S. Pat. No. 6,463,882. The entire teachings of the above applications are incorporated herein by reference.

BACKGROUND OF THE INVENTION

Growing marine fish has been generally limited to coastal regions or seawater tanks. However, many freshwater aquifers exist, for example, in the Midwest as potential environments for the raising of marine fish. Until now, attempts to grow marine fish in freshwater have been unsuccessful.

Growing marine fish in freshwater would provide an opportunity for non-coastal areas to raise marine fish. The ability to grow marine fish in freshwater can provide fresh fish and economic growth to these areas.

Hence, a need exists to determine whether it is possible to adapt a marine fish to freshwater, and if so, understand the biological mechanisms that allow a marine fish to do so. In particular, a need exists to grow marine fish in freshwater.

SUMMARY OF THE INVENTION

The present invention relates to methods of growing marine fish in freshwater by increasing or maintaining expression of a receptor, referred to as the Polyvalent Cation Sensing Receptor (PVCR). The expression and/or sensitivity of the PVCR is modulated or maintained by subjecting the marine fish to at least one modulator of the PVCR. The marine fish are subjected to the modulator when it is added to the freshwater environment, and optionally, to the feed.

In one embodiment, the present invention is directed toward a method of growing marine fish in freshwater comprising adding at least one Polyvalent Cation Sensing Receptor (PVCR) modulator to freshwater in an amount sufficient to modulate or maintain expression and/or sensitivity of at least one PVCR in one or more tissues; transferring the marine fish to the freshwater and adding feed for fish consumption to the modified freshwater, wherein the feed contains an amount of NaCl sufficient to contribute to modulate or maintain levels of said PVCR modulator in serum of the marine fish. PVCR modulators useful in the present invention include a divalent cation, a trivalent cation, an aminoglycoside, an organic polycation, an amino acid, a Type I Calcimimetic, a Type II Calcimimetic, 1,25 dihydroxyvitamin D, a cytokine, and macrophage chemotatic peptide-1. The feed suitable in the methods of the present invention contains at least about 1% NaCl by weight and can optionally include a PVCR modulator.

The present invention also encompasses a method of transferring marine fish to freshwater comprising adding at least one Polyvalent Cation Sensing Receptor (PVCR) modulator to the freshwater in an amount sufficient to modulate or maintain expression and/or sensitivity of at least one PVCR in one or more tissues, transferring the marine fish to the freshwater, adding feed for fish consumption to the modified freshwater, wherein the feed contains at least about 1% NaCl by weight. The PVCR modulator can be a PVCR agonist, a divalent cation, a trivalent cation, an aminoglycoside, an organic polycation or an amino acid.

In another embodiment, the present invention is directed toward a method of growing marine fish in freshwater comprising determining the level of at least one PVCR modulator in freshwater, adding said PVCR modulator to the freshwater in an amount sufficient to modulate or maintain expression and/or sensitivity of at least one PVCR in one or more tissues, transferring the marine fish to the freshwater and adding feed for fish consumption to the modified freshwater, wherein the feed contains an amount of NaCl sufficient to modulate or maintain levels of said PVCR modulator in serum of the marine fish (calcium and magnesium). PVCR modulator that can be assessed. The PVCR modulator is added to freshwater such that the freshwater has between about 0.3 mM and about 10.0 mM calcium and between about 0.5 mM and about 10.0 mM magnesium prior to transferring marine fish.

The present invention is also directed to a method of growing marine fish in freshwater having between about 0.3 mM and about 10.0 mM of calcium and between about 0.5 mM and 10.0 mM of magnesium. The method comprises adding feed to the freshwater wherein the feed contains an amount of NaCl sufficient to modulate or maintain levels of said PVCR modulator in serum of the marine fish, wherein modulated or maintained expression of at least one PVCR is modulated or maintained in one or more tissues.

In another embodiment, the present invention is directed toward a method of transferring marine fish to freshwater comprising transferring the marine fish to freshwater having magnesium and calcium in the freshwater in amounts sufficient to modulate or maintain the expression and/or sensitivity of at least one PVCR in one or more tissues and adding feed to the freshwater, wherein the feed contains at least about 1% NaCl by weight.

The present invention is also directed to a method of growing flounder in freshwater comprising transferring flounder to freshwater having at least one PVCR modulator in an amount sufficient to increase or maintain expression and/or sensitivity of at least one PVCR in one or more tissue and adding feed for fish consumption to the freshwater, wherein the feed contains an amount of NaCl sufficient to contribute to a significant increased level of said PVCR modulator in serum of the flounder. The pH of the freshwater should be greater than 7.0.

In another embodiment, the present invention is directed toward an aquatic mixture for providing an environment to transfer marine fish to freshwater, comprising at least one PVCR modulator. An aquatic mixture is a medium suitable for transfer of marine fish to freshwater during aquaculture.

The present invention is also directed to a kit for growing marine fish in freshwater comprising an aquatic mixture for providing an environment to grow the marine fish, wherein the aquatic mixture comprises at least one PVCR modulator; and an aquatic food composition containing a concentration of NaCl between about 10,000 mg/kg and about 100,000 mg/kg.

Surprisingly, it has been discovered that modulated or maintained expression and/or altering the sensitivity of the PVCR allows these marine fish to live and thrive in freshwater. Until the discovery of the present invention, the aquaculture industry was unable to transfer the marine fish to freshwater without subjecting the fish to stress, death and/or disease. Unlike this practice, carrying out the steps of the invention modulates or maintains the expression and/or alters the sensitivity of the PVCR and allows for transfer of the marine fish to freshwater with minimal or no stress, death and/or disease, and unexpectedly, the fish grow. In fact, marine fish that grow in freshwater have a higher fat content, and a milder, less "fishy" taste.

BRIEF DESCRIPTION OF THE DRAWINGS

FIGS. 1A and 1B are diagrams illustrating the partial nucleotide (SEQ ID NO:1) and amino acid (SEQ ID NO:2) sequences of the PVCR of Cod.

FIGS. 2A and 2B are diagrams illustrating the partial nucleotide (SEQ ID NO:3) and amino acid (SEQ ID NO:4) sequences of the PVCR of Haddock.

FIGS. 3A and 3B are diagrams illustrating the partial nucleotide (SEQ ID NO:5) and amino acid (SEQ ID NO:6) sequences of the PVCR of Hake.

FIGS. 4A-B are diagrams illustrating the partial nucleotide (SEQ ID NO:7) and amino acid (SEQ ID NO:8) sequences of the PVCR of Halibut.

FIG. 5A-B are diagrams illustrating the partial nucleotide (SEQ ID NO:9) and amino acid (SEQ ID NO:10) sequences of the PVCR of Mackerel.

FIGS. 6A-B are diagrams illustrating the partial nucleotide (SEQ ID NO:11) and amino acid (SEQ ID NO:12) sequences of the PVCR of Pollack.

FIG. 7A-B are diagrams illustrating the partial nucleotide (SEQ ID NO:13) and amino acid (SEQ ID NO:14) sequences of the PVCR of Sea Bass.

FIGS. 8A-B are diagrams illustrating the partial nucleotide (SEQ ID NO:15) and amino acid (SEQ ID NO:16) sequences of the PVCR of Swordfish.

FIGS. 9A-B are diagrams illustrating the partial nucleotide (SEQ ID NO:17) and amino acid (SEQ ID NO:18) sequences of the PVCR of Tuna.

FIGS. 10A-C are diagrams illustrating the partial nucleotide (SEQ ID NO:19) and amino acid (SEQ ID NO:20) sequences of the PVCR of Winter Flounder.

FIG. 11 is a diagram illustrating the partial nucleotide (SEQ ID NO:21) and amino acid (SEQ ID NO:22) sequences of PVCR of Summer Flounder.

FIGS. 12A-D are diagrams illustrating the alignment of the nucleic acids sequences for Cod (SEQ ID NO:1), Haddock (SEQ ID NO:3), Hake (SEQ ID NO:5), Halibut (SEQ ID NO:7), Mackerel (SEQ ID NO:9), Pollock (SEQ ID NO:11), Sea Bass (SEQ ID NO:13), Swordfish (SEQ ID NO:15), Tuna (SEQ ID NO:17), Winter Flounder (SEQ ID NO:19).

FIGS. 13A-C are diagrams illustrating the alignment of the amino acids sequences for Cod (SEQ ID NO:2), Haddock (SEQ ID NO:4), Hake (SEQ ID NO:6), Halibut (SEQ ID NO:8), Mackerel (SEQ ID NO:10), Pollock (SEQ ID NO:12), Sea Bass (SEQ ID NO:14), Swordfish (SEQ ID NO:16), Tuna (SEQ ID NO:18), Winter Flounder (SEQ ID NO:20).

FIGS. 14A-B are diagrams illustrating the nucleic acid sequence of SKCaR (SEQ ID NO:23).

DETAILED DESCRIPTION OF THE INVENTION

Figure 15:
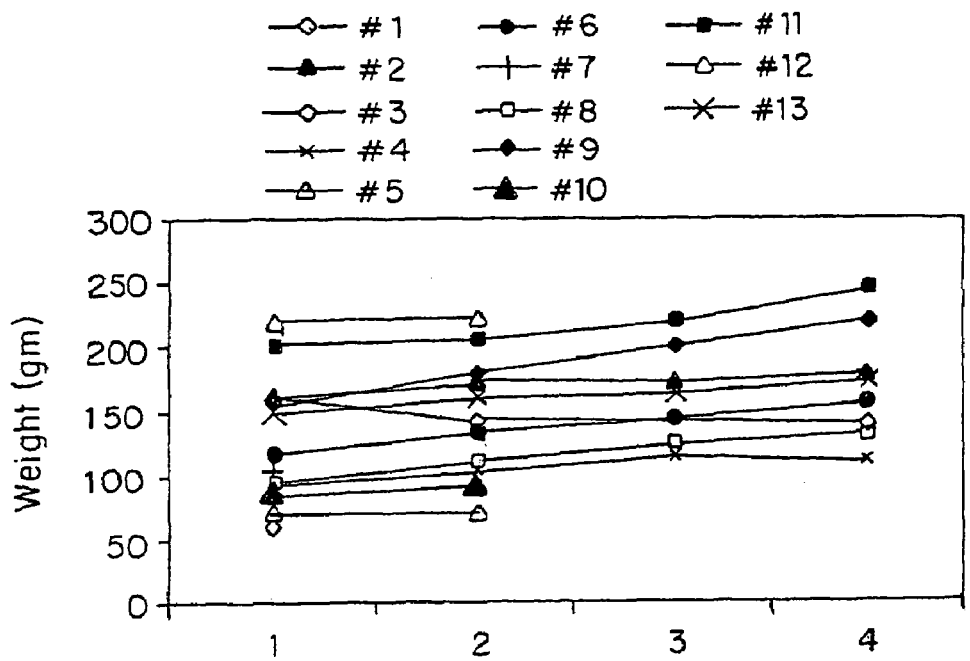
FIG. 15 is a graphical representation illustrating the growth of summer flounder in freshwater that underwent APS Process I and grown in freshwater for a total of 51 days. Samples of body characteristics of flounders were obtained at (1) prior to placement in freshwater; (2) 20 days after placement in freshwater; (3) 30 days after placement in freshwater; and (4) 51 days after placement in freshwater. APS Process I is defined in Example 2.

The present invention relates to methods for growing or raising marine fish in freshwater. The methods involve modulating or maintaining expression and/or altering the sensitivity of a Polyvalent Cation Sensing Receptor (PVCR) (e.g., at least one PVCR). The invention relates to modulating or maintaining expression of the PVCR that affects the fish's ability to adapt to freshwater.

In particular, the methods of the present invention include adding at least one PVCR modulator to the freshwater, and adding a specially made or modified feed to the freshwater for consumption by the fish. The feed contains a sufficient amount of sodium chloride (NaCl) (e.g., between about 1% and about 10% by weight, or about 10,000 mg/kg to about 100,000 mg/kg) to modulate or maintain levels of the PVCR modulator in the serum. This amount of NaCl in the feed causes or induces the marine fish to drink more freshwater. Since the freshwater contains a PVCR modulator and the fish ingest increased amounts of it, the serum level of the PVCR modulator significantly increases in the fish, and causes increased or maintained PVCR expression and/or altered PVCR sensitivity. A "significant" increase is used herein to refer to a measurable rise in the level or quantity of PVCR or RVCR modulator as compared to a control or reference. Methods of measuring or detecting a significant increase in PVCR or PVCR modulator are disclosed herein and known to one skilled in the art.

The methods of the present invention pertain to adapting marine fish to freshwater. Marine fish are fish that live, at least for most of their adult lives, in seawater. Marine fish include, for example, Cod, Haddock, Hake, Halibut, Mackerel, Pollock, Sea Bass, Swordfish, Tuna, Winter Flounder, and Summer Flounder. The marine fish are adapted to freshwater having a PVCR modulator.

The term "marine fish" is understood by one of skill in the art. The term, "freshwater," means water that comes from, for example, a stream, river, ponds, public water supply, or from other non-marine sources having, for example, the following ionic composition: less than about 2 mM of magnesium, calcium and NaCl. The phrases "modified freshwater," "freshwater as modified by the addition of a PVCR" and "PVCR modulator environment" refer to freshwater to which at least one PVCR modulator has been added, as described herein.

The PVCR modulator is added to the freshwater in sufficient amounts to modulate or maintain expression or alter the sensitivity of at least one PVCR. A PVCR has been isolated from various tissue of several types of marine fish using molecular biological techniques. For example, nucleic acid was isolated from tissue samples from various species of marine fish including Cod, Haddock, Hake, Halibut, Mackerel, Pollock, Sea Bass, Swordfish, Tuna, Winter Flounder and Summer Flounder. The nucleic acid was amplified using Polymerase Chain Reaction (PCR) methodology. The amplified DNA was purified, subcloned into vectors, and their sequences were determined, as described in Example 4.

The PVCR, which is located in various tissues (e.g., gill, skin, intestine, kidney, urinary bladder, brain or muscle) of the marine fish, senses alterations in PVCR modulators including various ions (e.g., divalent cations), for example, in the surrounding water, in their serum or in the luminal contents of tubules inside the body, such as kidney, urinary bladder, or intestine. The ability to sense PVCR modulators results in a modulation or a maintenance in the expression of PVCR, thereby allowing the fish to better adapt to freshwater. Modulated or maintained expression of the PVCR can occur, for example, in one or more tissues. As used herein, the "sensitivity" of the PVCR refers to alteration of PVCR expression in response to a change in the concentration of PVCR modulators. PVCR expression can be assessed by measuring or detecting PVCR polypeptide or nucleic acid molecules in a sample by standard methods.

A "PVCR modulator" is defined herein to mean a compound which modulates expression of the PVCR, or modulates the sensitivity or responsiveness of the PVCR, or maintains an already increased PVCR expression level in one or more tissues. Such compounds include, but are not limited to, PVCR agonists (e.g., inorganic polycations, organic polycations and amino acids), Type II calcimimetics, and compounds that indirectly alter PVCR expression (e.g., 1,25 dihydroxyvitamin D in concentrations of about 3,000-10,000 International Units/kg feed), cytokines such as Interleukin Beta, and Macrophage Chemotatic Peptide-1 (MCP-1)). Examples of Type II calcimimetics, which modulate expression and/or sensitivity of the PVCR, are, for example, NPS-R-467 and NPS-R-568 from NPS Pharmaceutical Inc., (Salt Lake, Utah, U.S. Pat. Nos. 5,962,314; 5,763,569; 5,858,684; 5,981,599; 6,001,884) which can be administered in concentrations of between about 0.1 µM and about 100 µM feed or water. See Nemeth, E. F. et al., *PNAS* 95: 4040-4045 (1998).

Examples of inorganic polycations are divalent cations including calcium at a concentration between about 0.3 and about 10.0 mM and magnesium at a concentration between about 0.5 and about 10.0 mM; and trivalent cations including, but not limited to, gadolinium (Gd3+) at a concentration between about 1 and about 500 µM.

Organic polycations include, but are not limited to, aminoglycosides such as neomycin or gentamicin in concentrations of between about 1 and about 8 gm/kg feed as well as organic polycations including polyamines (e.g., polyarginine, polylysine, polyhistidine, polyornithine, spermine, cadaverine, putricine, copolymers of poly arginine/histidine, poly lysine/arginine in concentrations of between about 10 µM and 10 mM feed). See Brown, E. M. et al., *Endocrinology* 128: 3047-3054 (1991); Quinn, S. J. et al., *Am. J. Physiol.* 273: C1315-1323 (1997).

Additionally, PVCR agonists include amino acids such as L-Tryptophan, L-Tyrosine, L-Phenylalanine, L-Alanine, L-Serine, L-Arginine, L-Histidine, L-Leucine, L-Isoleucine, and L-Cystine at concentrations of between about 1 and about 10 gm/kg feed. See Conigrave, A. D., et al., *PNAS* 97: 4814-4819 (2000). The molar concentrations refer to free or ionized concentrations of the PVCR modulator in the freshwater, and do not include amounts of bound PVCR modulator (e.g., PVCR modulator bound to negatively charged particles including glass, proteins, or plastic surfaces). Any combination of these modulators can be added to the water or to the feed (in addition to the NaCl, as described herein), so long as the combination modulates or maintains expression and/or sensitivity of at least one PVCR.

The PVCR modulator can be administered to the fish in a number of ways. The invention encompasses administration of the PVCR in any way that is sufficient to modulate or maintain the expression and/or alter the sensitivity of the PVCR. In one embodiment, the PVCR modulator is simply added to the freshwater, as described herein. PVCR modulators that are added to the water increase or maintain or decrease expression and/or alter the sensitivity of the PVCR on the skin and gills of the fish, and can be ingested by the fish, in particular, when fish are fed feed having between about 1% and about 10% NaCl (e.g., in concentrations between about 1 and about 10 gm/100 gm feed). In addition to adding NaCl to the feed, the PVCR modulator can also be added to the feed. Amounts and types of PVCR modulators added to the feed are also described herein. Other embodiments include subjecting the fish to the PVCR modulator by "dipping" the fish in the modulator, e.g., organic polycations. The organic polycations can be formulated in such a way as to allow the polycations to adhere to the skin and gills of the fish, in sufficient amounts to increase or maintain expression of the PVCR.

The invention also embodies assessing the amounts of existing PVCR modulator in the freshwater environment and in the serum of fish. PVCR modulators are assessed or measured using methods known in the art. After assessment, the PVCR modulator is added to the water to bring the concentration up to an amount sufficient to modulate or maintain expression and/or sensitivity of at least one PVCR, or sufficient to bring the concentrations of the PVCR modulator within the stated ranges. For example, an aquifer assessed at having only 0.2 mM of calcium needs additional calcium to bring the concentration up to between about 0.3 mM and between about 10.0 mM.

In a preferred embodiment, the present invention is practiced by adding a combination of two PVCR agonists to the freshwater. In particular, calcium and magnesium are added to the freshwater to bring the concentrations of each to between about 0.3 mM and about 10.0 mM of calcium, and between about 0.5 mM and about 10.0 mM of magnesium. In addition to adding calcium and magnesium to the water, these ranges of ion concentrations can be achieved by providing a brackish water (e.g., diluted seawater) environment for the fish.

Calcium and magnesium can come from a variety of sources, that when added to the water, the calcium and/or magnesium levels modulate or maintain expression of the PVCR, and/or are within the stated ranges. Sources of calcium and magnesium can be a mixture of a variety of compounds, or each can come from a substantially uniform or pure compound. Sources of calcium include, for example, $Ca(CO_3)_2$, $CaCl_2$, and $CaSO_4$ and sources of magnesium include, for example, $MgCl_2$, $MgSO_4$, $MgBr_2$, and $MgCO_3$.

In one embodiment, the invention includes intermittent (e.g., interrupted) as well as continuous (e.g., non-interrupted) exposure to freshwater having at least one PVCR modulator, while on the NaCl diet. Intermittent exposure to the PVCR can occur so long as the PVCR expression and/or altered sensitivity remains modulated or maintained. Continuous maintenance in or exposure to freshwater having at least one PVCR modulator is shown in Example 2.

The marine fish are transferred from seawater. The term, "seawater," means water that comes from the sea, or water which has been formulated to simulate the chemical and mineral composition of water from the sea. The major elemental composition of the prepared seawater preferably falls substantially within the range of the major elemental composition of the natural seawater (e.g., having the following ionic composition: greater than 30 mM of magnesium, greater than about 6 mM of calcium, and greater than about 300 mM NaCl). Methods of preparing artificial seawater are known in the art and are described in, for instance, U.S. Pat. No. 5,351,651.

In one embodiment, the marine fish are treated by the methods of the present invention by subjecting the fish to a gradual or step-wise decrease in salinity for a period of time prior to transfer to freshwater, while being fed a NaCl diet. Salinity refers to the ionic concentrations (e.g., calcium, magnesium and sodium) in water. The fish are maintained in a decreasing salinity environment for a sufficient period of time to modulate or maintain expression and/or sensitivity of at least one PVCR. Factors that can influence the length of time to maintain the fish in a decreased salinity prior to transfer to freshwater include, but are not limited to, size of the fish, level of PVCR expression or sensitivity, if any, prior to addition of the PVCR modulator to the freshwater, the fish's ability to excrete the PVCR modulator and ions, and the fish's surface to volume ratio. Therefore, the length of time the fish is maintained can range between about 5 days and about 60 days, and preferably, between about 10 days and about 25 days.

The ionic concentrations of seawater are decreased by between about 10% and about 90%, and preferably, between about 25% and about 50%. Combinations of decreasing salinity and various lengths of exposure to the salinity are encompassed by the invention. For example, as described in Example 2, fish were adapted to 50% seawater (50% salinity of seawater) for 10 days, and then adapted to 25% seawater (25% salinity of seawater) for 15 days, prior to transfer to freshwater. "Adapted" as used herein, refers to a successful transition to the altered aquatic environment. After maintenance in water having decreasing salinity, as compared to seawater, the marine fish are then placed into freshwater having a PVCR modulator, as described herein. The fish can remain and grow in freshwater, modified by the addition of PVCR modulators, indefinitely, so long as there is modulated or maintained expression and/or sensitivity of the PVCR (e.g., maintained in modified freshwater and fed an NaCl diet).

The invention further includes adding feed to the freshwater. The frequency and amount of feed that fish are fed, are taught in the art. Generally, the fish are fed 1-3 times a day, totaling about 0.25-0.5% body weight/day. The feed has enough NaCl to contribute to a modulated or maintained level of the PVCR modulator in the serum of the marine fish. Specifically, the presence of sufficient amounts of NaCl in the feed causes the marine fish to drink more water from the surrounding environment. Although NaCl decreases PVCR sensitivity, the ingestion of freshwater having at least one PVCR modulator causes an overall rise in the serum level of PVCR modulator. The increase in serum levels of PVCR modulator results in a modulation in expression of PVCR.

In another embodiment, the present invention is directed toward an aquatic mixture for providing an environment to transfer marine fish to freshwater, comprising at least one PVCR modulator. An "aquatic mixture" is defined herein to mean a composition that provides a suitable environment for the successful transfer of marine fish to freshwater by the methods of the present invention. The aquatic mixture can be premixed for immediate use in the methods of the present invention. Alternatively, the aquatic mixture can require reconstitution with water. The aquatic mixture when reconstituted yields a solution comprising about 0.3-10 mM $Ca^{2+}$ and about 0.5-10 mM $Mg^{2+}$. The aquatic mixture can optionally include an amino acid in an amount between about 1 gm/kg and about 10 gm/kg.

The present invention also relates to an aquatic food composition. An "aquatic food composition" refers to fish feed, as described herein. An aquatic food composition or feed suitable for use in the present invention contains between about 1%-10% of NaCl by weight, or between about 10,000 mg NaCl/kg of feed and about 100,000 mg NaCl/kg of feed (e.g., 12,000 mg/kg). The feed is referred to herein as a "NaCl diet." The NaCl can be combined with other sodium salts to confer the desired effect of modulating or maintaining PVCR expression, altering PVCR sensitivity and/or inducing the fish to drink more. Hence, as used herein, the term NaCl, includes a substantially pure compound, mixtures of NaCl with other sources of sodium, or other sources of sodium. The feed can further include a PVCR modulator, and in particular a PVCR agonist such as an amino acid. In one embodiment, the feed has between about 1% and about 10% NaCl by weight and an amino acid such as tryptophan in an amount between about 1 and about 10 gm/kg. This embodiment is referred to herein as "APS Process II," which is further defined in Example 2.

The feed can be made in a number of ways, so long as the proper concentration of NaCl is present. The feed can be made, for example, by reformulating the feed, or by allowing the feed to absorb a solution having the NaCl and optionally, adding a PVCR modulator. Additionally, a top dressing can be added for palatability. Example 3 describes in detail one way to make the feed. Alternate methods of preparing fish feed are know to those of skill in the relevant art.

Another embodiment of the present invention includes feeding marine fish feed having between 1% and 10% NaCl by weight when the fish are maintained in a freshwater environment having between about 0.3 and about 10.0 mM of calcium, and between about 0.5 mM and about 10.0 mM of magnesium. When this embodiment of the present invention is carried out, the levels of calcium, magnesium and/or sodium in the serum of the marine fish is increased, as compared to PVCR expression and/or sensitivity seen in freshwater fish.

In another embodiment, the fish, while in water having decrease salinity, as compared to seawater, or while in the freshwater having the PVCR modulator, are also exposed to a photoperiod. A photoperiod refers to exposing the fish to light (e.g., sunlight, incandescent light or fluorescent light). Preferably, the photoperiod is substantially continuous, or occurs long enough to increase growth. The photoperiod can occur for at least about 12 hours within a 24 hour interval, or for longer periods such as about 14, 16, 18, 20, 22 or preferably, about 24 hours.

Figure 16:
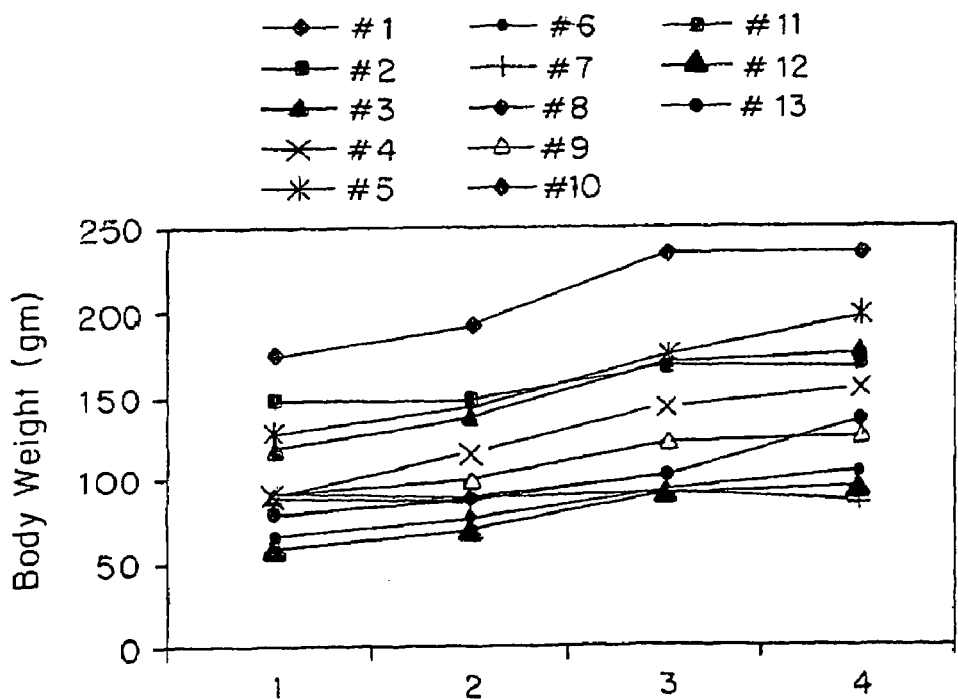
FIG. 16 is a graphical representation illustrating the growth of summer flounder in seawater for a total of 51 days. Samples of body characteristics of flounders were obtained at (1) prior to placement in seawater; (2) 20 days after placement in seawater; (3) 30 days after placement in seawater; and (4) 51 days after placement in seawater.

The methods of the present invention modulate or maintain the expression and/or sensitivity of the PVCR in marine fish which results in reduced osmotic stress and in reduced mortality. Marine fish cultured in freshwater by methods of the present invention consume feed and exhibit growth. In contrast, marine fish that are not cultured in freshwater by methods of the present invention experience osmotic stress, reduced or no food consumption, and eventually death. The osmotic stress results from differences in the osmotic pressure between the surrounding environment and body compartments of the fish. This disturbs the homeostatic equilibrium of the fish and results in decreased growth, reproductive failure and reduced resistance to disease. The fish that have undergone the steps of the present invention do not experience a significant amount of osmotic stress. As a result, the fish are able to grow. Surprisingly, as described and exemplified herein, marine fish adapted by the present invention grow almost as well as marine fish maintained in seawater (e.g., 53% increased growth in fish subjected to the present invention for 37 days, as compared to 60% increased growth of fish maintained in seawater for 37 days). Additionally, marine fish cultured in freshwater by methods of the present invention exhibit a survival rate that is significantly greater than the rate for marine fish that are transferred directly to freshwater and not subjected to the steps of the present invention (e.g., between about 60% and about 100%). See FIGS. 15 and 16.

The methods of the present invention also decrease the incidence of disease among the marine fish transferred to freshwater. Because the fish treated with the methods of the present invention experience less stress upon transfer to freshwater, their immune functions are stronger, and they are less susceptible to parasitic, viral, bacterial and fungal diseases. Thus, marine fish cultured by methods of the present invention are healthier.

Methods Assessment of the PVCR

The present invention includes methods of detecting the level of the PVCR to determine whether fish are ready for transfer from seawater to freshwater. Methods that measure PVCR levels include several suitable assays. Suitable assays encompass immunological methods, such as FACS analysis, radioimmunoassay, flow cytometry, enzyme-linked immunosorbent assays (ELISA) and chemiluminescence assays. Any method known now or developed later can be used for measuring PVCR expression.

Antibodies reactive with the PVCR or portions thereof can be used. In a preferred embodiment, the antibodies specifically bind with the PVCR or a portion thereof. The antibodies can be polyclonal or monoclonal, and the term antibody is intended to encompass polyclonal and monoclonal antibodies, and functional fragments thereof. The terms polyclonal and monoclonal refer to the degree of homogeneity of an antibody preparation, and are not intended to be limited to particular methods of production.

In several of the preferred embodiments, immunological techniques detect PVCR levels by means of an anti-PVCR antibody (i.e., one or more antibodies). The term "anti-PVCR" antibody includes monoclonal and/or polyclonal antibodies, and mixtures thereof.

Anti-PVCR antibodies can be raised against appropriate immunogens, such as isolated and/or recombinant PVCR or portion thereof (including synthetic molecules, such as synthetic peptides). In one embodiment, antibodies are raised against an isolated and/or recombinant PVCR or portion thereof (e.g., a peptide) or against a host cell which expresses recombinant PVC R. In addition, cells expressing recombinant PVCR, such as transfected cells, can be used as immunogens or in a screen for antibody which binds receptor.

Any suitable technique can prepare the immunizing antigen and produce polyclonal or monoclonal antibodies. The art contains a variety of these methods (see e.g., Kohler et al., *Nature*, 256: 495-497 (1975) and *Eur. J. Immunol.* 6: 511-519 (1976); Milstein et al., *Nature*, 266: 550-552 (1977); Koprowski et al., U.S. Pat. No. 4,172,124; Harlow, E. and D. Lane, 1988, Antibodies: A Laboratory Manual, (Cold Spring Harbor Laboratory: Cold Spring Harbor, N.Y.); Current Protocols In Molecular Biology, Vol. 2 (Supplement 27, Summer '94), Ausubel, F. M. et al., Eds., (John Wiley & Sons: New York, N.Y.), Chapter 11, (1991)). Generally, fusing antibody producing cells with a suitable immortal or myeloma cell line, such as SP2/0, can produce a hybridoma. For example, animals immunized with the antigen of interest provide the antibody producing cell, preferably cells from the spleen or lymph nodes. Selective culture conditions isolate antibody producing hybridoma cells while limiting dilution techniques produce them. Researchers can use suitable assays such as ELISA to select antibody producing cells with the desired specificity.

Other suitable methods can produce or isolate antibodies of the requisite specificity. Examples of other methods include selecting recombinant antibody from a library or relying upon immunization of animals such as mice.

According to the method, an assay can determine the level of PVCR in a biological sample. In determining the amounts of PVCR, an assay includes combining the sample to be tested with an antibody having specificity for the PVCR, under conditions suitable for formation of a complex between antibody and the PVCR, and detecting or measuring (directly or indirectly) the formation of a complex. The sample can be obtained directly or indirectly, and can be prepared by a method suitable for the particular sample and assay format selected.

In particular, tissue samples, e.g., gill tissue samples, can be taken from fish after they are anaesthetized with MS-222. The tissue samples are fixed by immersion in 2% paraformaldehyde in appropriate Ringers solution corresponding to the osmolality of the fish, washed in Ringers, then frozen in an embedding compound, e.g., O.C.T.™ (Miles, Inc., Elkahart, Ind., USA) using methylbutane cooled with liquid nitrogen. After cutting 8-10μ tissue sections with a cryostat, individual sections are subjected to various staining protocols. For example, sections are: 1) blocked with goat serum or serum obtained from the same species of fish, 2) incubated with rabbit anti-CaR or anti-PVCR antiserum, and 3) washed and incubated with peroxidase-conjugated affinity-purified goat antirabbit antiserum. The locations of the bound peroxidase-conjugated goat antirabbit antiserum are then visualized by development of a rose-colored aminoethylcarbazole reaction product. Individual sections are mounted, viewed and photographed by standard light microscopy techniques. One anti-CaR antiserum used to detect fish PVCR protein is raised in rabbits using a 23-mer peptide corresponding to amino acids numbers 214-236 localized in the extracellular domain of the RaKCaR protein (Riccardi et al., P.N.A.S. 92:131-135 (1995); accession number NP 058692). The sequence of the 23-mer peptide is: ADDDYGRPGIEKFREEAEERDIC (SEQ ID NO:24) A small peptide with the sequence DDYGR-PGIEKFREEAEERDICI (SEQ ID NO:25) or ARSRN-SADGRSGDDLPC (SEQ ID NO:26) can also be used to make antisera containing antibodies to PVCRs. Such antibodies can be monoclonal, polyclonal or chimeric.

Suitable labels can be detected directly, such as radioactive, fluorescent or chemiluminescent labels. They can also be indirectly detected using labels such as enzyme labels and other antigenic or specific binding partners like biotin. Examples of such labels include fluorescent labels such as fluorescein, rhodamine, chemiluminescent labels such as luciferase, radioisotope labels such as $^{32}$P, $^{125}$I, $^{131}$I, enzyme labels such as horseradish peroxidase, and alkaline phosphatase, β-galactosidase, biotin, avidin, spin labels and the like. The detection of antibodies in a complex can also be done immunologically with a second antibody which is then detected (e.g., by means of a label). Conventional methods or other suitable methods can directly or indirectly label an antibody.

In performing the method, the levels of the PVCR are distinct from the control. Varied levels or the presence of PVCR expression, as compared to a control, indicate that the fish or the population of fish from which a statistically significant amount of fish were tested, are ready for transfer to freshwater. A control refers to a level of PVCR, if any, from a fish that is not subjected to the steps of the present invention, e.g., not subjected to freshwater having a PVCR modulator and/or not fed a NaCl diet.

The PVCRs can also be assayed by Northern blot analysis of mRNA from tissue samples. Northern blot analysis from various shark tissues has revealed that the highest degree of PVCRs expression is in gill tissue, followed by the kidney and the rectal gland. There appear to be at least three distinct mRNA species of about 7 kb, 4.2 kb and 2.6 kb. For example, the PVCRs can also be assayed by hybridization, e.g., by hybridizing one of the PVCR sequences provided herein (e.g., SEQ ID NO:1, 3, 5, 7, 9, 11, 13, 15, 17, 19, 21 or 23), its complement or an oligonucleotide derived from one of the sequences, to a mRNA purified from tissue sample from a fish. Such a hybridization sequence can have a detectable label, e.g., radioactive, fluorescent, etc., attached, to allow the detection of hybridization product. Methods for hybridization are well known, and such methods are provided in U.S. Pat. No. 5,837,490, by Jacobs et al., the entire teachings of which are herein incorporated by reference in their entirety. The design of the oligonucleotide probe should preferably follow these parameters: (a) it should be designed to an area of the sequence which has the fewest ambiguous bases ("N's"), if any, and (b) it should be designed to have a $T_m$ of approx. 80° C. (assuming 2° C. for each A or T and 4 degrees for each G or C).

Stringency conditions for hybridization refers to conditions of temperature and buffer composition which permit hybridization of a first nucleic acid sequence to a second nucleic acid sequence, wherein the conditions determine the degree of identity between those sequences which hybridize to each other. Therefore, "high stringency conditions" are those conditions wherein only nucleic acid sequences which are very similar to each other will hybridize. The sequences can be less similar to each other if they hybridize under moderate stringency conditions. Still less similarity is needed for two sequences to hybridize under low stringency conditions. By varying the hybridization conditions from a stringency level at which no hybridization occurs, to a level at which hybridization is first observed, conditions can be determined at which a given sequence will hybridize to those sequences that are most similar to it. The precise conditions determining the stringency of a particular hybridization include not only the ionic strength, temperature, and the concentration of destabilizing agents such as formamide, but also on factors such as the length of the nucleic acid sequences, their base composition, the percent of mismatched base pairs between the two sequences, and the frequency of occurrence of subsets of the sequences (e.g., small stretches of repeats) within other non-identical sequences. Washing is the step in which conditions are set so as to determine a minimum level of similarity between the sequences hybridizing with each other. Generally, from the lowest temperature at which only homologous hybridization occurs, a 1% mismatch between two sequences results in a 1° C. decrease in the melting temperature ($T_m$) for any chosen SSC concentration. Generally, a doubling of the concentration of SSC results in an increase in the $T_m$ of about 17° C. Using these guidelines, the washing temperature can be determined empirically, depending on the level of mismatch sought. Hybridization and wash conditions are explained in *Current Protocols in Molecular Biology* (Ausubel, F. M. et al., eds., John Wiley & Sons, Inc., 1995, with supplemental updates) on pages 2.10.1 to 2.10.16, and 6.3.1 to 6.3.6.

High stringency conditions can employ hybridization at either (1) 1×SSC (10×SSC=3 M NaCl, 0.3 M Na$_3$-citrate-2H$_2$O (88 g/liter), pH to 7.0 with 1 M HCl), 1% SDS (sodium dodecyl sulfate), 0.1-2 mg/ml denatured calf thymus DNA at 65° C., (2) 1×SSC, 50% formamide, 1% SDS, 0.1-2 mg/ml denatured calf thymus DNA at 42° C., (3) 1% bovine serum albumen (fraction V), 1 mM Na$_2$.EDTA, 0.5 M NaHPO$_4$ (pH 7.2) (1 M NaHPO$_4$=134 g Na$_2$HPO$_4$.7H$_2$O, 4 ml 85% H$_3$PO$_4$ per liter), 7% SDS, 0.1-2 mg/ml denatured calf thymus DNA at 65° C., (4) 50% formamide, 5×SSC, 0.02 M Tris-HCl (pH 7.6), 1× Denhardt's solution (100×=10 g Ficoll 400, 10 g polyvinylpyrrolidone, 10 g bovine serum albumin (fraction V), water to 500 ml), 10% dextran sulfate, 1% SDS, 0.1-2 mg/ml denatured calf thymus DNA at 42° C., (5) 5×SSC, 5× Denhardt's solution, 1% SDS, 100 µg/ml denatured calf thymus DNA at 65° C., or (6) 5×SSC, 5× Denhardt's solution, 50% formamide, 1% SDS, 100 µg/ml denatured calf thymus DNA at 42° C., with high stringency washes of either (1) 0.3-0.1×SSC, 0.1% SDS at 65° C., or (2) 1 mM Na$_2$EDTA, 40 mM NaHPO$_4$ (pH 7.2), 1% SDS at 65° C. The above conditions are intended to be used for DNA-DNA hybrids of 50 base pairs or longer. Where the hybrid is believed to be less than 18 base pairs in length, the hybridization and wash temperatures should be 5-10° C. below that of the calculated $T_m$ of the hybrid, where $T_m$ in ° C.=(2× the number of A and T bases)+(4× the number of G and C bases). For hybrids believed to be about 18 to about 49 base pairs in length, the $T_m$ in ° C.=(81.5° C.+16.6(log$_{10}$M)+0.41(% G+C)−0.61 (% formamide)−500/L), where "M" is the molarity of monovalent cations (e.g., Na$^+$), and "L" is the length of the hybrid in base pairs.

Moderate stringency conditions can employ hybridization at either (1) 4×SSC, (10×SSC=3 M NaCl, 0.3 M Na$_3$-citrate.2H$_2$O (88 g/liter), pH to 7.0 with 1 M HCl), 1% SDS (sodium dodecyl sulfate), 0.1-2 mg/ml denatured calf thymus DNA at 65° C., (2) 4×SSC, 50% formamide, 1% SDS, 0.1-2 mg/ml denatured calf thymus DNA at 42° C., (3) 1% bovine serum albumen (fraction V), 1 mM Na$_2$.EDTA, 0.5 M NaHPO$_4$ (pH 7.2) (1 M NaHPO$_4$=134 g Na$_2$HPO$_4$.7H$_2$O, 4 ml 85% H$_3$PO$_4$ per liter), 7% SDS, 0.1-2 mg/ml denatured calf thymus DNA at 65° C., (4) 50% formamide, 5×SSC, 0.02 M Tris-HCl (pH 7.6), 1× Denhardt's solution (100×=10 g Ficoll 400, 10 g polyvinylpyrrolidone, 10 g bovine serum albumin (fraction V), water to 500 ml), 10% dextran sulfate, 1% SDS, 0.1-2 mg/ml denatured calf thymus DNA at 42° C., (5) 5×SSC, 5× Denhardt's solution, 1% SDS, 100 µg/ml denatured calf thymus DNA at 65° C., or (6) 5×SSC, 5× Denhardt's solution, 50% formamide, 1% SDS, 100 µg/ml denatured calf thymus DNA at 42° C., with moderate stringency washes of 1×SSC, 0.1% SDS at 65° C. The above conditions are intended to be used for DNA-DNA hybrids of 50 base pairs or longer. Where the hybrid is believed to be less than 18 base pairs in length, the hybridization and wash temperatures should be 5-10° C. below that of the calculated $T_m$ of the hybrid, where $T_m$ in ° C.=(2× the number of A and T bases)+(4× the number of G and C bases). For hybrids believed to be about 18 to about 49 base pairs in length, the $T_m$ in ° C.=(81.5° C.+16.6(log$_{10}$M)+0.41(% G+C)−0.61 (% formamide)−500/L), where "M" is the molarity of monovalent cations (e.g., Na$^+$), and "L" is the length of the hybrid in base pairs.

Low stringency conditions can employ hybridization at either (1) 4×SSC, (10×SSC=3 M NaCl, 0.3 M Na$_3$-citrate.2H$_2$O (88 g/liter), pH to 7.0 with 1 M HCl), 1% SDS (sodium dodecyl sulfate), 0.1-2 mg/ml denatured calf thymus DNA at 50° C., (2) 6×SSC, 50% formamide, 1% SDS, 0.1-2 mg/ml denatured calf thymus DNA at 40° C., (3) 1% bovine serum albumen (fraction V), 1 mM Na$_2$.EDTA, 0.5 M NaHPO$_4$ (pH 7.2) (1 M NaHPO$_4$=134 g Na$_2$HPO$_4$.7H$_2$O, 4 ml 85% H$_3$PO$_4$ per liter), 7% SDS, 0.1-2 mg/ml denatured calf thymus DNA at 50° C., (4) 50% formamide, 5×SSC, 0.02 M Tris-HCl (pH 7.6), 1× Denhardt's solution (100×=10 g Ficoll 400, 10 g polyvinylpyrrolidone, 10 g bovine serum albumin (fraction V), water to 500 ml), 10% dextran sulfate, 1% SDS, 0.1-2 mg/ml denatured calf thymus DNA at 40° C., (5) 5×SSC, 5× Denhardt's solution, 1% SDS, 100 µg/ml denatured calf thymus DNA at 50° C., or (6) 5×SSC, 5× Denhardt's solution, 50% formamide, 1% SDS, 100 µg/ml denatured calf thymus DNA at 40° C., with low stringency washes of either 2×SSC, 0.1% SDS at 50° C., or (2) 0.5% bovine serum albumin (fraction V), 1 mM Na$_2$EDTA, 40 mM NaHPO$_4$ (pH 7.2), 5% SDS. The above conditions are intended to be used for DNA-DNA hybrids of 50 base pairs or longer. Where the hybrid is believed to be less than 18 base pairs in length, the hybridization and wash temperatures should be 5-10° C. below that of the calculated $T_m$ of the hybrid, where $T_m$ in ° C.=(2× the number of A and T bases)+(4× the number of G and C bases). For hybrids believed to be about 18 to about 49 base pairs in length, the $T_m$ in ° C.=(81.5° C.+16.6($\log_{10}$M)+0.41(% G+C)−0.61 (% formamide)−500/L), where "M" is the molarity of monovalent cations (e.g., $Na^+$), and "L" is the length of the hybrid in base pairs.

Hence, the present invention includes kits for the detection of the PVCR or the quantification of the PVCR having either antibodies specific for the PVCR protein or a portion thereof, or a nucleic acid sequence that can hybridize to the nucleic acid of the PVCR.

Alterations in the expression or sensitivity of PVCRs could also be accomplished by introduction of a suitable transgene. Suitable transgenes would include either the PVCR gene itself or modifier genes that would directly or indirectly influence PVCR gene expression. Methods for successful introduction, selection and expression of the transgene in fish oocytes, embryos and adults are described in Chen, T T et al., Transgenic Fish, *Trends in Biotechnology* 8:209-215 (1990).

The present invention is further and more specifically illustrated by the following Examples, which are not intended to be limiting in any way.

EXEMPLIFICATION

Example 1

Polyvalent Cation-sensing Receptors (PVCRs) Serve as Salinity Sensors in Fish

Polyvalent cation-sensing receptors (PVCRs) serve as salinity sensors in fish. These receptors are localized to the apical membranes of various cells within the fish's body (e.g., in the gills, intestine, kidney) that are known to be responsible for osmoregulation. A full-length cation receptor (CaR) from the dogfish shark has been expressed in human HEK cells. This receptor was shown to respond to alterations in ionic compositions of NaCl, $Ca^{2+}$ and $Mg^{2+}$ in extracellular fluid bathing the HEK cells. The ionic concentrations responded to encompassed the range which includes the transition from freshwater to seawater. Expression of PVCR mRNA is also modulated in fish after their transfer from freshwater to seawater, and is modulated by PVCR agonists.

Using nucleic acid amplification with degenerate primers, partial genomic clones of PVCRs have also been isolated from other fish species, including Cod (FIGS. 1A-B), Haddock (FIGS. 2A-B), Hake (FIGS. 3A-B), Halibut (FIGS. 4A-B), Mackerel (FIGS. 5A-B), Pollock (FIGS. 6A-B), Sea Bass (FIGS. 7A-B), Swordfish (FIGS. 8A-B), Tuna (FIGS. 9A-B), Winter Flounder (FIGS. 10A-10C) and Summer Flounder (FIG. 11). The degenerate oligonucleotide primers used for isolating these clones, except for Winter Flounder, were 5'-TGT CKT GGA CGG AGC CCT TYG GRA TCG C-3' (SEQ ID NO:27) and 5'-GGC KGG RAT GAA RGA KAT CCA RAC RAT GAA G-3' (SEQ ID NO:28), where K is T or G, Y is C or T, and R is A or G. The degenerate oligos were generated by standard methodologies (Preston, G. M., 1993, "Polymerase chain reaction with degenerate oligonucleotide primers to clone gene family members," in: Methods in Mol. Biol., vol. 58, ed. A. Harwood, Humana Press, pp. 303-312). Nucleic acids from these species were amplified, purified by agarose gel electrophoresis, ligated into an appropriate plasmid vector (Novagen's pT7 Blue or Promega's pGEM-T) and transformed into an appropriate bacterial host strain (Novagens' Nova Blue Competent Cells or Promega's JM 109 competent cells). The plasmids and inserts were purified from the host cells, and sequenced. FIGS. 13A-C shows the deduced amino acid sequences and alignment for the PVCRs from Cod, Haddock, Hake, Halibut, Mackerel, Pollock, Sea Bass, Swordfish, Tuna and Winter Flounder.

A winter flounder lambda ZAP cDNA library was manufactured using standard commercially available reagents with cDNA synthesized from poly A+ RNA isolated from winter flounder urinary bladder tissue as described and published in Siner et al. Am. J. Physiol. 270:C372-C381, 1996. The winter flounder urinary bladder cDNA library was plated and resulting phage plaques screened using a 32 P-labeled shark kidney calcium receptor cDNA probe under intermediate stringency conditions (0.5×SSC, 0.1% SDS, 50° C.). Individual positive plaques were identified by autoradiography, isolated and rescued using phagemid infections to transfer cDNA to KS Bluescript vector. The nucleotide (nt) sequence, FIG. 10A, (SEQ ID NO:19) of the winter flounder PVCR clone was obtained using commercially available automated sequencing service that performs nucleotide sequencing using the dideoxy chain termination technique. The deduced amino acid sequence (SEQ ID NO:20) is shown in FIGS. 10B and 10C. The winter flounder PVCR nucleotide sequence was compared to others aquatic PVCR using commercially available nucleotide and protein database services including GENBANK and SWISS PIR.

Example 2

Growth of Marine Fish in Freshwater Using the Methods of the Present Invention

Methods:

The following examples refer to APS Process I and APS Process II throughout. APS stands for "AquaBio Products Sciences®, L.L.C." APS Process I is also referred to herein as "SUPERSMOLT® I Process" or "Process I." An "APS Process I" fish or smolt refers to a fish or smolt that has undergone the steps of APS Process I. An APS Process I smolt is also referred to as a "SUPERSMOLT® I" or a "Process I" smolt. Likewise, APS Process II is also referred to herein as "SUPERSMOLT® II Process" or "Process II." An "APS Process II" fish or smolt refers to a fish or smolt that has undergone the steps of APS Process II. An APS Process II smolt is also referred to as a "SUPERSMOLT® II" or a "Process II" smolt.

APS Process I: Marine fish are exposed to or maintained in freshwater containing 0.3-10.0 mM calcium and 0.5-10.0 mM magnesium ions. This water is prepared by addition of calcium carbonate and/or calcium chloride and magnesium chloride to the freshwater. Fish are fed with feed pellets containing 1-7% (weight/weight) NaCl. See Example 3 for further details regarding the feed. Fish are exposed to or maintained in this regimen of water mixture and feed for a total of 30-45 days, using standard hatchery care techniques. Water temperatures vary between 10-16° C. Fish are exposed to a constant photoperiod for the duration of APS Process I. A fluorescent light is used for the photoperiod.

APS Process II: Marine fish are exposed to or maintained in freshwater containing 0.3-10.0 mM calcium and 0.5-10.0 mM magnesium ions. This water is prepared by addition of calcium carbonate and/or calcium chloride and magnesium chloride to the freshwater. Fish are fed with feed pellets containing 1-7% (weight/weight) NaCl and either 2 gm or 4 gm of L-Tryptophan per kg of feed. See Example 3 for further details regarding the feed. Fish are exposed to or maintained in this regimen of water mixture and feed for a total of 30-45 days using standard hatchery care techniques. Water temperatures vary between 10-16° C. Fish are exposed to a constant photoperiod for the duration of APS Process II. A fluorescent light is used for the photoperiod.

Summer Flounders of various weights that were all derived from a single homogenous stock of farm raised animals (Great Bay AquaFarms Portsmouth, N.H.) were transported and placed in artificial seawater (Crystal Sea) within the APS laboratory. These were divided into two groups (n=13) and one maintain in seawater (Seawater Control) for a total of 81 days and fed a standard flounder diet (Corey Feeds, New Brunswick, Canada). The other (Freshwater) was adapted to APS Process I conditions over 30 days consisting of 5 mM $Ca^{2+}$, 8 mM $Mg^{2+}$ concentrations in the water and a 1.2% NaCl supplemented diet of 70% standard flounder feed (Corey Feeds, New Brunswick, Canada) and 30% ground squid. These flounder were then maintained in APS Process I conditions for a total of 51 days and their growth compared to that exhibited by matched paired summer flounder maintain in seawater. Flounders were adapted to the APS Process I by the following 30 day schedule:

1. Maintenance in seawater for 5 days.
2. Reduce water salinity to 50% seawater for 10 days.
3. Reduce water salinity to 25% seawater for 15 days.
4. Place fish in APS Process I water (5 mM $Ca^{2+}$, 8 mM $Mg^{2+}$ concentrations in the freshwater, pH 7.6-8.0)

Fish were individually tagged using colored elastomer tags their change in weight was determined at specific time points during the 51 day experimental interval.

The feed conversion ratio or FCR is obtained by dividing the body weight gained by a group of fish into the amount of food fed to the group of fish. The more efficient the conversion of food into body weight growth by fish, the smaller the FCR (small amount of food/large weight gain of fish). A very small FCR number (less than 1) encompasses a highly efficient conversion of food into body weight growth which is the goal of aquaculture. By contrast, a large FCR means an inefficient conversion of food into body weight growth and is generally undesirable. A large or poor FCR is undesirable due to the cost of feed and the necessity to use more feed to grow fish to a given weight. The FCR values for fish subjected to the methods of the present invention are generally smaller and more desirable, in some instances (e.g., when fish were fed dry feed), than most industry published values because the present invention eliminates the presence of osmotically damaged fish that tend to increase the overall FCR since they eat food but do not grow. The methods of the present invention, result in a lower FCR, allowing optimal feeding and growth of most fish. The FCR of fish subjected to the present invention is sufficient to maintain growth and feeding of the majority of fish, or preferably increase the growth and feed consumption of the majority of fish. When fish are subjected to the methods of the present invention, they exhibit ranges of FCRs, for example, would include values between about 0.7 and about 7.0. In particular, food consumption or food intake is improved because it is believed that the fish "smell" or "sense" the food with the PVCR in cells of the olfactory lamellae or olfactory bulb.

The specific growth rate (SGR) of the fish was determined by dividing the weight of the fish at the end of the given time point by the starting weight of the fish.

All calculations to obtain feed conversion ratio (FCR) or specific growth rate (SGR) and growth factor (GF3) were performed using standard accepted formulae (Willoughby, S. Manual of Salmonid Farming Blackwell Scientific, Oxford UK 1999).

Results and Discussion:

A marine fish, Summer Flounder, can be adapted and grown under APS Process I conditions for a prolonged interval (51 days) with growth rates similar to that exhibited by matched control Summer Flounder in seawater.

Tables I and II display data obtained from identical groups of summer flounder maintained under either seawater (seawater control) or APS Process I freshwater conditions. Water quality and temperatures (16.3° C. vs 17.9° C. average) were comparable. Flounders were successfully adapted to APS Process I conditions without significant mortalities and their overall appearance did not differ significantly from those matched controls that were maintained in seawater.

Overall mortalities of fish during the 51 day test interval was lower in seawater (2/13 or 15.4%) as compared to flounders maintained under APS Process I conditions (5/13 or 38.5%). The average weight gained by all flounders maintain under APS Process I conditions (27.2 gm) was less as compared to overall weight gain of the seawater control group (38.4 gm). Significant weight gains were observed in both groups after intervals of 20 days for APS Process I fish and 37 days for flounder maintained in seawater. Thus, the average specific growth rates (SGR) amongst the surviving flounders in APS Process I (0.53% body weight per day) were comparable to those maintained in seawater (0.6% body weight per day).

In contrast, 100% of marine fish (Cod, Haddock, Hake, Halibut, Mackerel, Pollock, Sea Bass, Swordfish, Tuna, Winter Flounder and Summer Flounder) die within 72 hours of freshwater transfer.

Comparison of the food conversion ratio (FCR) between flounders maintained in APS Process I vs seawater shows that flounders maintained under APS Process I conditions displayed a significantly greater FCR (3.96), as compared to their matched seawater controls (1.99).

FIGS. 1A-B show the individual weight gain performances of tagged flounders maintained under APS Process I or seawater conditions. It is notable that there are wide variations in individual growth rates such that some flounders (e.g. #9 and #11) exhibited steady and significant growth under APS Process I conditions while others showed poor weight gains (e.g. #10) or even lost weight (e.g. #1). Similar performance characteristics were observed for flounder in seawater although the variation in individual performances were less pronounced as compared to flounders maintained in APS Process I.

TABLE I

Growth of Summer Flounder in Freshwater.

APS Freshwater

| Flounder # | | Weight Start | Weight 20 days | Weight 37 days | Weight 51 days | Total Weight Gained |
|---|---|---|---|---|---|---|
| 116 | 1 | 161 | 145 | 144 | 140 | −21 |
| 118 | 2 | 87 | 94 | | | |
| 123 | 3 | 60 | | | | |
| 142 | 4 | 94 | 104 | 115 | 112 | 18 |
| 146 | 5 | 73 | 73 | | | |
| 221 | 6 | 118 | 135 | 145 | 156 | 38 |
| 223 | 7 | 105 | | | | |
| 225 | 8 | 96 | 112 | 124 | 133 | 37 |
| 226 | 9 | 156 | 183 | 203 | 221 | 65 |

TABLE I-continued

Growth of Summer Flounder in Freshwater.

APS Freshwater

| Flounder # | Weight Start | Weight 20 days | Weight 37 days | Weight 51 days | Total Weight Gained |
|---|---|---|---|---|---|
| 227 10 | 162 | 176 | 172 | 180 | 18 |
| 233 11 | 205 | 207 | 220 | 244 | 39 |
| 234 12 | 221 | 224 | | | |
| 235 13 | 150 | 161 | 164 | 174 | 24 |
| Average | 129.8462 | 146.7273 | 160.875 | 170 | 27.2 |
| S. Dev. | 50.15 | 48.34065 | 36.65452 | 44.75648 | |
| p test | | 0.017186 | 0.013243 | 0.0085 | |
| Amount Fed (gm) | | 342 | 315 | 291 | 948 |
| water °C. (Average) | 17.9 | 19.4 | 16.4 | 17.9 | |

FCR 3.96
SGR 0.53% bw/day
Feed conversion ratio (FCR); specific growth rate (SGR)

TABLE II

Growth of Summer Flounder in Seawater.

APS Seawater Total days 51

| Fish # | Weight Start | Weight 20 days | Weight 37 days | Weight 51 days | Total Weight Gained |
|---|---|---|---|---|---|
| 117 | 114 | | | | |
| 118 | 147 | 146 | 168 | 168 | 21 |
| 120 | 60 | 70 | 91 | 94 | 34 |
| 122 | 90 | 115 | 142 | 153 | 63 |
| 126 | 128 | 142 | 174 | 196 | 68 |
| 127 | 67 | 76 | 93 | 105 | 38 |
| 130 | 95 | 90 | 93 | 86 | −9 |
| 131 | 92 | 87 | 101 | 104 | 12 |
| 132 | 93 | 101 | 121 | 127 | 34 |
| 134 | 174 | 191 | 235 | 236 | 62 |
| 139 | 116 | | | | |
| 140 | 121 | 138 | 170 | 175 | 54 |
| 145 | 79 | 87 | 100 | 135 | 56 |
| Average | 105.8462 | 113 | 135.2727 | 143.5455 | 39.36364 |
| S. Dev. | 31.997 | 37.26392 | 46.82327 | 47.05181 | |
| T test | | 0.308845 | 0.041076 | 0.014804 | |
| Amount Fed (gm) | | 301 | 324 | 254 | 879 |

FCR 1.99
SGR 0.6% bw/day
body weight = bw

Taken together, these data demonstrate that summer flounder can be successfully maintained under freshwater conditions using APS Process I for a prolonged interval (51 days) of time. Under normal conditions, summer flounder growth and survival are normally restricted to approximately 25% seawater whereupon the flounders die if the salinity is further reduced. These data form the basis of culture of summer flounder in freshwater environments distant from the marine environment itself where prices for flounder fillets would more than offset the poorer performance (increased mortalities and poorer FCR and weight gains) as compared to seawater controls.

Transferring marine fish to freshwater using APS Process II is expected to provide even better growth rates, than seen with APS Process I. Salmon and Trout that underwent APS Process II exhibited significant increases in growth rates, as illustrated in related applications, patent application Ser. Nos. 09/687,372; 09/687,476; 09/687,477, all entitled, "Methods for Raising Pre-Adult Anadromous Fish," and patent application Ser. No. 09/687,373, entitled "Growing Marine Fish in Fresh Water", all filed on Oct. 12, 2000.

Example 3

The Feed

Two general methods were used to prepare feed for consumption by fish as part of APS Process I and II. These two processes involve either reformulation of feed or addition of a concentration solution for absorption by the feed followed by a top dressing for palatability. This disclosure describes the methodology to prepare feed using each of these 2 methods.

Methods:

Feed Manufacture for Salmon Experiments

To reformulate feed, the ingredients are as follows: Base Diet was made using the following ingredients and procedure: 30% Squid (liquefied in blender), 70% Corey Aquafeeds flounder diet (powderized in blender). Ingredients were blended into a semi moist "dough" ball. Other ingredients including NaCl or PVCR active compounds were blended into the base diet by weight according to experimental parameters.

Moore Clark standard freshwater salmonid diet (sizes 1.2, 1.5, 2.0, 2.5, and 3.5 mm) can also be used. A top dressing was applied to the pellets such that top dressing is composed of 4% of the weight of the Base Diet. Top dressing is composed of 50% krill hydrolysate (Specialty Marine Products Ltd.) and 50% Menhaden fish oil. The top dressing is added for palatability and sealing of added ingredients Other ingredients can include NaCl, $MgCl_2$, $CaCl_2$ or L-Tryptophan that are added by weight to the base diet by weight, as described herein.

Preparation of Feed Containing 7% (weight/weight) NaCl:

For the APS Process I: Solid NaCl or NaCl apportioned at a ratio of 7% of the weight of the Moore Clark standard freshwater salmonid diet weight was added to a volume of tap water approximately 3-4 times the weight of NaCl. The mixture was heated to 60-70° C. with mixing via use of a magnetic stirring bar to dissolve salt. The NaCl solution was then poured into a hand held sprayer and applied to the Moore Clark standard freshwater salmonid diet that is tumbling inside of a 1.5 cubic meter motorized cement mixer. After absorption of the NaCl rich solution, the wetted Moore Clark standard freshwater salmonid diet is spread out thinly on window screening and placed in an enclosed rack system equipped with a fan and 1500 watt heater to expedite drying process. After drying for approximately 6 hr, the dried NaCl-rich pellets are returned to the cement mixer and a top dressing is applied. The feed is stored at room temperature until use.

Preparation of Feed Containing 7% (weight/weight) NaCl+PVCR Agonist (Tryptophan) For the APS Process II: Solid sodium chloride or NaCl apportioned at a ratio of 7% of the weight of the Moore Clark standard freshwater salmonid diet weight was added to a volume of tap water approximately 3-4 times the weight of NaCl. The mixture was heated to 60-70° C. with mixing via use of a magnetic stirring bar to dissolve salt. USP Grade L-Tryptophan was added to the water at either 2 grams or 4 grams for every kg of Moore Clark standard freshwater salmonid diet depending on formulation need. Dilute hydrochloric acid was added to the water with mixing until the tryptophan was dissolved and the pH of solution was approximately 4.0. The NaCl+tryptophan solution was then poured into a hand held sprayer and was then applied to the Moore Clark standard freshwater salmonid diet tumbling inside a cement mixer. After absorption of the NaCl+tryptophan solution, the wetted Moore Clark standard freshwater salmonid diet is then spread out thinly on window screening and placed in an enclosed rack system equipped with a fan and 1500-watt heater to expedite drying process. After drying for approximately 6 hr, the dried NaCl/tryptophan-rich pellets are then returned to the cement mixer and a top dressing is applied. The feed is stored at room temperature until use.

Example 4

DNA and Putative Protein Sequences from Partial Genomic Clones of Polyvalent Cation Receptor Protein Amplified by PCR from the DNA of Several Species of Marine Fish These data provide the partial PVCR genomic sequences isolated in 13 species of marine fish. Each of these nucleotide sequences is unique and thus could be used as a unique probe to isolate the full-length cDNA from each species. Moreover, these nucleotide sequences could form the basis for a specific assay kit(s) for detection of PVCR expression in various tissues of these fish. For example, the kit could optionally include a labeled hybridization probe suitable for in situ hybridization.

The PVCR has been isolated in several species including Cod, Haddock, Hake, Halibut, Mackerel, Pollock, Sea Bass, Swordfish, Tuna, Winter Flounder and Summer Flounder. Sequences of mammalian CaRs together with the nucleotide sequence of SKCaR (FIGS. 14A and 14B) were used to design degenerate oligonucleotide primers to highly conserved regions in the extracellular and transmembrane domains of polyvalent cation receptor proteins using standard methodologies (See G M Preston, "Polymerase chain reaction with degenerate oligonucleotide primers to clone gene family members," Methods in Mol. Biol. Vol. 58, Edited by A. Harwood, Humana Press, pages 303-312, 1993). Using these primers, cDNA or genomic DNA from various fish species representing important commercial products are amplified using standard PCR methodology. Amplified bands are then purified by agarose gel electrophoresis and ligated into appropriate plasmid vector that is transformed into a bacterial strain. After growth in liquid media, vectors and inserts are purified using standard techniques, analyzed by restriction enzyme analysis and sequenced where appropriate. Using this methodology, nucleotide sequences were amplified.

To generate this sequence data, DNA was isolated from tissue samples of each of the species indicated using standard published techniques. DNA was then amplified using polymerase chain reaction (PCR) methodology including 2 degenerate PCR primers (DSK-F3 (5'-TGT CKT GGA CGG AGC CCT TYG GRA TCG C-3'; SEQ ID NO:29) and DSK-R4; (5'-GGC KGG RAT GAA RGA KAT CCA RAC RAT GAA G-3' SEQ ID NO:30). Amplified DNAs were then purified by agarose gel electrophoresis, subcloned into plasmid vectors, amplified, purified and sequenced using standard methods.

FIGS. 12A-C show an aligned genomic DNA sequences of 593 nucleotides for 12 marine fish species, each of which codes for an identical region of the PVCR protein. Note that each nucleotide sequence derived from each specific species is unique. However, alterations in the DNA sequences of these genes often occur at common specific nucleotides within each sequence of 593 nucleotides.

FIGS. 13A-C show aligned corresponding predicted protein sequences derived from genomic nucleotide sequences displayed in FIGS. 12A-D. Note that few alterations in the amino acid sequence of this portion of the PVCR occur as a consequence of alterations in the nucleotide sequence as shown in FIGS. 12A-D. All of these changes (e.g., Ala to Val; Arg to Lys; and Cys to Tyr) are known as "conservative" substitutions of amino acids in that they preserve some combination of the relative size, charge and hydrophobicity of the peptide sequence.

All cited references, patents, and patent applications are incorporated herein by reference in their entirety. Also, companion patent application Ser. No. 10/268,051, entitled "Methods for Growing and Imprinting Fish Using Odorant," filed Oct. 11, 2001; patent application Ser. No. 09/975,553, entitled "Methods for Raising Pre-adult Anadromous Fish," filed Oct. 11, 2001; International Application No. PCT/US01/31704, entitled "Polyvalent Cation-sensing Receptor Proteins in Aquatic Species," filed Oct. 11, 2001. Additionally, patent application Ser. No. 09/687,477, entitled "Methods for Raising Marine Fish," filed on Oct. 12, 2000; patent application Ser. No. 09/687,476, entitled "Methods for Raising Marine Fish," filed on Oct. 12, 2000; patent application Ser. No. 09/687,373, entitled "Methods for Raising Marine Fish," filed on Oct. 12, 2000; Provisional Patent Application No. 60/240,392, entitled "Polyvalent Cation Sensing Receptor Proteins in Aquatic Species," filed on Oct. 12, 2000; Provisional Patent Application No. 60/240,003, entitled "Polyvalent Cation Sensing Receptor Proteins in Aquatic Species," filed on Oct. 12, 2000, are all hereby incorporated by reference in their entirety. Additionally, application Ser. No. 09/162,021, filed on Sep. 28, 1998, International PCT application No. PCT/US97/05031, filed on Mar. 27, 1997, and application Ser. No. 08/622,738 filed Mar. 27, 1996, all entitled, "Polycation Sensing Receptor in Aquatic Species and Methods of Use Thereof" are all hereby incorporated by reference in their entirety.

While this invention has been particularly shown and described with references to preferred embodiments thereof, it will be understood by those skilled in the art that various changes can be made therein without departing from the scope of the invention encompassed by the appended claims.

What is claimed is:

1. A method of growing marine fish in freshwater, comprising:
   a) transferring the marine fish to freshwater having between about 0.3 mM and about 10.0 mM calcium and between about 0.5 mM and 10.0 mM magnesium, and
   b) adding feed to the freshwater, wherein the feed contains at least about 1% NaCl by weight.

2. The method of claim 1, wherein the feed contains about 7% NaCl by weight.

3. The method of claim 1, wherein the feed additionally contains at least one PVCR modulator.

4. The method of claim 3, wherein the at least one PVCR modulator is selected from the group consisting of a divalent cation, a trivalent cation, an aminoglycoside, an organic polycation, an amino acid, a Type I Calcimimetic, a Type II Calcimimetic, 1,25 dihydroxyvitamin D, a cytokine, and macrophage chemotatic peptide-1.

5. The method of claim 3, wherein the at least one PVCR modulator is a PVCR agonist.

6. The method of claim 5, wherein the PVCR agonist is selected from the group consisting of a divalent cation, a trivalent cation, an aminoglycoside, an organic polycation and an amino acid.

7. The method of claim 6, wherein the PVCR agonist is an amino acid.

8. The method of claim 7, wherein the amino acid is L-Tryptophan.

9. The method of claim 8, wherein the feed additionally contains about 0.2% L-Tryptophan by weight.

10. The method of claim 8, wherein the feed additionally contains about 0.4% L-Tryptophan by weight.

11. The method of claim 1, wherein the marine fish is selected from the group consisting of Cod, Haddock, Hake, Halibut, Mackerel, Pollock, Sea Bass, Swordfish, Tuna, Winter Flounder, and Summer Flounder.

12. A method of growing flounder in freshwater, comprising:
   a) transferring the flounder to freshwater having at least one PVCR modulator in an amount sufficient to modulate or maintain expression and/or sensitivity of at least one PVCR in one or more tissues, wherein the freshwater has a pH that is greater than 7.0; and
   b) adding feed for fish consumption to the freshwater, wherein the feed contains at least about 1% NaCl by weight.

13. The method of claim 12, wherein the at least one PVCR modulator is selected from the group consisting of a divalent cation, a trivalent cation, an aminoglycoside, a organic polycation, an amino acid, a Type I Calcimimetic, a Type II Calcimimetic, 1,25 dihydroxyvitamin D, a cytokine, and macrophage chemotatic peptide-1.

* * * * *

SEQUENCE LISTING

<160> NUMBER OF SEQ ID NOS: 30

<210> SEQ ID NO 1
<211> LENGTH: 594
<212> TYPE: DNA
<213> ORGANISM: Cod

<400> SEQUENCE: 1

```
cctgacaata ttcgcagtgc tgggagtctt gctgacggcc ttcgtcctag gggtgtttgc     60
ccgattccgc aacactccca tcgtgaaggc caccaaccgg gagctgtcct acctcctcct    120
cttctccctg gtctgctgct tctccagctc tcttatgttc atcggtgaac cccaggactg    180
gacgtgccgc ctgcgccagc cggccttcgg gatcagcttc gtcctctgca tctcctgcat    240
cctggtcaag accaaccgcg tgctgctcgt cttcgaggcc aagatcccca ccagtctcca    300
ccgcaagtgg tggggcctga acctgcagtt cttgctggtg ttcctgtgca ccttcgtcca    360
ggtgatgatt tgcgtggtct ggctctacaa cgccccgccg gccagctcca agaaccacga    420
catcgatgag atcatcttca tcacctgcaa cgagggctcc atgatggccc tgggctttct    480
gatcggctac acctgtctcc ttgccgccat ttgcttcttc ttcgcgttca atcgcgcaa     540 actcccggag aacttcacag aggcgaagtt catcacgttt agcatgctga tatt          594
```

<210> SEQ ID NO 2
<211> LENGTH: 197
<212> TYPE: PRT
<213> ORGANISM: Cod

<400> SEQUENCE: 2

```
Leu Thr Ile Phe Ala Val Leu Gly Val Leu Leu Thr Ala Phe Val Leu
1               5                   10                  15

Gly Val Phe Ala Arg Phe Arg Asn Thr Pro Ile Val Lys Ala Thr Asn
            20                  25                  30

Arg Glu Leu Ser Tyr Leu Leu Leu Phe Ser Leu Val Cys Cys Phe Ser
        35                  40                  45

Ser Ser Leu Met Phe Ile Gly Glu Pro Gln Asp Trp Thr Cys Arg Leu
    50                  55                  60

Arg Gln Pro Ala Phe Gly Ile Ser Phe Val Leu Cys Ile Ser Cys Ile
65                  70                  75                  80

Leu Val Lys Thr Asn Arg Val Leu Leu Val Phe Glu Ala Lys Ile Pro
                85                  90                  95

Thr Ser Leu His Arg Lys Trp Trp Gly Leu Asn Leu Gln Phe Leu Leu
            100                 105                 110

Val Phe Leu Cys Thr Phe Val Gln Val Met Ile Cys Val Val Trp Leu
        115                 120                 125

Tyr Asn Ala Pro Pro Ala Ser Ser Lys Asn His Asp Ile Asp Glu Ile
    130                 135                 140

Ile Phe Ile Thr Cys Asn Glu Gly Ser Met Met Ala Leu Gly Phe Leu
145                 150                 155                 160

Ile Gly Tyr Thr Cys Leu Leu Ala Ala Ile Cys Phe Phe Phe Ala Phe
                165                 170                 175
```

```
Lys Ser Arg Lys Leu Pro Glu Asn Phe Thr Glu Ala Lys Phe Ile Thr
            180                 185                 190
Phe Ser Met Leu Ile
        195

<210> SEQ ID NO 3
<211> LENGTH: 594
<212> TYPE: DNA
<213> ORGANISM: Haddock

<400> SEQUENCE: 3
cctgacaata ttcgcagtgc tgggagtctt gctgacggcc ttcgtcctag gggtgtttgc      60
ccgattccgc aacactccca tcgtgaaggc caccaaccgg grgctgtcct acctcctcct     120
cttctccctg gtctgctgct ctccagctc tctaatgttc atcggcgaac cccaggactg     180
gacgtgccgt ctgcgccagc cggccttcgg gatcagcttc gtcctctgca tctcctgcat     240
cctggtcaag accaaccgcg tgctgctcgt cttcgaggcc aagatcccca ccagtctcca     300
ccgcaagtgg tggggcctga acctgcagtt cctgctggtg ttcctgtgca ccttcgtcca     360
ggtgatgatt tgygtggtct ggctctacaa cgccccgccg ccagctcca agaaccacga      420 cattgatgag atcatcttca tcacctgcaa cgagggctcc atgatggccc tgggctttct     480
gatcggctac acctgtctcc tcgccgccat ttgcttcttc ttcgcgttca aatcgcgcaa     540
actcccggag aacttcacag aggcgaagtt catcacgttc agcatgctga tatt           594

<210> SEQ ID NO 4
<211> LENGTH: 197
<212> TYPE: PRT
<213> ORGANISM: Haddock
<220> FEATURE:
<221> NAME/KEY: VARIANT
<222> LOCATION: 34
<223> OTHER INFORMATION: Xaa=any amino acid

<400> SEQUENCE: 4

Leu Thr Ile Phe Ala Val Leu Gly Val Leu Thr Ala Phe Val Leu
  1               5                  10                  15

Gly Val Phe Ala Arg Phe Arg Asn Thr Pro Ile Val Lys Ala Thr Asn
                20                  25                  30

Arg Xaa Leu Ser Tyr Leu Leu Leu Phe Ser Leu Val Cys Cys Phe Ser
            35                  40                  45

Ser Ser Leu Met Phe Ile Gly Glu Pro Gln Asp Trp Thr Cys Arg Leu
    50                  55                  60

Arg Gln Pro Ala Phe Gly Ile Ser Phe Val Leu Cys Ile Ser Cys Ile
 65                 70                  75                  80

Leu Val Lys Thr Asn Arg Val Leu Leu Val Phe Glu Ala Lys Ile Pro
                85                  90                  95

Thr Ser Leu His Arg Lys Trp Trp Gly Leu Asn Leu Gln Phe Leu Leu
            100                 105                 110

Val Phe Leu Cys Thr Phe Val Gln Val Met Ile Cys Val Val Trp Leu
        115                 120                 125

Tyr Asn Ala Pro Pro Ala Ser Ser Lys Asn His Asp Ile Asp Glu Ile
    130                 135                 140

Ile Phe Ile Thr Cys Asn Glu Gly Ser Met Met Ala Leu Gly Phe Leu
145                 150                 155                 160

Ile Gly Tyr Thr Cys Leu Leu Ala Ala Ile Cys Phe Phe Phe Ala Phe
                165                 170                 175
```

Lys Ser Arg Lys Leu Pro Glu Asn Phe Thr Glu Ala Lys Phe Ile Thr
            180                 185                 190

Phe Ser Met Leu Ile
        195

<210> SEQ ID NO 5
<211> LENGTH: 594
<212> TYPE: DNA
<213> ORGANISM: Hake

<400> SEQUENCE: 5

```
gctgacaata ttcgccgtgc tcggcgtggt gctcacagcc ttcgtcatgg gggtgtttgt      60
ccgattccgc aacactccca tcgtgaaggc caccaacagg gagctgtcct acctgctcct     120
cttctccctc gtctgctgct tctccagctc cctcatgttc atcggcgaac cgcaggactg     180
gacgtgccgc ctccgccagc cggccttcgg catcagcttc gtcctctgca tctcctgcat     240
cttggtcaag accaaccgcg tgctgctcgt cttcgaggcc aagatcccca ccagcctcca     300
ccgcaagtgg tggggcttga acctgcagtt cctgctggtg ttcctgtgca cctttgtcca     360
ggtgatgatc tgcgtggtgt ggctgtacaa cgccccgccg ccagctcca agaaccacga     420
catcgatgag atcatcttca tcacctgcaa cgagggctcc atgatggccc tgggctttct     480
gatcggctac acttgcatcc tcgccgctat ctgcttcttc ttcgcgttca gtcgcgcaa      540
actccccgag aacttcacgg aggccaagtt catcacgttc agcatgctga tatt          594
```

<210> SEQ ID NO 6
<211> LENGTH: 197
<212> TYPE: PRT
<213> ORGANISM: Hake

<400> SEQUENCE: 6

Leu Thr Ile Phe Ala Val Leu Gly Val Val Leu Thr Ala Phe Val Met
 1               5                  10                  15

Gly Val Phe Val Arg Phe Arg Asn Thr Pro Ile Val Lys Ala Thr Asn
             20                  25                  30

Arg Glu Leu Ser Tyr Leu Leu Leu Phe Ser Leu Val Cys Cys Phe Ser
         35                  40                  45

Ser Ser Leu Met Phe Ile Gly Glu Pro Gln Asp Trp Thr Cys Arg Leu
     50                  55                  60

Arg Gln Pro Ala Phe Gly Ile Ser Phe Val Leu Cys Ile Ser Cys Ile
 65                  70                  75                  80

Leu Val Lys Thr Asn Arg Val Leu Leu Val Phe Glu Ala Lys Ile Pro
                 85                  90                  95

Thr Ser Leu His Arg Lys Trp Trp Gly Leu Asn Leu Gln Phe Leu Leu
            100                 105                 110

Val Phe Leu Cys Thr Phe Val Gln Val Met Ile Cys Val Val Trp Leu
        115                 120                 125

Tyr Asn Ala Pro Pro Ala Ser Ser Lys Asn His Asp Ile Asp Glu Ile
    130                 135                 140

Ile Phe Ile Thr Cys Asn Glu Gly Ser Met Met Ala Leu Gly Phe Leu
145                 150                 155                 160

Ile Gly Tyr Thr Cys Ile Leu Ala Ala Ile Cys Phe Phe Phe Ala Phe
                165                 170                 175

Lys Ser Arg Lys Leu Pro Glu Asn Phe Thr Glu Ala Lys Phe Ile Thr
            180                 185                 190

Phe Ser Met Leu Ile
        195

<210> SEQ ID NO 7
<211> LENGTH: 594
<212> TYPE: DNA
<213> ORGANISM: Halibut

<400> SEQUENCE: 7

```
gttgaccata tgtgcggcgc tgggtgttgc cttgacaggc ttcgtgatgg ccgtctttgt      60
cagattccgc aacacccca tagtgaaggc cacgaaccga gaactgtcct acgtcctcct     120
gttctctctc atctgttgct tctccagctc cctcatcttc ataggagagc cgcaggattg     180
gatgtgccgc ttacgccaac ctgcctttgg gatcagtttt gttctctgta tctcgtgcat     240
ccttgtcaaa acaaacagag tcctcttggt gtttgaagcc aagatcccta caagtctcca     300
tcgtaaaygg tgggggttaa rcctacagtt cctgctggtg tttctgtgca catttgtcca     360
agtcatgata tgtgtggtct ggctgtacaa cgccccacct tccagttaca ggaattatga     420
catagatgag atgattttta tcacatgtaa cgagggctct gtaatggctc ttgggtttct     480
tattggctat acatgcctgc tggccgctat aygttcttc tttgcgttta aatcacggaa     540
acttccagaa aacttcacag aggctaagtt catcactttt agtatgctca tatt           594
```

<210> SEQ ID NO 8
<211> LENGTH: 197
<212> TYPE: PRT
<213> ORGANISM: Halibut
<220> FEATURE:
<221> NAME/KEY: VARIANT
<222> LOCATION: 103, 107, 171
<223> OTHER INFORMATION: Xaa=any amino acid

<400> SEQUENCE: 8

Leu Thr Ile Cys Ala Ala Leu Gly Val Ala Leu Thr Gly Phe Val Met
1               5                   10                  15

Ala Val Phe Val Arg Phe Arg Asn Thr Pro Ile Val Lys Ala Thr Asn
            20                  25                  30

Arg Glu Leu Ser Tyr Val Leu Leu Phe Ser Leu Ile Cys Cys Phe Ser
        35                  40                  45

Ser Ser Leu Ile Phe Ile Gly Glu Pro Gln Asp Trp Met Cys Arg Leu
    50                  55                  60

Arg Gln Pro Ala Phe Gly Ile Ser Phe Val Leu Cys Ile Ser Cys Ile
65                  70                  75                  80

Leu Val Lys Thr Asn Arg Val Leu Leu Val Phe Glu Ala Lys Ile Pro
                85                  90                  95

Thr Ser Leu His Arg Lys Xaa Trp Gly Leu Xaa Leu Gln Phe Leu Leu
            100                 105                 110

Val Phe Leu Cys Thr Phe Val Gln Val Met Ile Cys Val Val Trp Leu
        115                 120                 125

Tyr Asn Ala Pro Pro Ser Ser Tyr Arg Asn Tyr Asp Ile Asp Glu Met
    130                 135                 140

Ile Phe Ile Thr Cys Asn Glu Gly Ser Val Met Ala Leu Gly Phe Leu
145                 150                 155                 160

Ile Gly Tyr Thr Cys Leu Leu Ala Ala Ile Xaa Phe Phe Phe Ala Phe
                165                 170                 175

Lys Ser Arg Lys Leu Pro Glu Asn Phe Thr Glu Ala Lys Phe Ile Thr
            180                 185                 190

Phe Ser Met Leu Ile
        195

<210> SEQ ID NO 9
<211> LENGTH: 594
<212> TYPE: DNA
<213> ORGANISM: Mackerel

<400> SEQUENCE: 9

```
tttggccata tgtgcagtgc ttggtgttgt cttgacagct tttgtaatgg gagtatttgt      60
cagatttcgc aacaccccaa tagtgaaggc cacaaaccgg gaactatcgt acgtcctcct     120
gttctcactt atctgctgct tctccagctc tctcatcttc atcggagagc caaggattg     180
gatgtgccgt ttgcgccaac ctgcctttgg gatcagtttt gttctgtgta tctcctgtat     240
ccttgtgaaa actaacagag tccttttggt ttttgaagct aagatcccaa caagtctcca     300
ccgtaaatgg tggggattaa acctgcagtt tcttttggtg tttctctgca catttgtcca     360
agtaatgata tgtgtggttt ggctttacaa cgcccctcct tccagttata tgatccatga     420
cattgatgag ataatttta tcacctgcaa tgagggctct gtgatggctc ttggcttct     480
tattggctac acctgcctcc tggcagctat atgtttcttc tttgcattta aatcacgaaa     540
acttccagaa aactttacag aagccaagtt catcactttt agcatgctca tatt          594
```

<210> SEQ ID NO 10
<211> LENGTH: 197
<212> TYPE: PRT
<213> ORGANISM: Mackerel

<400> SEQUENCE: 10

Leu Ala Ile Cys Ala Val Leu Gly Val Val Leu Thr Ala Phe Val Met
1               5                   10                  15

Gly Val Phe Val Arg Phe Arg Asn Thr Pro Ile Val Lys Ala Thr Asn
            20                  25                  30

Arg Glu Leu Ser Tyr Val Leu Leu Phe Ser Leu Ile Cys Cys Phe Ser
        35                  40                  45

Ser Ser Leu Ile Phe Ile Gly Glu Pro Lys Asp Trp Met Cys Arg Leu
    50                  55                  60

Arg Gln Pro Ala Phe Gly Ile Ser Phe Val Leu Cys Ile Ser Cys Ile
65                  70                  75                  80

Leu Val Lys Thr Asn Arg Val Leu Leu Val Phe Glu Ala Lys Ile Pro
                85                  90                  95

Thr Ser Leu His Arg Lys Trp Trp Gly Leu Asn Leu Gln Phe Leu Leu
            100                 105                 110

Val Phe Leu Cys Thr Phe Val Gln Val Met Ile Cys Val Val Trp Leu
        115                 120                 125

Tyr Asn Ala Pro Pro Ser Ser Tyr Met Ile His Asp Ile Asp Glu Ile
    130                 135                 140

Ile Phe Ile Thr Cys Asn Glu Gly Ser Val Met Ala Leu Gly Phe Leu
145                 150                 155                 160

Ile Gly Tyr Thr Cys Leu Leu Ala Ala Ile Cys Phe Phe Phe Ala Phe
                165                 170                 175

Lys Ser Arg Lys Leu Pro Glu Asn Phe Thr Glu Ala Lys Phe Ile Thr
            180                 185                 190

Phe Ser Met Leu Ile
        195

<210> SEQ ID NO 11
<211> LENGTH: 594
<212> TYPE: DNA
<213> ORGANISM: Pollack

<400> SEQUENCE: 11

```
cctgacaata ttcgcagtgc taggagtctt gctgacagcc ttcgtcctgg gggtgttcgc      60
ccgattccgt aacactccma ttgtgaaggc caccaaccgg gagctgtcct acctcctcct     120
cttctccctg gtctgctgct ctccagctc tctaatgttc atcggcgaac cccaggactg     180
gacgtgccgt ctgcgccagc cggccttcgg gatcagcttc gtcctctgca tctcctgcat     240
cctggtcaag accaaccgcg tgctgctcgt cttcgaggcc aagatcccca ccagtctcca     300
ccgcaagtgg tggggcctga acctgcagtt cctgctggtg ttcctgtgca ccttcgtcca     360
ggtgatgatt tgcgtggtct ggctctacaa cgccccgccg ccagctcca agaaccacga     420
catcgatgag atcatcttca tcacctgcaa cgagggctcc atgatggccc tgggctttct     480
gatcggctac acctgtctcc tcgccgccat ttgcttcttc ttcgcgttca aatcgcgcaa     540
actcccggag aacttcacag aggcgaagtt catcacgttc agcatgctga tatt          594
```

<210> SEQ ID NO 12
<211> LENGTH: 197
<212> TYPE: PRT
<213> ORGANISM: Pollock

<400> SEQUENCE: 12

```
Leu Thr Ile Phe Ala Val Leu Gly Val Leu Thr Ala Phe Val Leu
1               5                   10                  15

Gly Val Phe Ala Arg Phe Arg Asn Thr Pro Ile Val Lys Ala Thr Asn
            20                  25                  30

Arg Glu Leu Ser Tyr Leu Leu Leu Phe Ser Leu Val Cys Cys Phe Ser
        35                  40                  45

Ser Ser Leu Met Phe Ile Gly Glu Pro Gln Asp Trp Thr Cys Arg Leu
    50                  55                  60

Arg Gln Pro Ala Phe Gly Ile Ser Phe Val Leu Cys Ile Ser Cys Ile
65                  70                  75                  80

Leu Val Lys Thr Asn Arg Val Leu Leu Val Phe Glu Ala Lys Ile Pro
                85                  90                  95

Thr Ser Leu His Arg Lys Trp Trp Gly Leu Asn Leu Gln Phe Leu Leu
            100                 105                 110

Val Phe Leu Cys Thr Phe Val Gln Val Met Ile Cys Val Val Trp Leu
        115                 120                 125

Tyr Asn Ala Pro Pro Ala Ser Ser Lys Asn His Asp Ile Asp Glu Ile
    130                 135                 140

Ile Phe Ile Thr Cys Asn Glu Gly Ser Met Met Ala Leu Gly Phe Leu
145                 150                 155                 160

Ile Gly Tyr Thr Cys Leu Leu Ala Ala Ile Cys Phe Phe Phe Ala Phe
                165                 170                 175

Lys Ser Arg Lys Leu Pro Glu Asn Phe Thr Glu Ala Lys Phe Ile Thr
            180                 185                 190

Phe Ser Met Leu Ile
        195
```

<210> SEQ ID NO 13
<211> LENGTH: 594
<212> TYPE: DNA
<213> ORGANISM: Sea Bass

<400> SEQUENCE: 13

```
tttggccata tgtgcagtac tgggtgtggt catgacagcg tttgtgatgg gagtctttgt      60
cagatttcgc aacaccccaa tagtgaagac cacaaaccga gaactgtcct acgtcctcct     120
attctcactg atctgctgct ctccagctc cctcgtcttc attggagagc cacaggattg     180
gacatgtcgt ttacgtcaac ctgcctttgg tatcagcttt gttctctgta tctcctgcat     240
ccttgtgaaa acaaacagag tacttttggt atttgaagct aagatcccca caagtctcca     300
tcgtaaatgg tggggattga acctgcagtt cctgctggtg tttctgtgca catttgtcca     360
agtcatgata tgtgtggtat ggctttacaa cgcccctcct ccagctaca ggaatcacga     420
cattgatgaa atcattttta tcacctgcaa tgagggatct gtgatggctc ttgggtttct     480
tattggccac acgtgcctcc tggcagctat atgttttttc tttgcattca aatctcggaa     540
acttccagaa aactttacag aggcaaagtt catcaccttt agcatgctaa tatt           594
```

<210> SEQ ID NO 14
<211> LENGTH: 197
<212> TYPE: PRT
<213> ORGANISM: Sea Bass

<400> SEQUENCE: 14

```
Leu Ala Ile Cys Ala Val Leu Gly Val Val Met Thr Ala Phe Val Met
 1               5                  10                  15
Gly Val Phe Val Arg Phe Arg Asn Thr Pro Ile Val Lys Thr Thr Asn
                20                  25                  30
Arg Glu Leu Ser Tyr Val Leu Leu Phe Ser Leu Ile Cys Cys Phe Ser
            35                  40                  45
Ser Ser Leu Val Phe Ile Gly Glu Pro Gln Asp Trp Thr Cys Arg Leu
        50                  55                  60
Arg Gln Pro Ala Phe Gly Ile Ser Phe Val Leu Cys Ile Ser Cys Ile
 65                 70                  75                  80
Leu Val Lys Thr Asn Arg Val Leu Leu Val Phe Glu Ala Lys Ile Pro
                85                  90                  95
Thr Ser Leu His Arg Lys Trp Trp Gly Leu Asn Leu Gln Phe Leu Leu
            100                 105                 110
Val Phe Leu Cys Thr Phe Val Gln Val Met Ile Cys Val Val Trp Leu
        115                 120                 125
Tyr Asn Ala Pro Pro Ser Ser Tyr Arg Asn His Asp Ile Asp Glu Ile
    130                 135                 140
Ile Phe Ile Thr Cys Asn Glu Gly Ser Val Met Ala Leu Gly Phe Leu
145                 150                 155                 160
Ile Gly His Thr Cys Leu Leu Ala Ala Ile Cys Phe Phe Phe Ala Phe
                165                 170                 175
Lys Ser Arg Lys Leu Pro Glu Asn Phe Thr Glu Ala Lys Phe Ile Thr
            180                 185                 190
Phe Ser Met Leu Ile
        195
```

<210> SEQ ID NO 15
<211> LENGTH: 594
<212> TYPE: DNA
<213> ORGANISM: Swordfish

<400> SEQUENCE: 15

```
cttggcatta tgctctgtgc tgggggtatt cttgacrgca ttcgtgatgg gagtgtttat      60
```

-continued

```
caaatttcgc aacaccccaa ttgttaaggc cacaaacaga gagctatcct acctcctcct      120
gttctcactc atctgctgtt tctccagttc cctcatcttc attggtgaac cccaggactg      180
gacatgccgt ctacgccagc ctgcattcgg gataagtttt gttctctgca tctcctgcat      240
cctggtaaaa actaaccgag tacttctagt gttcgaagcc aagatcccca ccagtctcca      300
tcgtaagtgg tggggctaa acttgcagtt cctgttagtg ttcctgttca catttgtgca       360
agtgatgata tgtgtggtct ggctttacaa tgctcctccg gcgagctaca ggaaccatga      420
cattgatgag ataattttca ttacatgcaa tgagggctct atgatggcgc ttggcttcct      480
aattgggtac acatgcctgc tggcagccat atgcttcttc tttgcattta aatcacgaaa      540
actgccagag aactttactg aggctaagtt catcaccttc agcatgctca tctt            594
```

<210> SEQ ID NO 16
<211> LENGTH: 197
<212> TYPE: PRT
<213> ORGANISM: Swordfish

<400> SEQUENCE: 16

```
Leu Ala Leu Cys Ser Val Leu Gly Val Phe Leu Thr Ala Phe Val Met
1               5                   10                  15

Gly Val Phe Ile Lys Phe Arg Asn Thr Pro Ile Val Lys Ala Thr Asn
            20                  25                  30

Arg Glu Leu Ser Tyr Leu Leu Leu Phe Ser Leu Ile Cys Cys Phe Ser
        35                  40                  45

Ser Ser Leu Ile Phe Ile Gly Glu Pro Gln Asp Trp Thr Cys Arg Leu
    50                  55                  60

Arg Gln Pro Ala Phe Gly Ile Ser Phe Val Leu Cys Ile Ser Cys Ile
65                  70                  75                  80

Leu Val Lys Thr Asn Arg Val Leu Leu Val Phe Glu Ala Lys Ile Pro
                85                  90                  95

Thr Ser Leu His Arg Lys Trp Trp Gly Leu Asn Leu Gln Phe Leu Leu
            100                 105                 110

Val Phe Leu Phe Thr Phe Val Gln Val Met Ile Cys Val Val Trp Leu
        115                 120                 125

Tyr Asn Ala Pro Pro Ala Ser Tyr Arg Asn His Asp Ile Asp Glu Ile
    130                 135                 140

Ile Phe Ile Thr Cys Asn Glu Gly Ser Met Met Ala Leu Gly Phe Leu
145                 150                 155                 160

Ile Gly Tyr Thr Cys Leu Leu Ala Ala Ile Cys Phe Phe Phe Ala Phe
                165                 170                 175

Lys Ser Arg Lys Leu Pro Glu Asn Phe Thr Glu Ala Lys Phe Ile Thr
            180                 185                 190

Phe Ser Met Leu Ile
        195
```

<210> SEQ ID NO 17
<211> LENGTH: 594
<212> TYPE: DNA
<213> ORGANISM: Tuna

<400> SEQUENCE: 17

```
tttggccata tgtgcagtgc tgggtgttgt cttgacagct tttgtaatgg gagtgtttgt       60
cagatttcgc aacaccccaa tagtgaaggc cacaaaccga gaactgtctt acgtccttct      120
gttctcactt atctgttgct ctccagctc tctcatcttc atcggagagc cgaaggattg      180
```

```
gatgtgccgt tgcgccaac ctgcctttgg gatcagtttt gttctttgta tttcctgcat    240
ccttgtgaaa acaaatagag tgcttttggt atttgaagcc aagatcccaa caagtctcca    300
ccgtaaatgg tggggattaa acctgcagtt tcttttggtg tttctctgca catttgtcca    360
agtaatgata tgtgtggtct ggctttacaa tgcccctcct ccagctata tgaaccatga    420 cattgatgag attattttta tcacctgcaa cgagggctct gtgatggctc ttgggtttct    480
tatcggctac acgtgcctcc tggcggctat atgtttcttc tttgcattta aatcacgaaa    540
acttccagaa aactttacag aggctaagtt catcactttt agcatgctca tatt          594
```

<210> SEQ ID NO 18
<211> LENGTH: 197
<212> TYPE: PRT
<213> ORGANISM: Tuna

<400> SEQUENCE: 18

```
Leu Ala Ile Cys Ala Val Leu Gly Val Val Leu Thr Ala Phe Val Met
1               5                   10                  15

Gly Val Phe Val Arg Phe Arg Asn Thr Pro Ile Val Lys Ala Thr Asn
            20                  25                  30

Arg Glu Leu Ser Tyr Val Leu Leu Phe Ser Leu Ile Cys Cys Phe Ser
        35                  40                  45

Ser Ser Leu Ile Phe Ile Gly Glu Pro Lys Asp Trp Met Cys Arg Leu
    50                  55                  60

Arg Gln Pro Ala Phe Gly Ile Ser Phe Val Leu Cys Ile Ser Cys Ile
65                  70                  75                  80

Leu Val Lys Thr Asn Arg Val Leu Leu Val Phe Glu Ala Lys Ile Pro
                85                  90                  95

Thr Ser Leu His Arg Lys Trp Trp Gly Leu Asn Leu Gln Phe Leu Leu
            100                 105                 110

Val Phe Leu Cys Thr Phe Val Gln Val Met Ile Cys Val Val Trp Leu
        115                 120                 125

Tyr Asn Ala Pro Pro Ser Ser Tyr Met Asn His Asp Ile Asp Glu Ile
    130                 135                 140

Ile Phe Ile Thr Cys Asn Glu Gly Ser Val Met Ala Leu Gly Phe Leu
145                 150                 155                 160

Ile Gly Tyr Thr Cys Leu Leu Ala Ala Ile Cys Phe Phe Phe Ala Phe
                165                 170                 175

Lys Ser Arg Lys Leu Pro Glu Asn Phe Thr Glu Ala Lys Phe Ile Thr
            180                 185                 190

Phe Ser Met Leu Ile
        195
```

<210> SEQ ID NO 19
<211> LENGTH: 2229
<212> TYPE: DNA
<213> ORGANISM: Winter Flounder

<400> SEQUENCE: 19

```
ccacgcgtcc gggagatggt caggagaaac atcacagatc gcatttggct agccagcgaa    60
gcgtgggcca gctcttccct tattgccaaa ccagagtatc ttgacgttgt ggcaggaact   120
attggctttg ctctgaaggc agggggtata ccaggcttta gggagttctt acaacatgtc   180
caaccaaaga aagacagtca taatgaattt gtcagggagt tttgggaaga aaccttcaac   240
tgttatctgg aggacagccc aagactgcaa gaatgtggca gcactagttt caggcctttg   300
```

```
tgcacaggtg aggaagacat cacaagcgtc gagaccccgt acctggactt cacacacctt    360
cgaatctcct ataatgtata tgttgcagtg tattccattg cacaggccct gcaggacatt    420
cttacctgca cacctggaca tggacttttt gccaacaatt cctgtgcaga tataaagaaa    480
atggaagcct ggcaggtcct gaagcagctg agacatttaa actacaccaa cagtatgggg    540
gaaaagatcc actttgatga aatgacgac  ctggctgcaa actacatgat cataaactgg    600
cacaggtcca ctgaagacgg ctctgtggtg ttcgaggagg ttggatacta ccacatgcac    660
gcgaagagag gggccaaact gctcattgac aggacaaaga ttctgtggaa tggatacagt    720
tcagaggtgc cattctcgaa ctgcagtgag gactgtgatc ctggcacaag aaagggcatc    780
atagatagta tgcccacatg ctgctttgaa tgcactgagt gctcagatgg agaatacagt    840
actcacaaag atgccagtgt tgcaccaag  tgtccaaata actcctggtc caatgggaac    900
cacacgttct gcttcctgaa ggaaattgag tttctctcct ggacagaacc tttcgggata    960
gcgttgacca tatgtgcagt gctgggtgtt gccctgacgg gcttcgtgat ggccgtcttt   1020
gtccgattcc gcaacacccc aatagtgaaa gccacgaacc gagaactgtc ctacgtcctc   1080
ctgttctctc tcatctgttg cttctccagc tccctcatct tcataggaga gccgcaggat   1140
tggatgtgcc gcttacgcca accggccttt gggatcagtt tgttctctg  tatctcgtgc   1200 atccttgtga aaacaaaccg agtcctcttg gtgtttgaag ccaagatccc gacaagtctc   1260
catcgtaaat ggtgggggtt aaacctacag ttcctgctgg tgtttctgtg cacatttgtc   1320
caagtcatga tatgtgtggt ctggctgtac aacgccccac cttccagtta caggaattat   1380
gacatagatg agatgatttt tatcacatgt aatgaaggct ctgtaatggc tcttgggttt   1440
cttattggct atacatgcct gctggccgct atatgtttct tctttgcatt caaatcacgg   1500
aaacttccag aaaacttcac cgaggctaag ttcatcactt ttagtatgct catattcttt   1560
atcgtttgga tctctttcat ccctgcctac ttcagtactt acggaaagtt tgtttcagcg   1620
gtggaggtca ttgccatact ggcctccagc tttgggatgc tggcctgcat cttcttcaac   1680
aaggtctaca tcatcctttt caaaccgtcc cggaacacca tcgaggaggt ccggtgcagc   1740
acctcagccc acgctttcaa agtggcggca aaggctactc taaagcatag cacggcttca   1800
cggagaaagt cgggcagcac tggtggatct tctgactcca cgccgtcatc gtccatcagc   1860
ctgaagacca atggcaatga cccgacttca ggaaagccca gggtgagctt tggcagtgga   1920
acagttactt tgtccttgag cttcgaggag tcgaggagga ttctctgat  gtgatagaat   1980 atgtgtggct ctgtcaagtt tcagcttcat ctgtgtcatt aatagggtgt tttgttttgt   2040
tttttacacg taaaccttta catctttcct ttttcctaac attttgtccg gaatatgatc   2100
atcactccaa ctaatatact gcacctgaat cctgtgtctt gttaatgtgt agtaaatctg   2160
ctagtaatat tcacaaaacg ttttgtacaa ttaaaaaact ttatatgatc aaaaaaaaaa   2220
aaaaaaaag                                                           2229
```

<210> SEQ ID NO 20
<211> LENGTH: 657
<212> TYPE: PRT
<213> ORGANISM: Winter Flounder

<400> SEQUENCE: 20

```
Pro Arg Val Arg Glu Met Val Arg Arg Asn Ile Thr Asp Arg Ile Trp
1               5                   10                  15

Leu Ala Ser Glu Ala Trp Ala Ser Ser Ser Leu Ile Ala Lys Pro Glu
```

-continued

```
                 20                  25                  30
Tyr Leu Asp Val Val Ala Gly Thr Ile Gly Phe Ala Leu Lys Ala Gly
             35                  40                  45
Gly Ile Pro Gly Phe Arg Glu Phe Leu Gln His Val Gln Pro Lys Lys
         50                  55                  60
Asp Ser His Asn Glu Phe Val Arg Glu Phe Trp Glu Thr Phe Asn
 65                  70                  75                  80
Cys Tyr Leu Glu Asp Ser Pro Arg Leu Gln Glu Cys Gly Ser Thr Ser
                 85                  90                  95
Phe Arg Pro Leu Cys Thr Gly Glu Glu Asp Ile Thr Ser Val Glu Thr
             100                 105                 110
Pro Tyr Leu Asp Phe Thr His Leu Arg Ile Ser Tyr Asn Val Tyr Val
             115                 120                 125
Ala Val Tyr Ser Ile Ala Gln Ala Leu Gln Asp Ile Leu Thr Cys Thr
         130                 135                 140
Pro Gly His Gly Leu Phe Ala Asn Asn Ser Cys Ala Asp Ile Lys Lys
 145                 150                 155                 160
Met Glu Ala Trp Gln Val Leu Lys Gln Leu Arg His Leu Asn Tyr Thr
                 165                 170                 175
Asn Ser Met Gly Glu Lys Ile His Phe Asp Glu Asn Asp Asp Leu Ala
             180                 185                 190
Ala Asn Tyr Met Ile Ile Asn Trp His Arg Ser Thr Glu Asp Gly Ser
         195                 200                 205
Val Val Phe Glu Glu Val Gly Tyr Tyr His Met His Ala Lys Arg Gly
     210                 215                 220
Ala Lys Leu Leu Ile Asp Arg Thr Lys Ile Leu Trp Asn Gly Tyr Ser
 225                 230                 235                 240
Ser Glu Val Pro Phe Ser Asn Cys Ser Glu Asp Cys Asp Pro Gly Thr
                 245                 250                 255
Arg Lys Gly Ile Ile Asp Ser Met Pro Thr Cys Cys Phe Glu Cys Thr
             260                 265                 270
Glu Cys Ser Asp Gly Glu Tyr Ser Thr His Lys Asp Ala Ser Val Cys
         275                 280                 285
Thr Lys Cys Pro Asn Asn Ser Trp Ser Asn Gly His Thr Phe Cys
 290                 295                 300
Phe Leu Lys Glu Ile Glu Phe Leu Ser Trp Thr Glu Pro Phe Gly Ile
 305                 310                 315                 320
Ala Leu Thr Ile Cys Ala Val Leu Gly Val Ala Leu Thr Gly Phe Val
                 325                 330                 335
Met Ala Val Phe Val Arg Phe Arg Asn Thr Pro Ile Val Lys Ala Thr
             340                 345                 350
Asn Arg Glu Leu Ser Tyr Val Leu Leu Phe Ser Leu Ile Cys Cys Phe
         355                 360                 365
Ser Ser Ser Leu Ile Phe Ile Gly Glu Pro Gln Asp Trp Met Cys Arg
     370                 375                 380
Leu Arg Gln Pro Ala Phe Gly Ile Ser Phe Val Leu Cys Ile Ser Cys
 385                 390                 395                 400
Ile Leu Val Lys Thr Asn Arg Val Leu Leu Val Phe Glu Ala Lys Ile
             405                 410                 415
Pro Thr Ser Leu His Arg Lys Trp Trp Gly Leu Asn Leu Gln Phe Leu
             420                 425                 430
Leu Val Phe Leu Cys Thr Phe Val Gln Val Met Ile Cys Val Val Trp
         435                 440                 445
```

```
Leu Tyr Asn Ala Pro Pro Ser Ser Tyr Arg Asn Tyr Asp Ile Asp Glu
    450                 455                 460

Met Ile Phe Ile Thr Cys Asn Glu Gly Ser Val Met Ala Leu Gly Phe
465                 470                 475                 480

Leu Ile Gly Tyr Thr Cys Leu Leu Ala Ala Ile Cys Phe Phe Phe Ala
                485                 490                 495

Phe Lys Ser Arg Lys Leu Pro Glu Asn Phe Thr Glu Ala Lys Phe Ile
            500                 505                 510

Thr Phe Ser Met Leu Ile Phe Phe Ile Val Trp Ile Ser Phe Ile Pro
        515                 520                 525

Ala Tyr Phe Ser Thr Tyr Gly Lys Phe Val Ser Ala Val Glu Val Ile
    530                 535                 540

Ala Ile Leu Ala Ser Ser Phe Gly Met Leu Ala Cys Ile Phe Phe Asn
545                 550                 555                 560

Lys Val Tyr Ile Ile Leu Phe Lys Pro Ser Arg Asn Thr Ile Glu Glu
                565                 570                 575

Val Arg Cys Ser Thr Ser Ala His Ala Phe Lys Val Ala Ala Lys Ala
            580                 585                 590

Thr Leu Lys His Ser Thr Ala Ser Arg Arg Lys Ser Gly Ser Thr Gly
        595                 600                 605

Gly Ser Ser Asp Ser Thr Pro Ser Ser Ser Ile Ser Leu Lys Thr Asn
    610                 615                 620

Gly Asn Asp Pro Thr Ser Gly Lys Pro Arg Val Ser Phe Gly Ser Gly
625                 630                 635                 640

Thr Val Thr Leu Ser Leu Ser Phe Glu Glu Ser Arg Arg Ser Ser Leu
                645                 650                 655

Met

<210> SEQ ID NO 21
<211> LENGTH: 475
<212> TYPE: DNA
<213> ORGANISM: Summer Flounder

<400> SEQUENCE: 21
tgtcgtggac ggagcccttt gggatcgcgt tggccatatg tgcagcgctg ggtgttgcct      60
tgacgggctt cgtgatggcc gtctttatca gattccgcaa caccccaata gtgaaggcca     120
cgaaccgaga actgtcctat gtcctcctgt ctctctcat ctgttgcttc tccagttccc     180
tcatctttat tggagagccg caggattgga tgtgtcgttt acgccaacct gcctttggga     240
tcagttttgt tctctgtatc tcctgcatcc ttgtgaaaac taatagagta ctcttagtat     300
ttgaagccaa gatccccaca agtctccatc gtaaatggtg ggggttaaac cttcagtttt     360
tgctggtgtt tctgtgcaca tttgtccaag tcatgatctg tgttgtctgg ctgtacaatg     420
cccctccctc cagttacagg aattatgaca tagatgagat gattttatc acatg          475

<210> SEQ ID NO 22
<211> LENGTH: 157
<212> TYPE: PRT
<213> ORGANISM: Summer Flounder

<400> SEQUENCE: 22

Ser Trp Thr Glu Pro Phe Gly Ile Ala Leu Ala Ile Cys Ala Ala Leu
1               5                   10                  15

Gly Val Ala Leu Thr Gly Phe Val Met Ala Val Phe Ile Arg Phe Arg
            20                  25                  30
```

```
Asn Thr Pro Ile Val Lys Ala Thr Asn Arg Glu Leu Ser Tyr Val Leu
            35                  40                  45

Leu Phe Ser Leu Ile Cys Cys Phe Ser Ser Leu Ile Phe Ile Gly
    50                  55                  60

Glu Pro Gln Asp Trp Met Cys Arg Leu Arg Gln Pro Ala Phe Gly Ile
65                  70                  75                  80

Ser Phe Val Leu Cys Ile Ser Cys Ile Leu Val Lys Thr Asn Arg Val
                85                  90                  95

Leu Leu Val Phe Glu Ala Lys Ile Pro Thr Ser Leu His Arg Lys Trp
                100                 105                 110

Trp Gly Leu Asn Leu Gln Phe Leu Leu Val Phe Leu Cys Thr Phe Val
            115                 120                 125

Gln Val Met Ile Cys Val Val Trp Leu Tyr Asn Ala Pro Pro Ser Ser
130                 135                 140

Tyr Arg Asn Tyr Asp Ile Asp Glu Met Ile Phe Ile Thr
145                 150                 155
```

<210> SEQ ID NO 23
<211> LENGTH: 4134
<212> TYPE: DNA
<213> ORGANISM: Dogfish Shark

<400> SEQUENCE: 23

```
aattccgttg ctgtcggttc agtccaagtc tcctccagtg caaaatgaga atggtggtc      60
gccattacag gaacatgcac tacatctgtg ttaatgaaat attgtcagtt atctgaaggt   120
tattaaaatg tttctgcaag gatggcttca cgagaaatca attctgcacg ttttcccatt   180
gtcattgtat gaataactga ccaaagggat gtaacaaaat ggaacaaagc tgaggaccac   240
gttcacccttt tcttggagca tacgatcaac cctgaaggag atggaagact tgaggaggaa   300
atggggattg atcttccagg agttctgctg taaagcgatc cctcaccatt acaaagataa   360
gcagaaatcc tccaggcatc ctctgtaaac gggctggcgt agtgtggctt ggtcaaggaa   420
cagagacagg gctgcacaat ggctcagctt cactgccaac tcttattctt gggatttaca   480
ctcctacagt cgtacaatgt ctcagggtat ggtccaaacc aaagggccca agaaaagga    540
gacatcatac tgggaggtct cttcccaata cactttggag tagccgccaa ggatcaggac   600
ttaaaatcga gaccggaggc gacaaaatgt attcggtaca attttcgagg cttccgatgg   660
ctccaggcga tgatattcgc aattgaagag attaacaaca gtatgacttt cctgcccaat   720
atcaccctgg gatatcgcat atttgacacg tgtaacaccg tgtccaaggc gctagaggca   780
acactcagct ttgtggccca gaacaaaatc gactcgctga acttagatga gttctgtaac   840
tgctctgacc atatcccatc cacaatagca gtggtcgggg caaccgggtc aggaatctcc   900
acggctgtgg ccaatctatt gggattattt tacattccac aggtcagcta tgcctcctcg   960
agcaggctgc tcagcaacaa gaatgagtac aaggccttcc tgaggaccat ccccaatgat  1020
gagcaacagg ccacggccat ggccgagatc atcgagcact ccagtggaa ctgggtggga  1080
accctggcag ccgacgatga ctatggccgc ccaggcattg acaagttccg ggaggaggcc  1140
gttaagaggg acatctgtat tgacttcagt gagatgatct ctcagtacta cacccagaag  1200
cagttggagt tcatcgccga cgtcatccag aactcctcgg ccaaggtcat cgtggtcttc  1260
tccaatggcc ccgacctgga gccgctcatc aggagatag ttcggagaaa catcaccgat  1320
cggatctggc tggccagcga ggcttgggcc agctcttcgc tcattgccaa gccagagtac  1380
```

```
ttccacgtgg tcggcggcac catcggcttc gctctcaggg cggggcgtat cccagggttc    1440
aacaagttcc tgaaggaggt ccaccccagc aggtcctcgg acaatgggtt tgtcaaggag    1500
ttctgggagg agaccttcaa ctgctacttc accgagaaga ccctgacgca gctgaagaat    1560
tccaaggtgc cctcgcacgg accggcggct caaggggacg gctccaaggc ggggaactcc    1620
agacggacag ccctacgcca cccctgcact ggggaggaga acatcaccag cgtggagacc    1680
ccctacctgg attatacaca cctgaggatc tcctacaatg tatacgtggc cgtctactcc    1740
attgctcacg ccctgcaaga catccactct tgcaaacccg cacgggcat ctttgcaaac    1800 ggatcttgtg cagatattaa aaagttgag gcctggcagg tcctcaacca tctgctgcat    1860
ctgaagttta ccaacagcat gggtgagcag gttgactttg acgatcaagg tgacctcaag    1920
gggaactaca ccattatcaa ctggcagctc tccgcagagg atgaatcggt gttgttccat    1980
gaggtgggca actacaacgc ctacgctaag cccagtgacc gactcaacat caacgaaaag    2040
aaaatcctct ggagtggctt ctccaaagtg gttcctttct ccaactgcag tcgagactgt    2100
gtgccgggca ccaggaaggg gatcatcgag ggggagccca cctgctgctt tgaatgcatg    2160
gcatgtgcag agggagagtt cagtgatgaa acgatgcaa gtgcgtgtac aaagtgcccg    2220
aatgatttct ggtcgaatga aaccacacg tcgtgcatcg ccaaggagat cgagtacctg    2280
tcgtggacga gcccttcgg gatcgctctg accatcttcg ccgtactggg catcctgatc    2340
acctccttcg tgctgggggt cttcatcaag ttcaggaaca ctcccatcgt gaaggccacc    2400
aaccgggagt tgtcctacct gctgctcttc tccctcatct gctgcttctc cagctcgctc    2460
atcttcatcg gcgagcccag ggactggacc tgtcggctcc gccaaccggc ctttggcatc    2520
agcttcgtcc tgtgcatctc ctgcatcctg gtgaagacca accgggtgct gctggtcttc    2580
gaggccaaga tccccaccag cctccaccgc aagtgggtgg gcctcaacct gcagttcctc    2640
ctggtcttcc tctgcatcct ggtgcaaatc gtcacctgca tcatctggct ctacaccgcg    2700 cctcccctcca gctacaggaa ccatgagctg gaggacgagg tcatcttcat cacctgcgac    2760
gagggctcgc tcatggcgct gggcttcctc atcggctaca cctgcctcct cgccgccatc    2820
tgcttcttct tcgccttcaa gtcccgtaag ctgccggaga acttcaacga ggctaagttc    2880
atcaccttca gcatgttgat cttcttcatc gtctggatct ccttcatccc cgcctatgtc    2940
agcacctacg gcaagtttgt gtcggccgtg gaggtgattg ccatcctggc ctccagcttc    3000
gggctgctgg gctgcattta cttcaacaag tgttacatca tcctgttcaa gccgtgccgt    3060
aacaccatcg aggaggtgcg ctgcagcacg gcggcccacg ccttcaaggt ggcggcccgg    3120
gccaccctcc ggcgcagcgc cgcgtctcgc aagcgctcca gcagcctgtg cggctccacc    3180
atctcctcgc ccgcctcgtc cacctgcggg ccgggcctca ccatggagat gcagcgctgc    3240
agcacgcaga aggtcagctt cggcagcggc accgtcaccc tgtcgctcag cttcgaggag    3300
acaggccgat acgccaccct cagccgcacg gcccgcagca ggaactcggc ggatggccgc    3360
agcggcgacg acctgccatc tagacaccac gaccagggcc cgcctcagaa atgcgagccc    3420
cagcccgcca acgatgcccg atacaaggcg cgccgaccca agggcaccct agagtcgccg    3480
ggcggcagca aggagcgccc cacaactatg aggaaacct aatccaactc ctccatcaac    3540
cccaagaaca tcctccacgg cagcaccgtc gacaactgac atcaactcct aaccggtggc    3600
tgcccaacct ctcccctctc cggcactttg cgttttgctg aagattgcag catctgcagt    3660 tcctttttatc cctgatttc tgacttggat atttactagt gtgcgatgga atatcacaac    3720
ataatgagtt gcacaattag gtgagcagag ttgtgtcaaa gtatctgaac tatctgaagt    3780
```

```
atctgaacta ctttattctc tcgaattgta ttacaaacat ttgaagtatt tttagtgaca    3840
ttatgttcta acattgtcaa gataatttgt tacaacatat aaggtaccac ctgaagcagt    3900
gactgagatt gccactgtga tgacagaact gttttataac atttatcatt gaaacctgga    3960
ttgcaacagg aatataatga ctgtaacaaa aaaattgttg attatcttaa aaatgcaaat    4020
tgtaatcaga tgtgtaaaat tggtaattac ttctgtacat taaatgcata tttcttgata    4080
aaaaaaaaaa aaaaaaaaa aaaaaaaaaa aaaaaagcgg cccgacagca acgg           4134
```

<210> SEQ ID NO 24
<211> LENGTH: 23
<212> TYPE: PRT
<213> ORGANISM: Rat

<400> SEQUENCE: 24

Ala Asp Asp Asp Tyr Gly Arg Pro Gly Ile Glu Lys Phe Arg Glu Glu
1               5                   10                  15

Ala Glu Glu Arg Asp Ile Cys
            20

<210> SEQ ID NO 25
<211> LENGTH: 22
<212> TYPE: PRT
<213> ORGANISM: Rat

<400> SEQUENCE: 25

Asp Asp Tyr Gly Arg Pro Gly Ile Glu Lys Phe Arg Glu Glu Ala Glu
1               5                   10                  15

Glu Arg Asp Ile Cys Ile
            20

<210> SEQ ID NO 26
<211> LENGTH: 17
<212> TYPE: PRT
<213> ORGANISM: Unknown
<220> FEATURE:
<223> OTHER INFORMATION: Peptide immunogen

<400> SEQUENCE: 26

Ala Arg Ser Arg Asn Ser Ala Asp Gly Arg Ser Gly Asp Asp Leu Pro
1               5                   10                  15

Cys

<210> SEQ ID NO 27
<211> LENGTH: 28
<212> TYPE: DNA
<213> ORGANISM: Artificial Sequence
<220> FEATURE:
<223> OTHER INFORMATION: Primer; K = T or G; Y = C or T; R =A or G

<400> SEQUENCE: 27
tgtcktggac ggagccctty ggratcgc                                        28

<210> SEQ ID NO 28
<211> LENGTH: 31
<212> TYPE: DNA
<213> ORGANISM: Artificial Sequence
<220> FEATURE:
<223> OTHER INFORMATION: Primer; K = T or G; Y = C or T; R =A or G

<400> SEQUENCE: 28
ggckggratg aargakatcc aracratgaa g                                    31

```
<210> SEQ ID NO 29
<211> LENGTH: 28
<212> TYPE: DNA
<213> ORGANISM: Artificial Sequence
<220> FEATURE:
<223> OTHER INFORMATION: Primer; K = T or G; Y = C or T; R =A or G

<400> SEQUENCE: 29
tgtcktggac ggagccctty ggratcgc                                              28

<210> SEQ ID NO 30
<211> LENGTH: 31
<212> TYPE: DNA
<213> ORGANISM: Artificial Sequence
<220> FEATURE:
<223> OTHER INFORMATION: Primer; K = T or G; Y = C or T; R =A or G

<400> SEQUENCE: 30
ggckggratg aargakatcc aracratgaa g                                          31
```